(12) United States Patent
Purcell et al.

(10) Patent No.: US 7,243,212 B1
(45) Date of Patent: Jul. 10, 2007

(54) PROCESSOR-CONTROLLER INTERFACE FOR NON-LOCK STEP OPERATION

(75) Inventors: Kathryn Story Purcell, Mountain View, CA (US); Ahmad R. Ansari, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 236 days.

(21) Appl. No.: 10/913,991

(22) Filed: Aug. 6, 2004

(51) Int. Cl.
*G06F 15/16* (2006.01)
(52) U.S. Cl. .............................. 712/34; 712/32; 712/40
(58) Field of Classification Search .................. 712/34, 712/32, 40
See application file for complete search history.

(56) References Cited

U.S. PATENT DOCUMENTS

| | | | |
|---|---|---|---|
| 4,785,453 A * | 11/1988 | Chandran et al. | 714/25 |
| 4,965,717 A * | 10/1990 | Cutts et al. | 714/12 |
| 5,276,823 A * | 1/1994 | Cutts et al. | 714/11 |
| 5,440,749 A | 8/1995 | Moore et al. | |
| 5,809,336 A | 9/1998 | Moore et al. | |
| 5,914,616 A | 6/1999 | Young et al. | |
| 6,519,710 B1 * | 2/2003 | Saunders et al. | 713/500 |

OTHER PUBLICATIONS

U.S. Appl. No. 10/912,844, filed Aug. 6, 2004, Ansari et al.
U.S. Appl. No. 10/912,865, filed Aug. 6, 2004, Purcell et al.
U.S. Appl. No. 10/912,897, filed Aug. 6, 2004, Ansari et al.
U.S. Appl. No. 10/913,231, filed Aug. 6, 2004, Ansari et al.
U.S. Appl. No. 10/913,282, filed Aug. 6, 2004, Ansari et al.
QinetiQ: Data Sheet—Preliminary; "Quixilica Floating-Point Unit for PPC405 Core with Optimised Vector Maths Library"; NASoftware Limited; QINETIQ/S&E/APC/TDS021842, Issue 2; pp. 1-4.
IBM; "Book E—Enhanced PowerPC Architecture"; Version 1.0; May 7, 2002; pp. 1-438.
Xilinx, Inc.; "The Progammable Logic Data Book 2000"; Published Apr. 2000; available from Xilinx, Inc., 2100 Logic Drive, San Jose, California 95124; pp. 3-75 through 3-96.
Xilinx,, Inc.; "Virtex-II Platform FPGA Handbook"; published Dec. 2000; available from Xilinx, Inc., 2100 Logic Drive, San Jose, California 95124; pp. 33-75.
Xilinx, Inc.; "Virtex-II Pro Platform FPGA Handbook"; published Oct. 14, 2002; available from Xilinx, Inc., 2100 Logic Drive, San Jose, California 95124; pp. 19-71.

* cited by examiner

*Primary Examiner*—Donald Sparks
*Assistant Examiner*—Vincent Lai
(74) *Attorney, Agent, or Firm*—W. Eric Webostad

(57) ABSTRACT

Method and apparatus for non-lock-step operation between a processor and a controller is described. An instruction is provided from the processor to the controller. A busy signal is provided from the controller to the processor to indicate that the controller is not ready to execute the instruction. Initiation of execution of the instruction by the controller is done while continuing to indicate to the processor that the controller is not ready to execute the instruction.

30 Claims, 31 Drawing Sheets

600

LOAD/STORE D-MODE 601

| INSTRUCTION 611 | MAJOR OPCODE 602 | [6:10] | [11:15] | [16:31] | | | LOAD 603 | STORE 604 | WORD 605 | TWO WD 606 | COND REC 607 |
|---|---|---|---|---|---|---|---|---|---|---|---|
| LFD/LFDU | 11001U | FRT | RA | D | | | 1 | 0 | 0 | 1 | 0 |
| STFD/STFDU | 11011U | FRS | RA | D | | | 0 | 1 | 0 | 1 | 0 |
| LFS/LFSU | 11000U | FRT | RA | D | | | 1 | 0 | 1 | 0 | 0 |
| STFS/STFSU | 11010U | FRS | RA | D | | | 0 | 1 | 1 | 0 | 0 |

LOAD/STORE DES-MODE 608

| INSTRUCTION 611 | MAJOR OPCODE 602 | [6:10] | [11:15] | [16:27] | [28:31] | | LOAD 603 | STORE 604 | WORD 605 | TWO WD 606 | COND REC 607 |
|---|---|---|---|---|---|---|---|---|---|---|---|
| LFDE/LFDUE | 111110 | FRT | RA | DES | 011U | | 1 | 0 | 0 | 1 | 0 |
| STFDE/STFDUE | 111110 | FRS | RA | DES | 111U | | 0 | 1 | 0 | 1 | 0 |
| LFSE/LFSUE | 111110 | FRT | RA | DES | 010U | | 1 | 0 | 1 | 0 | 0 |
| STFSE/STFSUE | 111110 | FRS | RA | DES | 110U | | 0 | 1 | 1 | 0 | 0 |

LOAD/STORE X/XE-MODE 609

| INSTRUCTION 611 | MAJOR OPCODE 602 | [6:10] | [11:15] | [16:20] | [21:30] | [31] | LOAD 603 | STORE 604 | WORD 605 | TWO WD 606 | COND REC 607 |
|---|---|---|---|---|---|---|---|---|---|---|---|
| LFDX/LFDUX/LFDXE/LFDUXE | 011111 | FRT | RA | RB | 1001U1E111 | --- | 1 | 0 | 0 | 1 | 0 |
| STFDX/STFDUX/STFDXE/STFDUXE | 011111 | FRS | RA | RB | 1011U1E111 | --- | 0 | 1 | 0 | 1 | 0 |
| LFSX/LFSUX/LFSXE/LFSUXE | 011111 | FRT | RA | RB | 1000U1E111 | --- | 1 | 0 | 1 | 0 | 0 |
| STFSX/STFSUX/STFSXE/STFSUXE | 011111 | FRS | RA | RB | 1010U1E111 | --- | 0 | 1 | 1 | 0 | 0 |
| STFIWX/STFIWXE | 011111 | FRS | RA | RB | 11101E111 | --- | 0 | 1 | 1 | 0 | 0 |

ARITHMETIC OPCODES 610

| INSTRUCTION 611 | MAJOR OPCODE 602 | [6:10] | [11:15] | [16:20] | [21:30] | [31] | LOAD 603 | STORE 604 | WORD 605 | TWO WD 606 | COND REC 607 |
|---|---|---|---|---|---|---|---|---|---|---|---|
| FABS/FABS. | 111111 | FRT | ------- | FRB | 0100001000 | RC | 0 | 0 | 0 | 0 | RC |
| FMR/FMR. | 111111 | FRT | ------- | FRB | 0001001000 | RC | 0 | 0 | 0 | 0 | RC |
| FNABS/FNABS. | 111111 | FRT | ------- | FRB | 0010001000 | RC | 0 | 0 | 0 | 0 | RC |
| FNEG/FNEG. | 111111 | FRT | ------- | FRB | 0000101000 | RC | 0 | 0 | 0 | 0 | RC |
| FCFID | 111111 | FRT | ------- | FRB | 1101001110 | --- | 0 | 0 | 0 | 0 | 0 |
| FCTID/FCTIDZ | 111111 | FRT | ------- | FRB | 110010111Z | --- | 0 | 0 | 0 | 0 | 0 |
| FCTIW/FCTIW. | 111111 | FRT | ------- | FRB | 0000001110 | RC | 0 | 0 | 0 | 0 | RC |
| FCTIWZ/FCTIWZ. | 111111 | FRT | ------- | FRB | 0000001111 | RC | 0 | 0 | 0 | 0 | RC |
| FRSP/FRSP. | 111111 | FRT | ------- | FRB | 0000001100 | RC | 0 | 0 | 0 | 0 | RC |

FIG. 6A

| INSTRUCTION 611 | MAJOR OPCODE 602 | [6:10] | [11:15] | [16:20] | [21:25] | [26:30] | [31] | LOAD 603 | STORE 604 | WORD 605 | TWO WD 606 | COND REC 607 |
|---|---|---|---|---|---|---|---|---|---|---|---|---|
| FADD/FADD. | 111111 | FRT | FRA | FRB | --- | 10101 | RC | 0 | 0 | 0 | 0 | RC |
| FADDS/FADDS. | 111011 | FRT | FRA | FRB | --- | 10101 | RC | 0 | 0 | 0 | 0 | RC |
| FDIV/FDIV. | 111111 | FRT | FRA | FRB | --- | 10010 | RC | 0 | 0 | 0 | 0 | RC |
| FDIVS/FDIVS. | 111011 | FRT | FRA | FRB | --- | 10010 | RC | 0 | 0 | 0 | 0 | RC |
| FMUL/FMUL. | 111111 | FRT | FRA | --- | FRC | 11001 | RC | 0 | 0 | 0 | 0 | RC |
| FMULS/FMULS. | 111011 | FRT | FRA | --- | FRC | 11001 | RC | 0 | 0 | 0 | 0 | RC |
| FRES/FRES. | 111011 | FRT | --- | FRB | --- | 11000 | RC | 0 | 0 | 0 | 0 | RC |
| FRSQRTE/FRSQRTE. | 111111 | FRT | --- | FRB | --- | 11010 | RC | 0 | 0 | 0 | 0 | RC |
| FSQRT/FSQRT. | 111111 | FRT | --- | FRB | --- | 10110 | RC | 0 | 0 | 0 | 0 | RC |
| FSQRTS/FSQRTS. | 111011 | FRT | --- | FRB | --- | 10110 | RC | 0 | 0 | 0 | 0 | RC |
| FSUB/FSUB. | 111111 | FRT | FRA | FRB | --- | 10100 | RC | 0 | 0 | 0 | 0 | RC |
| FSUBS/FSUBS. | 111011 | FRT | FRA | FRB | --- | 10100 | RC | 0 | 0 | 0 | 0 | RC |
| FMADD/FMADD. | 111111 | FRT | FRA | FRB | FRC | 11101 | RC | 0 | 0 | 0 | 0 | RC |
| FMADDS/FMADDS. | 111011 | FRT | FRA | FRB | FRC | 11101 | RC | 0 | 0 | 0 | 0 | RC |
| FMSUB/FMSUB. | 111111 | FRT | FRA | FRB | FRC | 11100 | RC | 0 | 0 | 0 | 0 | RC |
| FMSUBS/FMSUBS. | 111011 | FRT | FRA | FRB | FRC | 11100 | RC | 0 | 0 | 0 | 0 | RC |
| FNMADD/FNMADD. | 111111 | FRT | FRA | FRB | FRC | 11111 | RC | 0 | 0 | 0 | 0 | RC |
| FNMADDS/FNMADDS. | 111011 | FRT | FRA | FRB | FRC | 11111 | RC | 0 | 0 | 0 | 0 | RC |
| FNMSUB/FNMSUB. | 111111 | FRT | FRA | FRB | FRC | 11110 | RC | 0 | 0 | 0 | 0 | RC |
| FNMSUBS/FNMSUBS. | 111011 | FRT | FRA | FRB | FRC | 11110 | RC | 0 | 0 | 0 | 0 | RC |
| FSEL/FSEL. | 111111 | FRT | FRA | FRB | FRC | 10111 | RC | 0 | 0 | 0 | 0 | RC |

| INSTRUCTION 611 | MAJOR OPCODE 602 | [6:8] | [9:10] | [11:15] | [16:20] | [21:30] | [31] | LOAD 603 | STORE 604 | WORD 605 | TWO WD 606 | COND REC 607 |
|---|---|---|---|---|---|---|---|---|---|---|---|---|
| FCMPU/FCMPO | 111111 | BF | --- | FRA | FRB | 0000U000000 | --- | 0 | 0 | 0 | 0 | 1 |

| INSTRUCTION 611 | MAJOR OPCODE 602 | [6] | [7:14] | [15] | [16:20] | [21:30] | [31] | LOAD 603 | STORE 604 | WORD 605 | TWO WD 606 | COND REC 607 |
|---|---|---|---|---|---|---|---|---|---|---|---|---|
| MTFSF/MTFSF. | 111111 | --- | FLM | --- | FRB | 1011000111 | RC | 0 | 0 | 0 | 0 | RC |

| INSTRUCTION 611 | MAJOR OPCODE 602 | [6:8] | [9:15] | [16:19] | [20] | [21:30] | [31] | LOAD 603 | STORE 604 | WORD 605 | TWO WD 606 | COND REC 607 |
|---|---|---|---|---|---|---|---|---|---|---|---|---|
| MTFSFI/MTFSFI. | 111111 | BF | --- | U | --- | 0010000110 | RC | 0 | 0 | 0 | 0 | RC |

| INSTRUCTION 611 | MAJOR OPCODE 602 | [6:8] | [9:10] | [11:13] | [14:20] | [21:30] | [31] | LOAD 603 | STORE 604 | WORD 605 | TWO WD 606 | COND REC 607 |
|---|---|---|---|---|---|---|---|---|---|---|---|---|
| MCRFS | 111111 | BF | --- | BFA | --- | 0001000000 | --- | 0 | 0 | 0 | 0 | 1 |

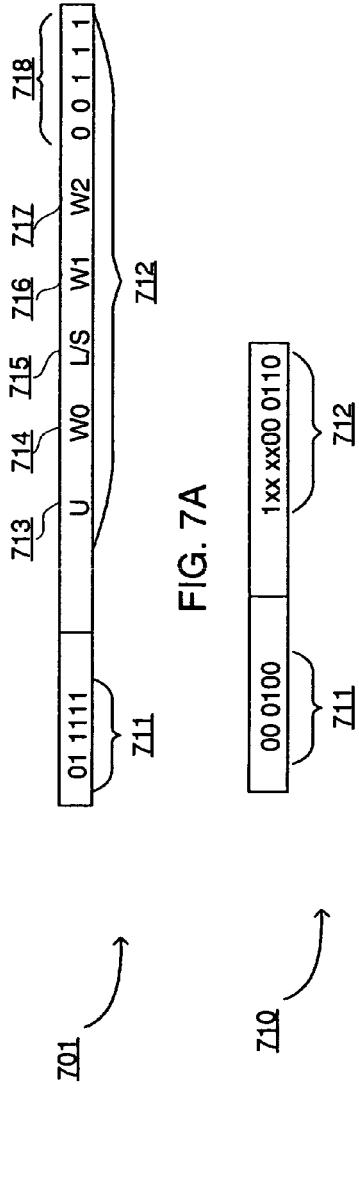
FIG. 7A
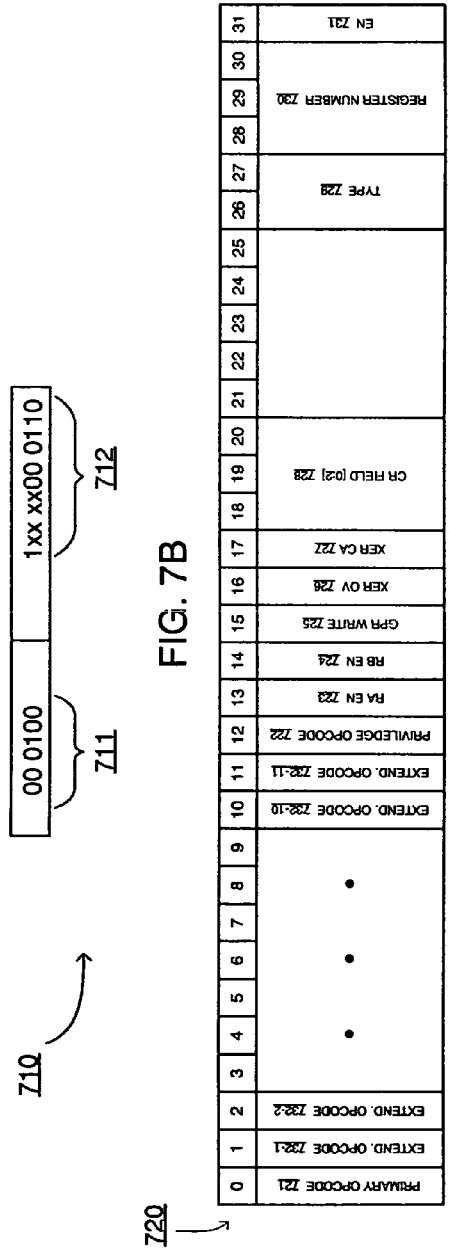
FIG. 7B
FIG. 7C
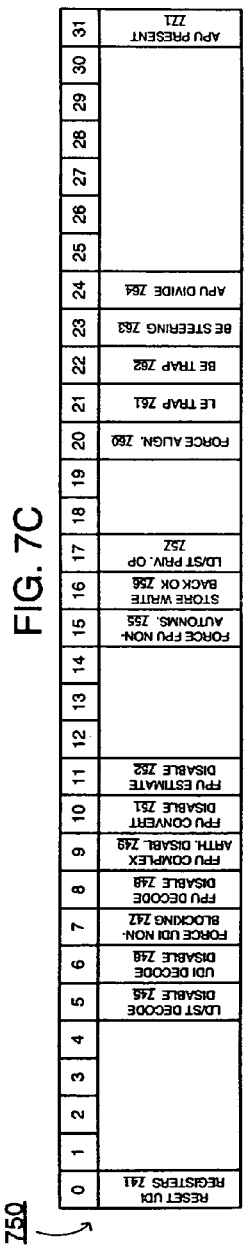
FIG. 7D

PROCESSOR-CONTROLLER INTERFACE FOR NON-LOCK STEP OPERATION

FIELD OF THE INVENTION

One or more aspects of the invention relate generally to a processor-controller interface for non-lock-step operation.

BACKGROUND OF THE INVENTION

Conventionally, a coprocessor module attached to a processor core ("microprocessor") interacts directly with the processor's pipeline. This means that the coprocessor functions at the same frequency of operation as the processor. In other words, the coprocessor is able to work in lock-step with the processor and its pipeline. This duality of operating at a same frequency is achievable by having dedicated circuitry for the processor and the coprocessor being implemented in the same technology.

However, today processors are being embedded in Application Specific Integrated Circuits ("ASICs"), Application Specific Standard Products ("ASSPs"), and System-On-Chips ("SoCs"). These SOCs may be implemented in programmable logic devices, such as Field Programmable Gate Arrays ("FPGAs") that may contain one or more embedded microprocessors. As an example, such embedded microprocessors may be integer-only processors with floating-point support provided by software emulation. However, floating-point support via software emulation being run on an embedded processor ties up the processor, and thus does not have the advantage of off-loading floating-point tasks to a coprocessor.

Alternatively, a floating-point coprocessor unit ("FPU") may be implemented in the FPGA fabric along with the embedded processor. For example, a PowerPC processor core from International Business Machines Corporation ("IBM"), White Plains, N.Y., may be embedded in an integrated circuit along with a FPU core from QinetiQ Ltd. ("QinetiQ"), Worcestershire, United Kingdom. However, such an FPU core conventionally operates at less than one third of the maximum operating frequency of the PowerPC processor core, and thus processor performance is slowed for operating the coprocessor. More details regarding a PowerPC processor core may be found in a publication entitled "Enhanced PowerPC Architecture" version 1.0 dated May 7, 2002 from IBM, which is incorporated by reference herein in its entirety. Additionally, more details regarding an FPU core from QinetiQ may be found in "Quixilica® Floating-Point Unit For PPC405 Core with Optimised Vector Maths Library" by QinetiQ, [online] (Jul. 16, 2004)<URL:http://www.quixilica.com/products_qxfpu.htm URL:http://www.qinetiq.com/home/markets/information_communication_and_electroni cs/digital_signal_processing/quixilica_downloads.html>.

Notably, it may not be practical to provide an embedded coprocessor along with an embedded processor in an integrated circuit due to having to slow performance of the embedded processor to operate the coprocessor. Moreover, designing a coprocessor core to operate at the relatively high frequencies of a processor core is at best problematic and subject to functional limitation or obsolescence if the instruction set of the processor core is subsequently altered. Furthermore, with respect to FPGAs, it may not be desirable to consume semiconductor die area for an embedded coprocessor at the expense of reconfigurable resources.

Accordingly, it would be desirable and useful to provide means for operating a coprocessor at a frequency slower than the frequency of operation of a processor with less performance impact on the processor as compared with slowing the processor to operate at the coprocessor speed or emulating the coprocessor operations on the processor.

SUMMARY OF THE INVENTION

One or more aspects of the invention generally relate to a processor-controller interface for non-lock-step operation.

An aspect of the invention is a method for non-lock-step operation between a processor and a controller, including: providing an instruction from the processor to the controller; providing a busy signal from the controller to the processor indicating that the controller is not ready to execute the instruction; and initiating execution of the instruction by the controller while continuing to indicate to the processor that the controller is not ready to execute the instruction.

Another aspect of the invention is a processor-controller interface for non-lock-step operation, including: a processor configured to provide an instruction; and a controller coupled to the processor to receive the instruction. The controller is configured to: provide a busy signal to indicate to the processor that the controller is not ready to process the instruction; initiate processing of the instruction while maintaining the busy signal at a first logic state indicating that the controller is not ready to processing the instruction; hold the busy signal at the first logic state until a sufficient amount of the instruction has been executed by the controller for an appearance of lock-step operation between the processor and the controller though the controller operates at a lower frequency than the processor; and transition the busy signal to a second logic state for time remaining to complete execution of the instruction by the controller.

Yet another aspect of the invention is a processor-controller interface for non-lock-step operation, including: a processor configured to provide an instruction; and a controller coupled to the processor to receive the instruction. The controller is configured to: provide a busy signal to indicate to the processor that the controller is not ready to process the instruction; initiate processing of the instruction while maintaining the busy signal at a first logic state indicating that the controller is not ready to processing the instruction; hold the busy signal at the first logic state until a sufficient amount of the instruction has been executed by the controller for an appearance of lock-step operation between the processor and the controller though the controller uses more than a one clock cycle threshold of the processor to execute the instruction; and transition the busy signal to a second logic state for time remaining to complete execution of the instruction by the controller.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

FIGS. 6A and 6B in combination are a table diagram depicting an exemplary embodiment of a table of instructions, including without limitation operation codes ("opcodes") for floating-point unit ("FPU") instructions.

FIG. 7A is bit position diagram depicting an exemplary embodiment of an opcode for a load/store user-defined instruction ("UDI").

FIG. 7B is a bit position diagram depicting an exemplary embodiment of an opcode for a UDI that sets a condition record field as part or all of the result of the UDI.

FIG. 7C is a block diagram depicting an exemplary embodiment of a 32-bit long UDI register.

FIG. 7D is a block diagram depicting an exemplary embodiment of a 32-bit long control register.

DETAILED DESCRIPTION OF THE DRAWINGS

In the following description, numerous specific details are set forth to provide a more thorough description of the specific embodiments of the invention. It should be apparent, however, to one skilled in the art, that the invention may be practiced without all the specific details given below. In other instances, well known features have not been described in detail so as not to obscure the invention. For ease of illustration, the same number labels are used in different diagrams to refer to the same items, however, in alternative embodiments the items may be different.

Processor/Coprocessor System

Figure 1:
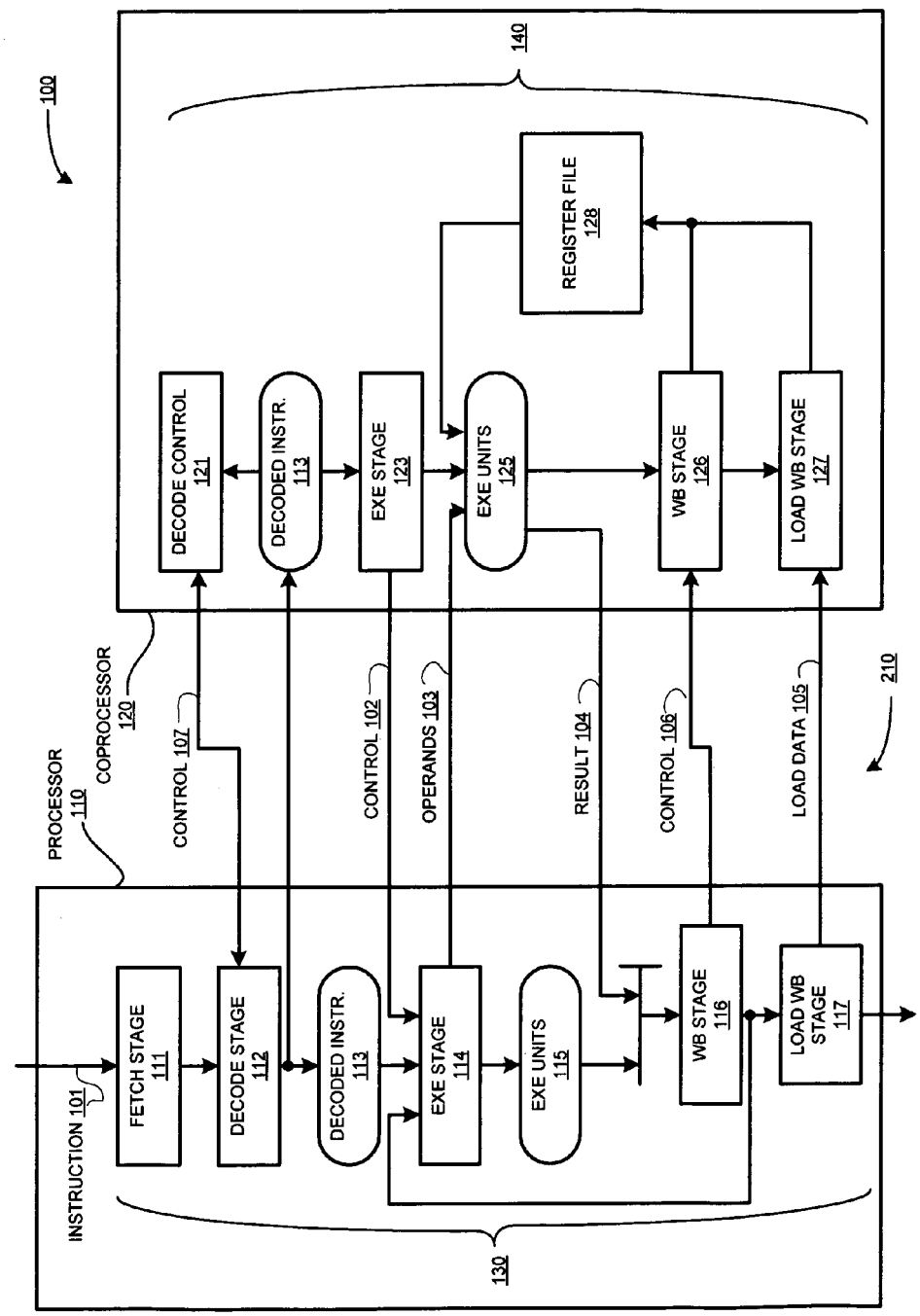
FIG. 1 is a simplified block/data flow diagram depicting an exemplary embodiment of a prior art processor/coprocessor system.

In order to fully appreciate one or more aspects of the invention, a more detailed description of the prior art may be useful. FIG. 1 is a simplified block/data flow diagram depicting an exemplary embodiment of a prior art processor/coprocessor system 100. Processor/coprocessor system 100 includes processor 110 and coprocessor 120. Processor 110 and coprocessor 120 are both formed of dedicated circuitry, and thus are sometimes conventionally referred to as a "hard" processor and a "hard" coprocessor. Processor 110 and coprocessor 120 are interfaced such that coprocessor is able to function in lock step with processor 110.

Notably, processor 110 and coprocessor 120 may be formed on the same or different semiconductor dies. For purposes of clarity, it will be assumed that processor 110 and coprocessor 120 are formed on the same semiconductor die, and may be embedded cores.

At fetch stage 111 of processor 110, coded instruction 101 is obtained from cache or system memory and provided to processor 110. At decode stage 112 of processor 110, coded instruction 101 is interpreted or decoded to provide decoded instruction 113. Decoded instruction 113 may be an instruction in a processor set of instructions or a coprocessor set of instructions, or may be in neither of the processor and coprocessor sets of instructions. Notably, for purposes of clarity, it will be assumed that decoded instruction 113 is either a processor instruction or a coprocessor instruction, unless otherwise specified.

Notably, for an instruction, that is not part of the set of instructions executable by processor 110, decoded instruction 113 is a coprocessor instruction. Suppose for example, coprocessor 120 is an FPU and processor 110 is an integer-only microprocessor. If instruction 101 is a floating-point instruction, then it will not be interpreted by processor 110. In other words, such a floating-point instruction will simply be piped through pipeline 130 without being executed. Moreover, if decoded instruction 113 is a processor instruction and not a coprocessor instruction, then decoded instruction 113 would be piped through pipeline 140 without being executed.

Assuming decoded instruction 113 is an instruction executable by processor 110, then such decoded instruction 113 is provided to execution stage 114 of processor 110 for execution and provided to an execution stage 123 of coprocessor 120 as part of checking for which device, either processor 110 or coprocessor 120, is to execute decoded instruction 113.

At execution stage 114, processor 110 includes one or more execution units 115, such as for computing integer values in the above example, responsive to decoded instructions 113. These execution units 115 provide an outcome, including without limitation an interim outcome, to write-back stage 116. Outcome from execution units 115 may be written to registers, such as data registers, address registers, or general-purpose registers, or other known storage elements, as part of write-back stage 116 of processor 110.

In the instance of a load instruction, the output from write-back stage 116 may be obtained, such as accessed from storage, and loaded into processor 110 register at load write-back stage 117. Alternatively or additionally, output of write-back stage 116 may be fed back to execution stage 114, such as in a loop execution sequence. Loaded data 105 at load write-back stage 117 may be provided as an output of processor 110 to coprocessor 120 for subsequent processing.

Assuming a coded instruction 101 is a coprocessor instruction, decoded instruction 113 is provided to execution stage 123 of coprocessor 120, as previously described, and to decode controller stage 121 of coprocessor 121. Decode controller 121 informs decoder 112 whether or not decoded instruction 113 is part of a set of instructions executable by coprocessor 120. This control feedback 107 from coprocessor 120 to processor 110, and vise versa, may be used for example to determine if there is an instruction to decode in processor 110, check if an instruction is indeed executable by coprocessor 120, or check if coprocessor 120 is able to decode an instruction at this time.

Decoded instruction 113 is provided to execution stage 123. At execution stage 123, coprocessor 120 uses execution units 125, such as for computing floating-point values in the above example, responsive to decoded instruction 113. Outcome from execution units 125 is provided to write-back stage 126 and may be provided as a result 104, including without limitation an interim result, to write-back stage 116 of processor 110.

Output from write-back stage 126 may be fed back to register file 128, for example for registering floating-point values. Output of register file 128 may be fed back for execution units 125, such as in a loop sequence, to produce floating-point values anew. Outcomes from execution units 125 may be written to registers, such as data registers, instruction registers, or general purpose registers, or other known storage elements, as part of write-back stage 126 of coprocessor 120.

Load data 105 from load write-back stage 117 may be provided as output from processor 110 to coprocessor 120 for loading at load write-back stage 127. Output from load write-back stage 127 may be provided to register file 128 for subsequent usage by execution units 125.

Operands 103 may be provided from execution stage 114 of processor 110 to operate with execution units 125. Additionally, control information 102 may be provided from execution stage 123 to execution stage 114 to coordinate execution for lock-step operation and for obtaining operands 103.

Processor/Controller/Coprocessor System

Figure 2:
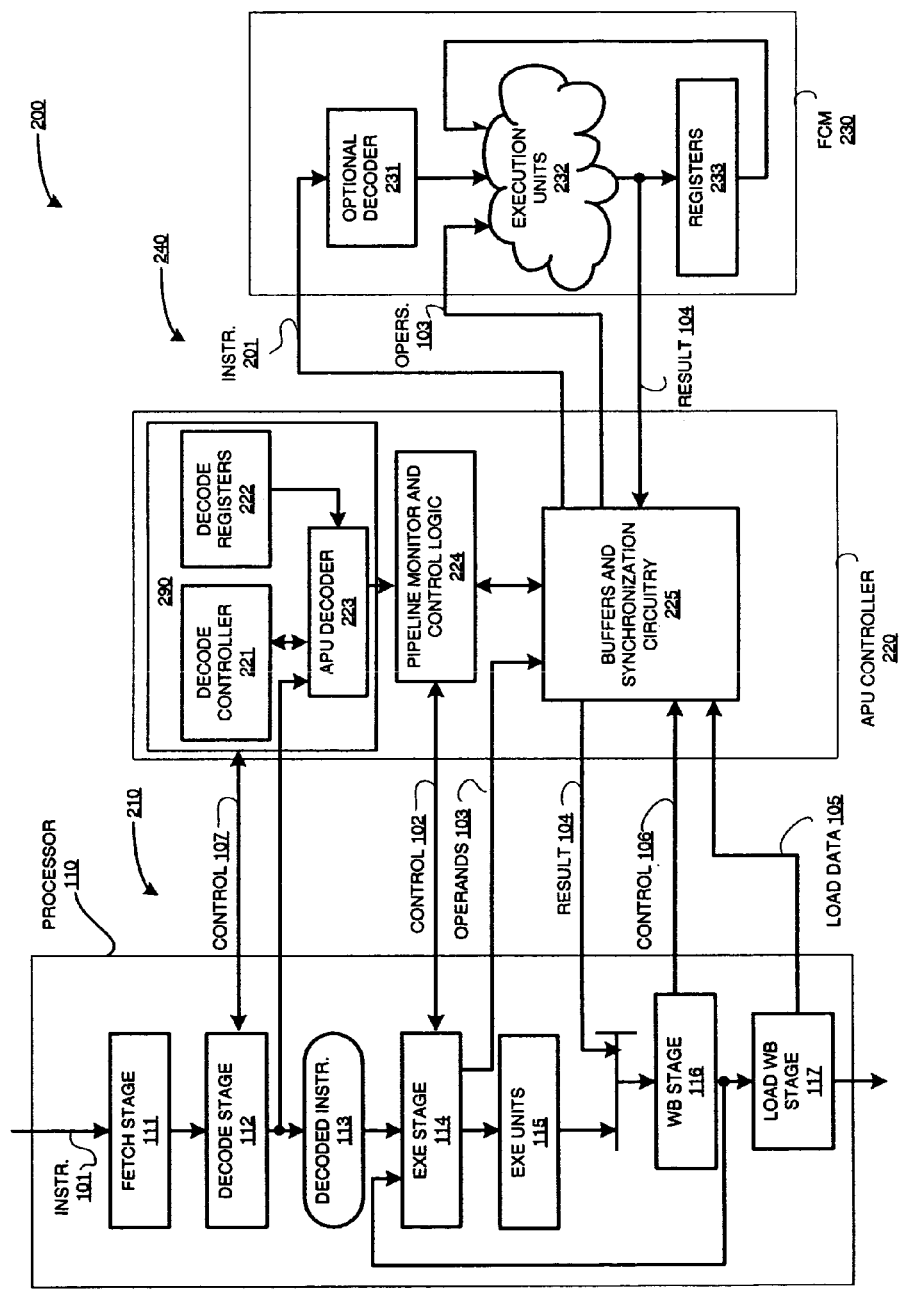
FIG. 2 is a simplified block/data flow diagram depicting an exemplary embodiment of an embedded system.

FIG. 2 is a simplified block/data flow diagram depicting an exemplary embodiment of an embedded system 200. Embedded system 200 includes processor 110 coupled to fabric coprocessor module ("FCM") 230 via auxiliary processing unit ("APU") controller 220. FCM 230 is a coprocessor instantiated in configurable circuitry ("fabric") of an FPGA. In an alternative embodiment FCM 230 may include dedicated hardwire circuitry (operating at a frequency less than the processor 110) or a combination of dedicated hardwire circuitry and configurable circuitry.

Processor 110 is formed of dedicated circuitry, and thus is a "hard" or "embedded" processor which is capable of operating at frequencies substantially in excess of the maximum operating frequency of the fabric of an FPGA. APU controller 220 is formed of dedicated circuitry, and thus is a "hard" or "dedicated" controller which is capable of operating at frequencies equivalent to operating frequencies of embedded processor 110. APU controller 220 may be formed in a hard processor block of an FPGA with embedded processor 110. Notably, in an another embodiment described below, APU controller 220 operates at a frequency less than that of processor 110 though in excess of the frequency of operation of FCM 230.

Because APU controller 220 can operate at a rate speed of embedded processor 110, APU operates on processor interface 210 in lock-step with pipeline 130 (shown in FIG. 1) of embedded processor 110 and generates/handles handshaking signals between embedded processor 110 and FCM 230. In other words, embedded processor 110 does not need to be slowed down to work with FCM 230, as APU controller 220 provides an interface to and from processor 110 capable of operating at a rated speed of processor 110. Thus, it should be understood that processor interface 210 operates in a clock domain of processor 110 and coprocessor interface 240 operates in a clock domain of FCM 230, where the frequency of the clock domain of processor 110 is greater than or equal to the frequency of the clock domain of FCM 230.

It should be understood that embedded processor 110 of FIG. 1 is the same as embedded processor 110 of FIG. 2. There is no difference in processor interface 210 for embedded processor 110. Thus, APU controller 220 can work with an off-the-shelf ("OTS") embedded processor core. Moreover, APU controller 220 can work with an OTS embedded coprocessor core. For example, APU controller 220 may couple an embedded PowerPC 405 microprocessor core from IBM and an embedded Quixilica FPU from QinetiQ.

Notably, in contrast to where an embedded processor may have to be slowed to operate in lock-step with a coprocessor, FCM 230 and embedded processor 110 may be run at different speeds. Thus, execution by embedded processor 110 does not have to be slowed or stalled to operate FCM 230. The ability to operate a coprocessor at a different speed than a processor is not limited to a coprocessor instantiated in FPGA fabric. For example, dedicated logic coprocessors exist that are not capable of running at rated speeds of processors to which they are mated. APU controller 220 may be implemented between an embedded processor and an embedded coprocessor in order to operate the two devices at different speeds. Furthermore, APU controller 220 is not limited to SoCs or embedded systems, as APU controller 220 may be part of a standalone microprocessor integrated circuit or part of a standalone coprocessor integrated circuit. However, for purposes of clarity and not limitation, a coprocessor is described hereinbelow as FCM 230 instantiated in configurable logic of an FPGA having an embedded processor 110 and an embedded APU controller 220.

APU controller receives instruction 101 from decode stage 112 of embedded processor 110. Assuming instruction 101 is an instruction for execution by FCM 230, APU decoder 223 decodes instruction 101 for execution by FCM 230. APU decoder 223 provides a signal to decode controller 221 indicating whether instruction 101 is for FCM 230.

APU decoder block 290 includes decode controller 221, decode registers 222 and APU decoder 223. Basically, APU decoder 223 decodes an instruction from processor 110 using control information from decode controller 221 and, in the instance of a user-defined instruction ("UDI") in particular, information from decode registers 222. APU decoder block 290 is in bidirectional communication with decode stage 112 for communicating control information 107. Control information 107 may, for example, include whether processor 110 has an instruction to decode, if FCM 230 can decode an instruction at this time, or if APU decoder 223 has decoded an instruction for FCM 230. APU decoder 223 may obtain input from decode registers 222, which may include FCM instructions or user-defined instructions ("UDIs"), including without limitation a combination thereof. However, generally decode registers 222 are for UDIs.

A decoded instruction for FCM 230 is provided from APU decoder 223 to pipeline monitor and control logic 224. Pipeline monitor and control logic 224 monitors at least part of the pipeline 130 of processor 110. Pipeline monitor and control logic 224 is in bidirectional communication with execution stage 114 for communicating control information 102. Control information 102 may, for example, include if FCM 230 has finished executing an instruction and has a result or if processor 110 needs to stall the pipeline for some reason.

Pipeline monitor and control logic 224 is in bidirectional communication with buffers and synchronization circuitry 225 for communicating when data from processor 110 is valid (like source data or an instruction) and when processor 110 has control information, such as for example holds, flushes, or when it is okay for FCM 230 to update internal registers. In the other direction, synchronization circuitry 225 notifies pipeline monitor and control logic 224 when result data is ready. For example, an instruction 201 may be provided from pipeline monitor and control logic 224 to buffers and synchronization circuitry 225, where such instruction may be buffered. Instruction 201 may be passed from buffers and synchronization circuitry 225 directly to one or more execution units 232 operating in FCM 230. There are many known types of execution units, including without limitation adders, half-adders, and multipliers, among others. The type and configuration of execution units is user determined depending on how and what FCM instructions are instantiated to provide FCM 230. Optionally, a decoder 231 may receive an instruction 201 for decoding in FCM 230. Moreover, one or more operands 103 from processor 110 may be received by buffers and synchronization circuitry 225 for instruction 201, and such operands 103 may be provided to one or more execution units 232. Furthermore, control signals 106 may be provided from write-back stage 116 to buffers and synchronization circuitry 225 for control information, such as for example flush signals or indications that it is okay for FCM 230 to update internal registers. Additionally, load data 105 may be provided to buffers and synchronization circuitry 225 for passing load data from processor 110 to FCM 230.

One or more of execution units 232 may be user defined. Output of one or more execution units 232 may be provided to buffers and synchronization circuitry 225 for returning result data to processor 110 or to registers 233 to be accessible to one or more execution units 232.

Figure 3:
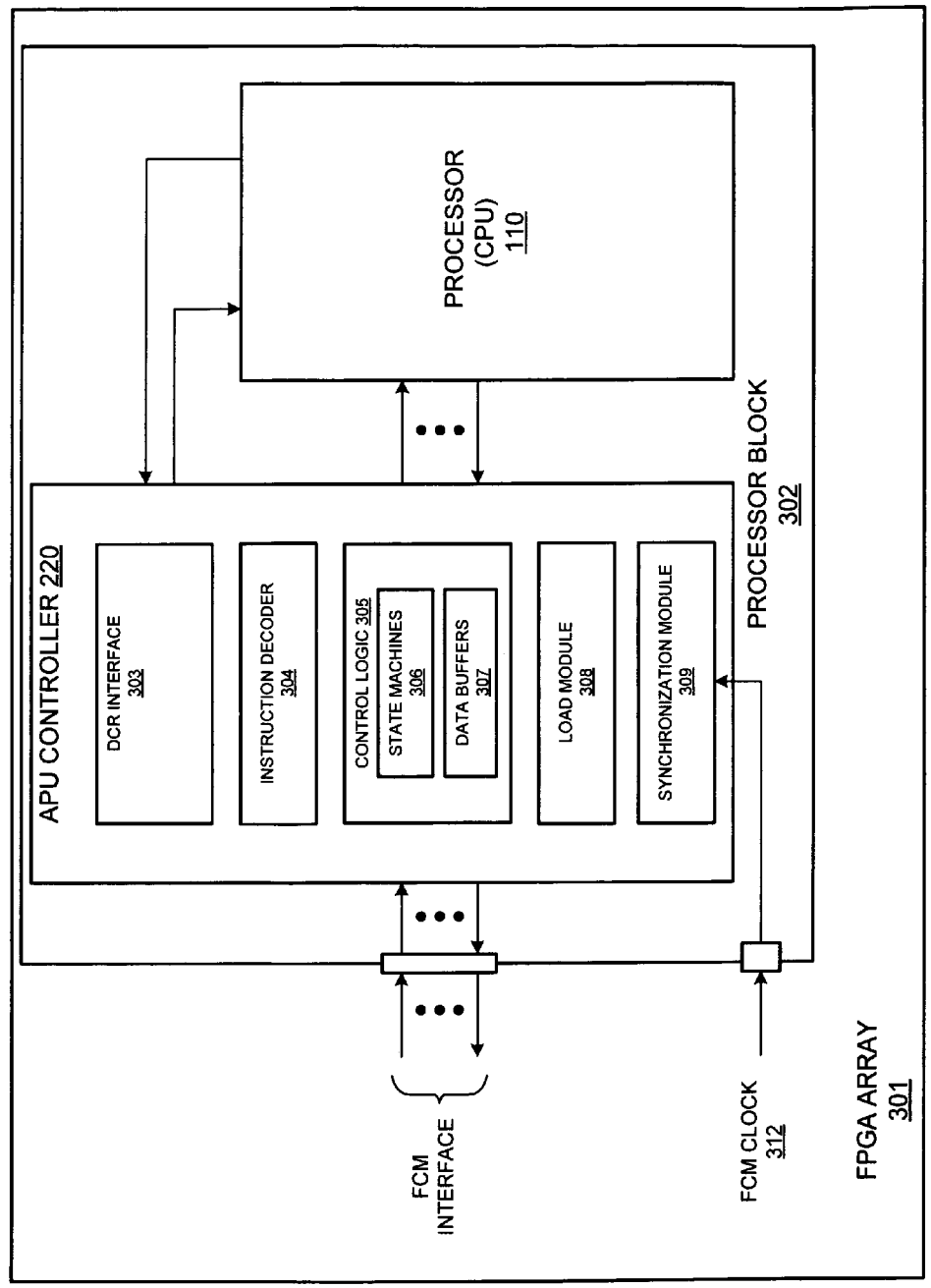
FIG. 3 is a simplified block diagram depicting an exemplary embodiment of an auxiliary processing unit ("APU") controller.

FIG. 3 is a simplified block diagram depicting an exemplary embodiment of APU controller 220. With simultaneous reference to FIGS. 2 and 3, APU controller 220 is further described. APU controller 220 and embedded processor 110, namely, central processing unit 210 ("CPU 110"), may be located in a processor block 302, which may be located in an FPGA array 301 of configurable logic.

APU controller 220 is composed of five sub-modules: a control logic block 305, decoder 304, load module 308, device control register ("DCR") interface 303, and synchronization module 309. Control logic block 305 includes state machines and hand shaking logic to and from processor 110 and FCM 230. Decoder 304 includes decode logic for FPU instructions and user-defined instructions. Load module 308 includes logic for loads. DCR interface 303 includes logic for reading and writing from and to DCR registers of processor 110 for APU controller 220. In an embodiment, DCR registers are used for user-defined instructions and as control bits for APU controller 220. Synchronization module 309 generates a pulse thereby letting APU controller 220 know the timing of the next positive edge of FCM clock signal 312.

Figure 4A:
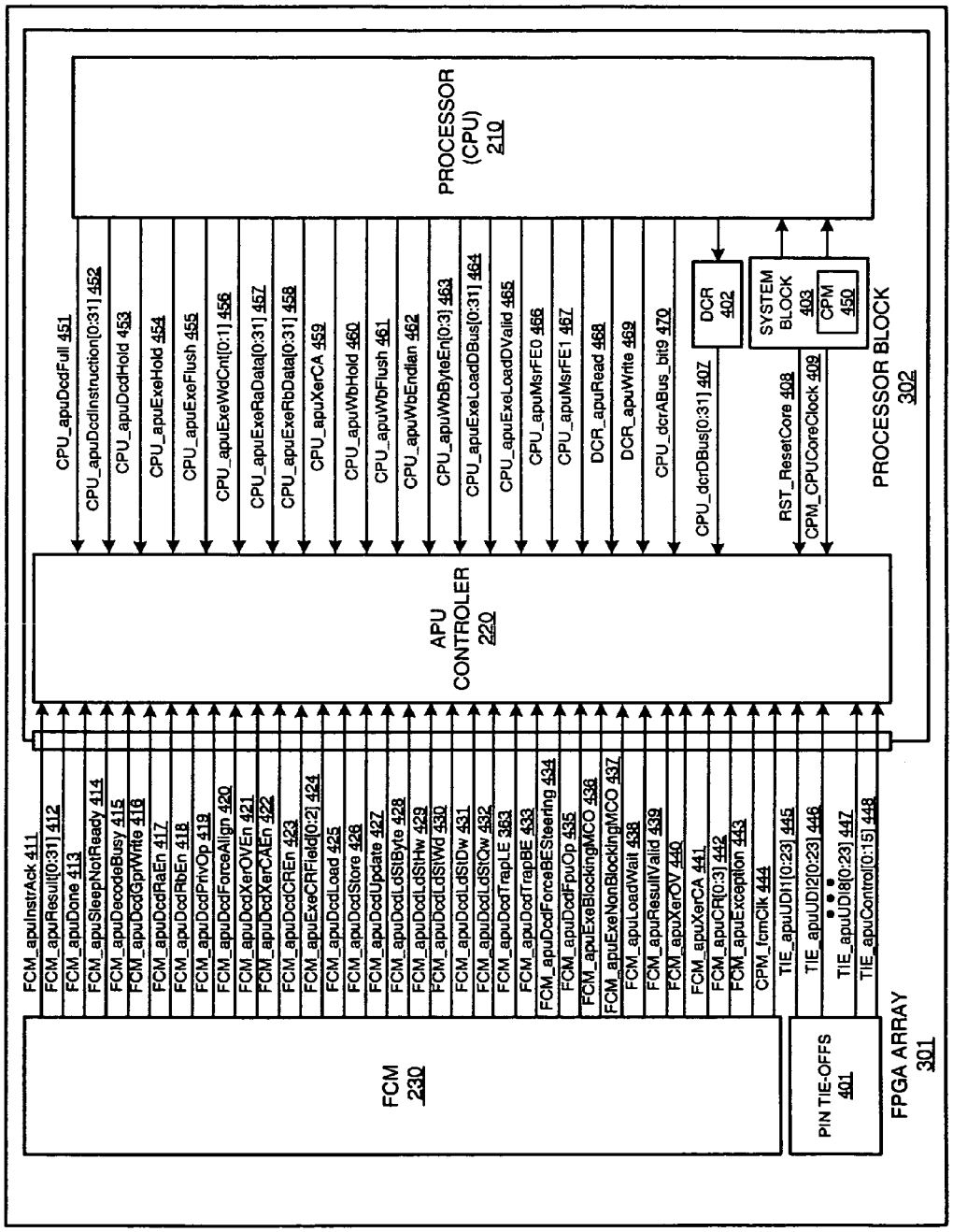
FIG. 4A is a pin-out diagram depicting an exemplary embodiment of input interfaces to an APU controller.

FIG. 4A is a pin-out diagram depicting an exemplary embodiment of input interfaces to APU controller 220. Notably, indications of bit width of signals have been provided for this exemplary embodiment. However, it should be appreciated that other bit widths may be used. Moreover, for clarity some signals are referred to in the singular, though they are provided as parallel signals.

Input signals to APU controller 220 may be provided from FCM 230, CPU 210, Pin Tie-Offs 401, DCR 402, and system block 403. System block 403 is used to generally refer to well-known system signals of an FPGA, such as for example a system clock signal and a global chip reset signal, among others. System block 403 includes Clock and Power Management ("CPM") unit 450.

In this embodiment, the following signals are provided to APU controller 220 as inputs from FCM 230: an instruction acknowledgement ("FCM_apuInstrAck") signal 411, result or store data ("FCM_apuResult[0:31]") signal 412, instruction complete ("FCM_apuDone") signal 413, still work on instruction ("FCM_apuSleepNotReady") signal 414, and decode busy ("FCM_apuDecodeBusy") signal 415.

In this embodiment following signals are provided to APU controller 220 from FCM 230 as inputs for decoder 304: write to general purpose registers ("FCM_apuDcdGprWrite") signal 416, enable operand signals ("FCM_apuDcdRaEn") 417 and ("FCM_apuDcdRbEn") 418, a privileged operation ("FCM_apuDcdPrivOp") signal 419, force alignment ("FCM_apuDcdForceAlign") signal 420, an overflow bit enable ("FCM_apuDcdXerOVEn") signal 421 and a carry-bit enable ("FCM_apuDcdXerCAEn") signal 422, condition register update enable ("FCM_apuDcdCREn") signal 423, condition register bits to be used ("FCM_apuExeCRField[0:2]") signal 424, load ("FCM_apuDcdLoad") signal 425, store signal ("FCM_apuDcdStore") 426, load/store with update ("FCM_apuDcdUpdate") signal 427, load/store byte ("FCM_apuDcdLdStByte") signal 428, load/store half-word ("FCM_apuDcdLdStHw") signal 429, load/store word ("FCM_apuDcdLdStWd") signal 430, load/store double word ("FCM_apuDcdLdStDw") signal 431, load/store quad word ("FCM_apuDcdLdStQw") signal 432, trap load/store for Big Endian ("FCM_apuDcdTrapBE") signal 433, trap load/store for Little Endian ("FCM_apuDcdTrapLE") signal 363, force Big Endian steering ("FCM_apuDcdForceBESteering") signal 434, and FPU operation code ("opcode") ("FCM_apuDcdFpuOp") signal 435.

In this embodiment, the following signals are provided to APU controller 220 as inputs from FCM 230: an execute blocking multi-cycle operation ("MCO") signal ("FCM_apuExeBlockingMCO") 436, execute non-blocking MCO ("FCM_apuExeNonBlockingMCO") signal 437, no room for load data ("FCM_apuLoadWait") signal 438, result/store data valid ("FCM_apuResultValid") signal 439, overflow result ("FCM_apuXerOV") signal 440, carry bit result ("FCM_apuXerCA") signal 441, condition register bits ("FCM_apuCR[0:3]") signal 442, instruction exception ("FCM_apuException") signal 443, and FCM clock ("CPM_fcmClk") signal 444. Clock signal 444 may be provided from CPM 450 of system block 403. For an FPGA embodiment, CPM 450 may be a digital clock manager ("DCM").

Eight user-defined instruction ("UDI") signals are provided to APU controller 220 as inputs from Pin Tie-Offs controller 401: starting from a tie-off ("TIE_apuUDI1[0:23]") signal 445, continuing with a tie-off ("TIE_apuUDI2[0:23]") signal 446, and through to a tie-off ("TIE_apuUDI8[0:23]") signal 447. A tie-off control ("TIE_apuControl[0:15]") signal 448 is provided to APU controller 220 as input from Pin Tie-Offs controller 401 to control when tie-off signals are to be used.

Following signals are provided to APU controller 220 from CPU 210 as inputs for decoder 304: an instruction is in a CPU decode stage ("CPU_apuDcdFull") signal 451, instruction bus ("CPU_apuDcdInstruction[0:31]") signal 452, and a CPU pipe on hold ("CPU_apuDcdHold") signal 453.

Following execute signals are provided to APU controller 220 as inputs from CPU 210: an execute on hold ("CPU_apuExeHold") signal 454, execute flushed ("CPU_apuExeFlush") signal 455, word count for store ("CPU_apuExeWdCnt[0:1]") signal 456, data operand signals ("CPU_apuExeRaData[0:31]") 457 and ("CPU_apuExeRbData[0:31]") 458, latch carry bit ("CPU_apuXerCA") signal 459, hold write-back ("CPU_apuWbHold") signal 460, flush write-back ("CPU_apuWbFlush") signal 461, write-back Endian ("CPU_apuWbEndian") signal 462, write-back byte enable ("CPU_apuWbByteEn[0:3]") signal 463, load data bus ("CPU_apuExeLoadDBus[0:31]") signal 464, load data valid ("CPU_apuExeLoadDValid") signal 465, and machine state register ("MSR") floating-point exception ("FE") signals ("CPU_apuMsrFE0") 466 and ("CPU_apuMsrFE1") 467.

Following decoder 304 signals are provided to APU controller 220 as device-control register ("DCR") inputs: a read ("DCR_apuRead") signal 468, write ("DCR_apuWrite") signal 469, CPU-to-DCR address bus bit nine ("CPU_dcrABus_bit9") signal 470, and from DCR, a data bus ("CPU_dcrDBus[0:31]") signal 407.

Two signals are provided to APU controller 220 as inputs from a system controller 403: a core reset ("RST_ResetCore") signal 408 and core clock ("CPM_CPUCoreClock") signal 409.

Figure 4B:
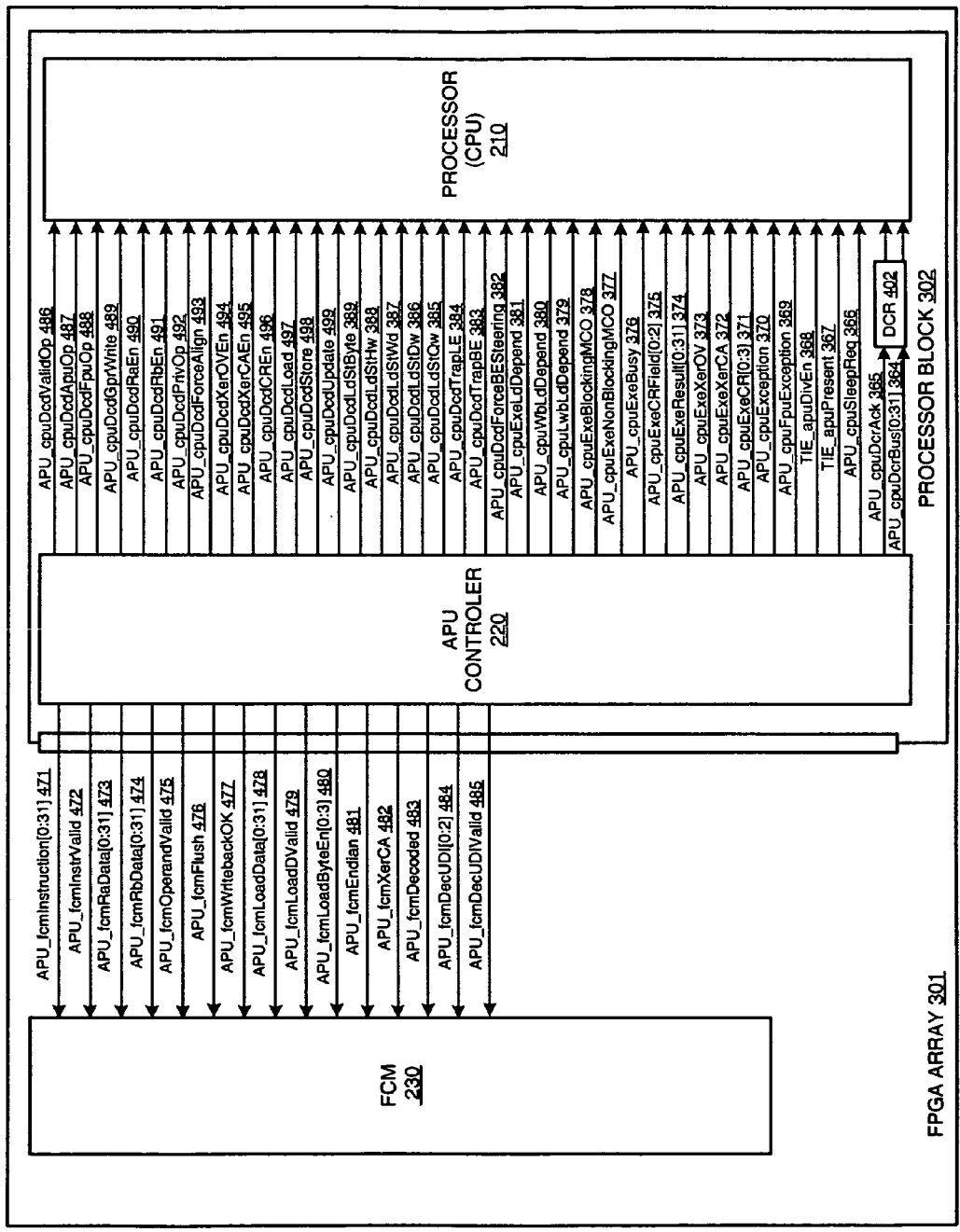
FIG. 4B is a pin-out diagram depicting an exemplary embodiment of output interfaces of an APU controller.

FIG. 4B is a pin-out diagram depicting an exemplary embodiment of output interfaces of APU controller 220. Notably, indications of bit width of signals have been provided for this exemplary embodiment. However, it should be appreciated that other bit widths may be used. Moreover, for clarity some signals are referred to in the singular, though they are provided as parallel signals.

Output signals from APU controller 220 may be provided as inputs to FCM 230, CPU 210 and to DCR 402. Some signals originating from Pin Tie-Offs 401 are forwarded from APU controller 220 as inputs to CPU 110.

In this embodiment, following signals are provided from APU controller 220 as inputs to FCM 230: an instruction bus ("APU_fcmIntruction[0:31]") signal 471, instruction valid ("APU_fcmIntrValid") signal 472, operand data signals ("APU_fcmRaData[0:31]") 473 and ("APU_fcmRbData[0:31]") 474, an operand valid ("APU_fcmoperandValid") signal 475, flush ("APU_fcmFlush") signal 476, write-back okay ("APU_fcmWriteBackOK") signal 477, load data ("APU_fcmLoadData[0:31]") signal 478, load data valid ("APU_fcmLoadValid") signal 479, load byte enable ("APU_fcmLoadByteEn[0:3]") signal 480, Endian ("APU_fcmEndian") signal 481, carry bit ("APU_fcmXerCA") signal 482, instruction decoded by APU Controller ("APU_fcmDecoded") signal 483, decoded UDI signal ("APU_fcmDecUDI[0:2]") 484, and a decoded UDI valid ("APU_fcmDecUDIValid") signal 485.

The following signals are provided from APU controller 220 to CPU 210 as inputs for decoder 304: a valid operation ("APU_cpuDcdValidOp") signal 486, APU operation ("APU_cpuDcdApuOp") signal 487, FPU operation ("APU_cpuDcdFpuOp") signal 488, general purpose register ("GPR") write ("APU_cpuDcdGprWrite") signal 489, operand enable signals ("APU_cpuDcdRaEn") 490 and ("APU_cpuDcdRbEn") 491, privileged operations ("APU_cpuDcdPrivOp") signal 492, force alignment ("APU_cpuDcdForceAlign") signal 493, overflow enable ("APU_cpuDcdXerOVEn") signal 494, carry bit enable ("APU_cpuDcdXerCAEn") signal 495, record condition enable ("APU_cpuDcdCREn") signal 496, condition register bits field ("APU_cpuExeCRField[0:2]") signal 375, load ("APU_cpuDcdLoad") signal 497, store ("APU_cpuDcdStore") signal 498, load/store update ("APU_cpuDcdUpdate") signal 497, load/store byte ("APU_cpuDcdLdStByte") signal 389, load/store half-word ("APU_cpuDcdLdStHw") signal 388, load/store word ("APU_cpuDcdLdStWd") signal 387, load/store double word ("APU_cpuDcdLdStDw") signal 386, load/store quad word ("APU_cpuDcdLdStQw") signal 385, trapping Little Endian ("APU_cpuDcdTrapLE") signal 384, trapping Big Endian ("APU_cpuDcdTrapBE") signal 383, and a force Big Endian steering ("APU_cpuDcdForceBESteering") signal 382.

The following signals are provided from APU controller 220 to CPU 210 as inputs for decoder 304: a valid operation ("APU_cpuDcdValidOp") signal 486, APU operation ("APU_cpuDcdApuOp") signal 487, FPU operation ("APU_cpuDcdFpuOp") signal 488, general purpose register ("GPR") write ("APU_cpuDcdGprWrite") signal 489, operand enable signals ("APU_cpuDcdRaEn") 490 and ("APU_cpuDcdRbEn") 491, priveledged operations ("APU_cpuDcdPrivOp") signal 492, force alignment ("APU_cpuDcdForceAlign") signal 493, overflow enable ("APU_cpuDcdXerOVEn") signal 494, carry bit enable ("APU_cpuDcdXerCAEn") signal 495, record condition enable ("APU_cpuDcdCREn") signal 496, condition register bits field ("APU_cpuExeCRField[0:2]") signal 375, load ("APU_cpuDcdLoad") signal 497, store ("APU_cpuDcdStore") signal 498, load/store update ("APU_cpuDcdUpdate") signal 499, load/store byte ("APU_cpuDcdLdStByte") signal 389, load/store half-word ("APU_cpuDcdLdStHw") signal 388, load/store word ("APU_cpuDcdLdStWd") signal 387, load/store double word ("APU_cpuDcdLdStDw") signal 386, load/store quad word ("APU_cpuDcdLdStQw") signal 385, trapping Little Endian ("APU_cpuDcdTrapLE") signal 384, trapping Big Endian ("APU_cpuDcdTrapBE") signal 383, and a force Big Endian steering ("APU_cpuDcdForceBESteering") signal 382.

The following execute signals are provided from APU controller 220 to CPU 210 as inputs: a blocking MCO ("APU_cpuExeBlockingMCO") signal 378, nonblocking MCO ("APU_cpuExeNonBlockingMCO") signal 377, busy ("APU_cpuExeBusy") signal 376, result ("APU_cpuExeResult[0:31]") signal 374, overflow bit ("APU_cpuExeXerOV") signal 373, carry bit ("APU_cpuExeXerCA") signal 372, condition register bits ("APU_cpuExeCR[0:3]") signal 371, instruction exception ("APU_cpuException") signal 370, and an FPU instruction exception ("APU_cpuFpuException") signal 369.

Two TIE signals are provided from APU controller 220 to CPU 210 as inputs: APU/FCM will execute divide instructions ("TIE_apuDivEn") signal 368 and APU present ("TIE_apuPresent") signal 367. An idle state indicator ("APU_cpuSleepReq") signal 366 is provided from APU controller 220 to CPU 210 as input. Two DCR signals are provided from APU controller 220 to DCR 402 as inputs: a decode acknowledge ("APU_cpuDcrAck") signal 365 and DCR data bus ("APU_cpuDcrBus[0:3]") signal 364.

Figure 5:
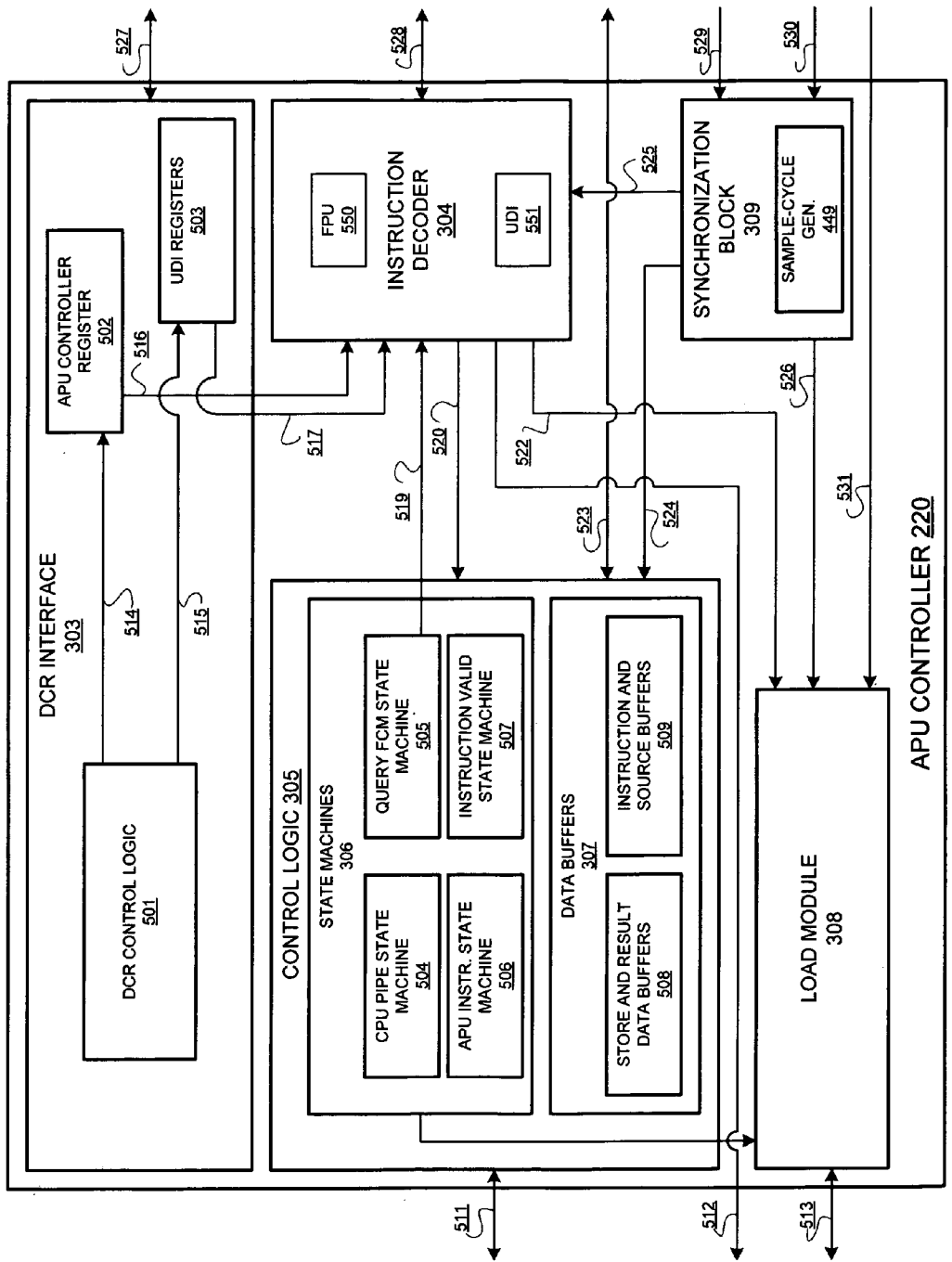
FIG. 5 is a simplified block diagram depicting an exemplary embodiment of APU controller signaling.

FIG. 5 is a simplified block diagram depicting an exemplary embodiment of APU controller 220 signaling. DCR interface 303 includes DCR control logic 501, APU controller registers 502 and UDI registers 503. Outputs 514 and 515 from DCR control logic 501 are respectively provided to registers 502 and 503. Outputs 516 and 517 respectively from registers 502 and 503 are provided to decoder 304. Output/input 527 from/to DCR interface 303 is provided to/obtained from processor 110 of FIG. 2.

Control logic block 305 includes state machines 306 and data buffers 307. State machines 306 include central processing unit ("CPU") pipeline ("pipe") state machine 504, APU instruction state machine 506, query FCM state machine 505, and instruction valid state machine 507. Data buffers 307 are for storing store and result data from FCM 230 in buffers 508, and instruction and source data to FCM 230 in buffers 509.

With reference to FIGS. 2 and 5, APU controller register 502 is one example of decode controller 290; UDI registers 503 are one example of decode registers 222; Instruction decoder 304 is one example of APU decoder 223; Control logic 305 is one example of pipeline monitor and control logic 224; and data buffers 307 and synchronization block 309 are one example of buffers and synchronization circuitry 225.

Output/input 511 from/to control logic block 305 is provided to/obtained from FCM 230 of FIG. 2, and output/input 523 from/to control logic block 305 is provided to/obtained from processor 110 of FIG. 2. Output 519 from state machines 306 is provided to decoder 304, and output 532 from state machines 306 is provided to load module 308.

Outputs 524, 525, and 526 from synchronization block 309 are respectively provided to control logic block 305, decoder 304 and load module 308. Input 529 to synchronization block 309 is from processor 110 of FIG. 2, and input 530 to synchronization block 309 is from FCM 230 of FIG. 2.

Outputs 520 and 522 are respectively provided from decoder 304 to control logic block 305 and load module 308. Output/input 512 from/to decoder 304 is provided to/obtained from FCM 230 of FIG. 2, and output/input 528 from/to decoder 304 is provided to/obtained from processor 110 of FIG. 2.

Output/input 513 from/to load module 308 is provided to/obtained from FCM 230 of FIG. 2. Input 531 to load module 308 is obtained from processor 110 of FIG. 2.

Decoder 304 of APU controller 220 decodes both FPU instructions and UDIs. FPU instructions are decoded directly in dedicated hardware of APU controller 220. Load and store UDIs are also decoded directly in APU controller 220 hardware. Any and all other UDIs may be decoded using the information in DCR registers of APU controller 220 of FIG. 2. Alternatively, an optional instruction decoder 231 of FCM 230 of FIG. 2 may be used to decode FPU instructions. Notably, APU controller 220 processes one instruction at a time.

Decoder 304 includes an FPU portion 550 and a UDI portion 551. Responsive to decoder 304 detecting an FPU instruction and an FPU Decode Disable bit not being set in a DCR control bits register 402, decoder 304 of APU controller 220 decodes an FPU instruction. However, there are three decode groups that may be turned off if desired. When turned off, an instruction in the group of instructions in the decode group turned off will not be decoded.

Synchronization block 309 includes sample-cycle generator 449. In order to know when to send signals to FCM 230 and when to latch signals from FCM 230, APU controller 220 needs to know when an edge, such as a positive edge, of an FCM clock signal occurs. This is done using a sample cycle generated by sample-cycle generator 449 of APU controller 220. In an embodiment, the sample cycle is generated 1.5 CPU clock cycles before the positive edge of an FCM clock signal. This sample cycle is latched on the positive edge of the CPU clock signal (shown in FIG. 4A as CPM_CPUCoreClock signal 409), and then used as an enable for any signal going to or coming from FCM 230. If both the APU and CPU clock signals are the same, the sample latch signal is at a high logic level. Of course, a sample cycle may be generated off a negative or falling edge instead of a positive or rising edge, and other lead clock cycle increments other that 1.5 CPU clock cycles may be used.

FIGS. 6A and 6B in combination are a table diagram depicting an exemplary embodiment of a table 600 of instructions, including without limitation operation codes ("opcodes") for FPU instructions. Table 600 includes instructions 611 for an embedded PowerPC 405 microprocessor core from IBM and an associated FPU. Notably, other known instruction sets may be used, and thus this example is merely provided for purposes of clarity by way of example.

Instructions 611 are listed for load/store D-mode 601 DES-mode 608 and X/XE-mode 609 along with their associated major operation code ("opcode") 602. The description of these instructions and their associated modes may be found in the above-referenced PowerPC architecture description from IBM. Instructions 611 are listed for arithmetic opcodes 610 along with their associated major opcode 602. Added to this listing are load 603, store 604, word 605, two words 606, and condition record 607 bit settings for each instruction. Notably, "RC" as used in listing 600 means that the condition bits for a floating-point operation, as is defined by the PowerPC architecture, are recorded in field 1 of the condition register. The RC bit is either a logic 0 or a logic 1.

The three floating-point instruction groups that may be disabled such that they are not decoded by decoder 304 of APU controller 220 ("turned off") are complex arithmetic instructions (divide and square root: fdiv, fdiv., fdivs, fdivs., fsqrt, fsqrt., fsqrts, fsqrts.), convert instructions (convert to/from word/double word: fcfid, fctid, fctidz, fctiw, fctiw., fctiwz, fctiwz.), and estimate instructions (reciprocal estimate and reciprocal square root estimate: fres, fres., frsqrte, frsqrte.). Apart from an instruction in a group that is turned off, decoder 304 of APU controller 220 decodes all other valid FPU instructions. In an implementation, at most 16 bits are compared for an FPU decode, and the instruction groups are disabled by writing a 1 to bits 9 through 11 of an APU control register.

FIG. 7A is bit position diagram depicting an exemplary embodiment of an opcode 701 for a load/store UDI. An APU instruction that is not a floating-point instruction is considered a UDI. Thus an APU which is not a floating-point instruction, is considered defined by the user's instruction set and not the instruction set of processor 110. Notably, one or more floating-point instructions may not be instantiated to be handled by FCM 230, and in an embodiment, these one or more non-instantiated floating-point instructions may be handled by software emulation as described below in additional detail.

In this embodiment, UDI opcodes are limited to those of the example formats shown in FIGS. 7A and 7B for purposes of clarity. The formats shown in FIGS. 7A and 7B are the opcodes that are to be used for load and store UDIs, and condition record UDIs, respectively. Any other UDI is defined to only have a primary opcode 000000 or 000100 and the extended opcode, in one embodiment, is not defined at all. A user writes these opcodes to UDI registers (similar to the condition record UDIs). Any UDI, except load and store UDIs, may be decoded by APU controller 220 through DCRs 402 of FIG. 4. For example, there may be 8 UDI registers and 8 DCRs in which to put UDIs. Notably, in an embodiment described below, there is only one DCR address for all eight UDI registers. However, there may be a one-to-one correspondence between DCR addresses and UDI registers. APU load/store instructions have a predefined primary opcode 711 and extended opcode 712. Because load/store instructions have predefined primary and extended opcodes, load/store instructions do not need to be written to DCRs 402.

In this implementation, a primary opcode 711 for an APU load/store instruction is 01 1111. In this implementation, the first bit position 713 in an extended opcode 712 for an APU load/store instruction is an update bit indicating that the base address register pointed by the instruction will be updated with the effective address (e.g., the effective address equals the base address plus an offset). The second, fourth and fifth bit positions 714, 716 and 717, respectively, in this exemplary extended opcode 712 are for data width, where if the second, fourth and fifth bits are: 000 then the data width is a byte; 001 then the data width is a half-word; 010 then the data width is a word; x11 quad-word (for x a logic 1 or 0); and 100 then the data width is a double word. Notably, 101 and 110 are both invalid in this implementation. The third bit position 715 is a load/store bit position, where a logic 0 indicates a load operation and a logic 1 indicates a store operation. Bit positions 718, which in this implementation are 00111, indicate the end of an extended opcode 712. Notably, primary opcodes 711 are so well defined that the entire bank of UDI registers 503 may be bypassed for execution of a UDI.

FIG. 7B is a bit position diagram depicting an exemplary embodiment of an opcode 710 for a UDI that sets a condition record field as part or all of the result of the UDI. Again, any APU instruction that is not floating-point instruction is a UDI. In this implementation, most of the opcode is defined, but the user may select four bits. UDIs that record condition ("CR") bits have a predefined primary opcode 711, which in this example is 00 0100. Thus, opcode 710 is a CR opcode, in contrast to a load/store opcode, such as opcode 701 of FIG. 7A.

UDIs that record condition bits have an extended opcode 712 that may be only partially defined and therefore the user writes a UDI using CR in DCR registers 402. In this example, opcode 712 is 1xx xx00 0110, where the x's indicate bits that are UDI bits and the remainder of the bits are predefined. If the predefined opcode portion for CR instructions is not used, the CR data will be ignored when returned from FCM 230. Accordingly, any UDI that needs to set a CR field as part or all of the result of such instruction, will use an opcode 710.

All other UDIs may have different primary opcode portions 711. For example, other UDIs may have a primary opcode value of 0 (e.g., "primary opcode 0") or primary opcode 4. For primary opcode 0, the extended opcode may be anything other than all logic 0's. For primary opcode 4, the extended opcode may be anything other than those set aside for multiply and accumulate ("MAcc") instructions. MAcc instructions are defined and executed by the instruction set of processor 110. Additional details regarding other opcodes for processor 110 a PowerPC processor core may be found in "Enhanced PowerPC Architecture" version 1.0 dated May 7, 2002 from IBM, at pages 429–437. For purposes of clarity by way of example, further reference with respect to instructions will follow the instruction set for the above-mentioned enhanced PowerPC architecture, though other process instruction sets may be used.

For each UDI written, a user specifies its execution options. The following execution options are available for each UDI: Privilege Op, Ra En, Rb En, GPR Write, XER OV, XER CA, and CR Field[0:2]. Privilege Op is an instruction executed in a privilege mode. Ra, or RA, is a field used to specify a GPR to be used as a source, or as a target in the instance of a load/store instruction with update. Rb, or RB, is a field used to specify a GPR to be used as a source. Ra En, or RA enable, is an instruction which, if asserted, causes the GPR for the Ra source to be read. Rb En, or RB enable, is an instruction which, if asserted, causes the GPR for the Rb source to be read. GPR Write is an instruction which, if asserted, causes a result to be written to GPR(s) specified.

OV is an overflow bit, which may be stored in an Integer Exception Register ("XER"). If XER Ov bit in a UDI register 720 shown in FIG. 7B is asserted, the overflow value that is sent by FCM 230 is recorded in the OV bit of the XER register inside processor 110.

CA is a carry bit which, may be stored in an Integer Exception Register. If XER CA bit in a UDI register 720 shown in FIG. 7B is asserted, the carry value that is sent by FCM 230 is recorded in the CA bit of the XER register inside processor 110.

As mentioned above, instructions may be associated with CR opcodes. If an instruction has CR opcode, for example add and record CR instruction, then CR Field[0:2] indicates which field receives the condition record data. Notably, though a three bit field [0:2] is indicated to be consistent with the example of a PowerPC processor core, other field sizes may be used. A UDI using a condition record opcode 710 may have control bits for the opcode stored in a UDI register 503.

FIG. 7C is a block diagram depicting an exemplary embodiment of a 32-bit long UDI register 720. UDI register 720 is for 32-bit UDI register used to interface to DCR 402, and thus forms a portion of the DCR interface. Notably, other formats, including without limitation other format lengths, may be used. Notably, UDI register 720 may be used to specify a UDI and its execution options through DCR 402.

In bit position zero is primary opcode bit 721 which is used to select a primary opcode. Continuing the above example, a 0 bit value for primary opcode bit 721 may refer to a primary opcode of 000000, or primary opcode 0, and a 1 bit value for primary opcode bit 721 may refer to a primary opcode of 000100, or primary opcode 4. Bit positions 1 through 11 are extended opcode bit positions 732-1 through 732-11, respectively.

Bit position 12 is a Privilege Op bit position 722, which, when a bit value of 1, indicates that a Privilege Op instruction is to be asserted for this UDI. Bit position 13 is an Ra En bit position 723, which, when a bit value of 1, indicates that an Ra En instruction is to be asserted for this UDI. Bit position 14 is an Rb En bit position 724, which, when a bit value of 1, indicates that an Rb En instruction is to be asserted for this UDI.

Bit position 15 is a GPR Write bit position 725, which, when a bit value of 1, indicates that a GPR Write instruction is to be asserted for this UDI. Bit position 16 is an XER OV bit position 726, which, when a bit value of 1, indicates that an XER OV instruction is to be asserted for this UDI. Bit position 17 is an XER CA bit position 727, which, when a bit value of 1, indicates that an XER CA instruction is to be asserted for this UDI. Notably, bit positions 740 are looked at responsive to Type bit positions 26 and 27 being bit values 0x, respectively, where x is logic 0 or 1.

Bit positions 18 through 20 are CR field bit positions 728, indicating which field will receive a condition record. Notably, bit positions 18 through 20 are looked at responsive to: Type bit positions 26 and 27 being bit values 0x, respectively, where x is either logic 0 or 1, and a CR modifying opcode. In this implementation, bit positions 21 through 25 are not used.

Bit positions 26 and 27 are Operation Type bit positions. These bit values are used to determine if a UDI is autonomous (e.g., bit values 10 for bit positions 26 and 27, respectively), blocking (e.g., bit values 00 for bit positions 26 and 27, respectively), or non-blocking (e.g., bit values 01 for bit positions 26 and 27, respectively). It is possible to set the read pointer on a DCR interface by using bit values 11 for bit positions 26 and 27, respectively, and setting a register number in bit positions 28 through 29, namely, register number bit positions 730. A register number is a UDI register number to which the read pointer is being set, such as a UDI register number to which data is being written.

Bit position 31 is an enable UDI bit position 731, which, when a bit value of 1, indicates that a valid instruction has been placed in a UDI register of UDI registers 503. This allows the UDI register to be used during a decode. The remainder of the DCR interface is described below in additional detail.

FIG. 7D is a block diagram depicting an exemplary embodiment of a 32-bit long control register 750. Notably, other formats, including without limitation other format lengths, may be used. Notably, in this implementation, DCR bit positions 1 through 4, 12 through 14, 18, 19, and 25 through 30 are unused. In other words, APU control register 750 stores DCR bits. In an implementation, there are eight UDI registers 720, and an APU control register 750 is co-located in a dedicated logic block used for DCR 402.

Control register 750 is used for decoding execution options, such as for a UDI or other FCM instruction, as well as turning on and off certain decoding functions. The first byte, namely, bit positions 0 through 7, are used to handle all reset and UDI decoding options. The second byte, namely, bit positions 8 through 15, are used to handle all FPU decoding options. The third byte, namely, bit positions 16 through 23, are used to handle all load/store execution options. Lastly, the fourth byte, namely, bit positions 24 through 31, includes tie-off ("TIE") signals to processor 110. Available options via APU control register 750 are described below in additional detail.

Bit position 1 is for a Reset UDI Registers bit 741. Responsive to a logic 1 being written to Reset UDI Registers bit 741, all the UDI registers 720 are reset to their TIE default values, and the rest of the bits in control register 750 are also reset to their TIE default values. When read, Reset UDI Registers bit 741 will always return a logic 0.

Bit position 5 is for a Load/Store Decode Disable bit 745. Responsive to assertion, Load/Store Decode Disable bit 745 disables all load/store UDI decoding in APU controller 220. Bit position 6 is for a UDI Decode Disable bit 746. Responsive to assertion, UDI Decode Disable bit 746 disables all UDI decoding in APU controller 220.

Bit position 7 is for a Force UDI Non-blocking bit 747. Responsive to assertion, Force UDI Non-blocking bit 747 forces any non-storage UDI to be executed as a Non-Blocking instruction regardless of operation type 728 indicated in the associated UDI register 720.

Bit position 8 is for an FPU Decode Disable bit 748. Responsive to assertion, FPU Decode Disable bit 748 disables all FPU decoding in APU controller 220. Bit position 9 is for an FPU Complex Arithmetic Disable bit 749. Responsive to assertion, FPU Complex Arithmetic Disable bit 749 disables decoding for all FPU divide and square root instructions (e.g., fdiv, fdiv., fdivs, fdivs., fsqrt, fsqrt., fsqrts, fsqrts.). Bit position 10 is for an FPU Convert Disable bit 751. Responsive to assertion, FPU Convert Disable bit 751 disables decoding for all FPU convert instructions (e.g., fcfid, fctid, fctidz, fctiw, fctiw., fctiwz, fctiwz.). Bit position 11 is for an FPU Estimate Disable bit 752. Responsive to assertion, FPU Estimate Disable bit 752 disables decoding for all FPU estimate instructions (e.g., fres, fres., frsqrte, frsqrte.).

Bit position 15 is for a Force FPU Non-autonomous bit 755. Responsive to assertion, Force FPU Non-autonomous bit 755 forces all non-storage FPU instructions to be executed as Non-blocking instructions.

Bit position 16 is for a Store Write-Back Okay bit 756. Responsive to assertion, Store Write Back Okay bit 756 APU controller 220 will wait to send a Write-Back Okay signal to FCM 230 for store instructions. The Write-Back Okay signal may be sent after a store instruction passes Write-Back stage 116 in the pipeline of processor 110. This may cause a slight degradation in performance when executing store instructions.

Bit position 17 is for a Load/Store Privilege bit 757. Responsive to assertion, Load/Store Privilege bit 757 causes any load or store UDI to execute in privileged mode.

Bit position 20 is for a Force Align bit 760. Responsive to assertion, Force Align bit 760 causes any load or store UDI to force word alignment.

Bit position 21 is for a Little Endian ("LE") Trap bit 761. Responsive to assertion, Little Endian Trap bit 761 causes any load or store UDI to trap when the Endian storage attribute is set (e.g., "1'b1"). Bit position 22 is for a Big Endian ("BE") Trap bit 762. Responsive to assertion, Big Endian Trap bit 762 causes any load or store UDI to trap when the Endian storage attribute is set (e.g., "1'b0"). A trap instruction causes a Trap exception (e.g. a type of program interrupt) to occur.

Bit position 23 is for a Big Endian Steering bit 763. Responsive to assertion, Big Endian Steering bit 763 causes any store UDI to force Big Endian steering.

Bit position 24 is for an APU Divide bit 764. Responsive to assertion, APU Divide bit 764 causes FCM 230 to supply the execution of divide instructions. Bit position 31 is for an APU Present bit 771. Responsive to assertion, APU present bit 771 indicates that APU controller 220 and FCM 230 are present.

If a user does not wish to use decoder 223 of APU controller 220 to decode FCM instructions, FCM instructions may optionally be decoded by FCM 230. This non-APU decoding may be accomplished in a number of ways. For example, either DCR control bits of control register 750 has UDI Decode Disable bit 746 or FPU Decode Disable bit 748 set to logic 1, or a user did not write a UDI in a UDI register 720. APU controller 220 uses a Query FCM state machine, described below in additional detail, to send an instruction unknown to APU controller 220 to FCM 230 for decoding by optional decoder 231. For example, a user may implement a UDI in FCM 230 which is not stored in UDI registers 503 of FIG. 8. Thus, by way of example, a user may support a legacy coprocessor instruction in FCM 230 which is not stored in UDI registers 503 of FIG. 8. After the instruction unknown to APU controller 220 is sent to FCM 230, APU controller 220 expects to receive an acknowledgment signal ("FCM_apuInstrAck") 411 from FCM 230 acknowledging receipt of a known instruction along with all execution options, including without limitation whether the instruction is an autonomous multi-cycle operation ("AMCO"), non-blocking multi-cycle operation ("NB-MCO"), or blocking multi-cycle operation ("BMCO") when FCM to APU decode busy signal ("FCM_apuDecodeBusy") 415 is set to a logic low value. Notably, by multi-cycle operation it is meant multiple clock cycles are used to perform the operation.

The execution options for an instruction are sent from FCM 230 to APU 220, and then these execution options are latched, or otherwise temporarily stored, by APU 220 and sent on to processor 110. If the instruction is not an instruction implemented by FCM 230, FCM 230 holds FCM_apuInstrAck signal 411 at a logic low level and holds, or otherwise retains, all the execution options associated with the instruction.

Notably, for timing on an FCM decoded store, the store data is to be valid after FCM_apuInstrAck signal 411 has been sent by FCM 230. If the store data is presented during the same clock cycle as the sending of FCM_apuInstrAck signal 411, then FCM 230 holds the store data for at least one additional clock cycle, as described below in additional detail.

APU controller 220 decodes each UDI at the speed of processor 110 on behalf of a slower operating FCM 230 instantiated in FPGA fabric. Opcodes and information for UDIs may be programmed into a set of instruction registers, namely, UDI registers, which are mapped to an IO bus of processor 110, namely, a DCR bus. UDI registers in APU controller 220 may be accessed through a DRC bus. However, rather than having the same number of addresses as registers for reading from and writing to such registers mapped to a device register bus, only one address is used to read from and write to multiple registers. This conserves address space of CPU-APU interface, as there need not be a unique address for each instruction register mapped to a processor IO bus.

To read and write multiple unique registers using a single address, a local pointer is provided to each register of the registers. Pointer information is included in data for a write to a register. Some bits in the data are thus reserved for pointer information. When writing to a register, a write interface obtains a pointer number from the data, and using such pointer number is able to write the rest of the data to the targeted register. In an embodiment, instruction data written to an instruction registers is shorter in width than bit width of the write interface. Thus, the remaining unused width may be used for pointer information bits as a pointer to the targeted register. Thus, for example, for writing to a UDI register, both data and pointer bits are included in the data provided. The address is a separate signal/bus.

Read operations differ from write operations in that there is no data sent to an address of a register. So, a read pointer register is implemented that can be initialized by writing to the same address with a desired value and setting a specific bit in the data. After initializing, the next read to the address presents the data from the expected register. The read pointer is then incremented allowing a user to read the next register on a subsequent read to the address.

Figure 8:
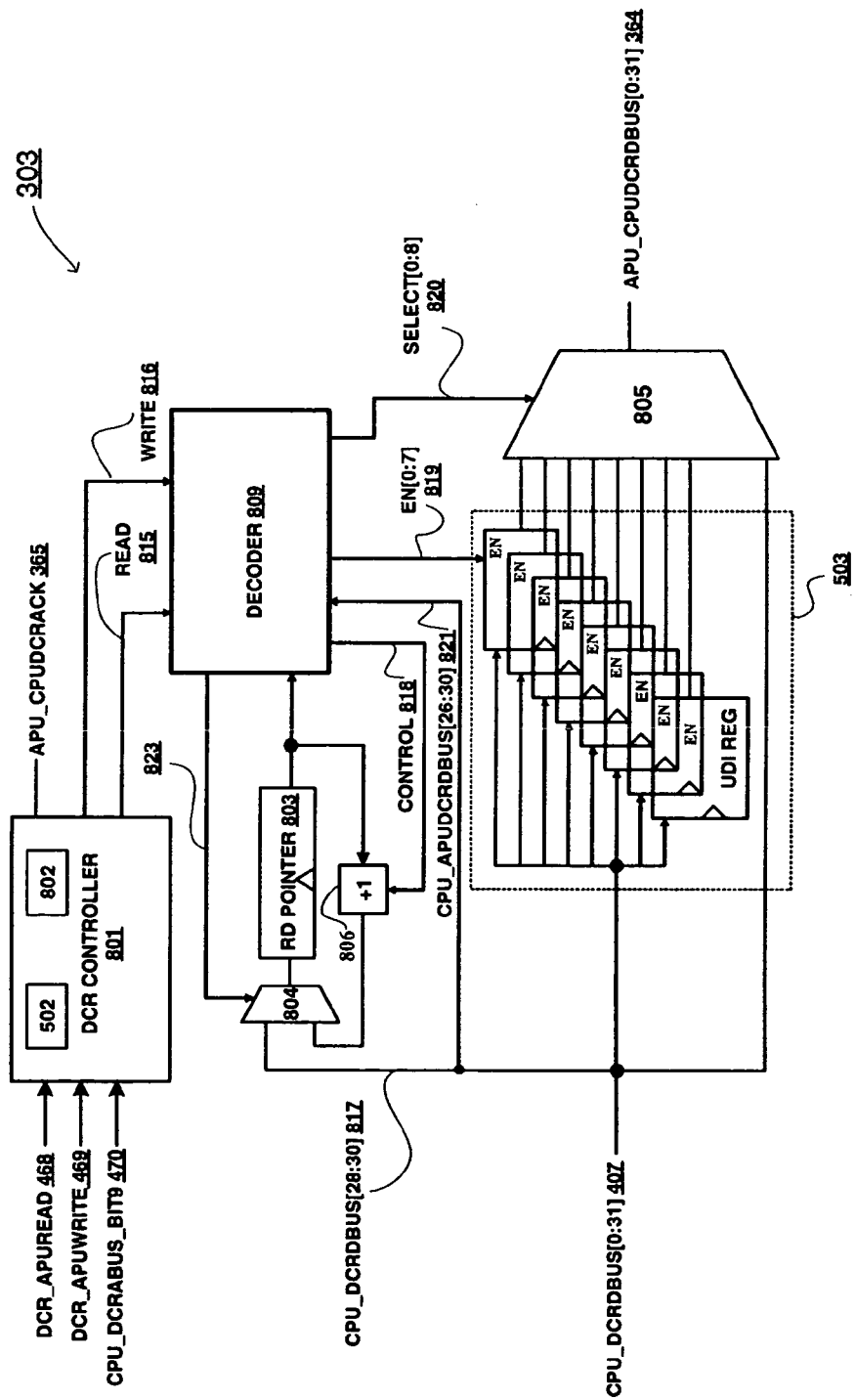
FIG. 8 is a simplified block/schematic diagram depicting an exemplary embodiment of a device control register ("DCR") interface.

FIG. 8 is a simplified block/schematic diagram depicting an exemplary embodiment of a DCR interface 303. Continuing the above example, interface 303 is a DCR read/write interface with UDI registers 503, each of which may have the same structure as UDI register 720 of FIG. 7C. Interface 303 includes DCR controller 801. DCR controller 801 is part of DCR control logic 501 of FIG. 5. Output from DCR interface 303 may be provided as input to instruction decoder 304 of FIG. 5 or APU decoder 223 of FIG. 2. Notably, though a DCR interface for a PowerPC microprocessor from IBM is shown for purposes of clarity by way of example, another input/output bus, memory bus, or other known local bus or form of memory mapped registers may be used. Examples of known local buses include without limitation a processor local bus ("PLB") and a peripheral component interconnect ("PCI") bus.

CPU_DCRDBUS[0:31] signal 407, DCR_APUREAD signal 468, DCR_APUWRITE signal 469, and CPU_D-CRABUS_BIT9 signal 470 are provided to interface 303. Interface 303 outputs APU_CPUDCRACK signal 365 and APU_CPUDCRDBUS[0:31] signal 364. Notably, herein signals are referred to in the singular for purposes of clarity, though they may be implemented in parallel and thus may be implemented as multiple signals.

APU controller 220 in this implementation has two 32-bit DCR registers, which are part of DCR controller 801. One DCR register, DCR register 802, is for writing and reading to UDI registers 503. DCR register 802 may be a virtual register, as it is used to store an address location to read to or write from. The other DCR register, DCR register 502, is for storing control bits for APU controller 220, namely, APU controller/decoder 221/223. DCR register 802 may have the format of register 750 (shown in FIG. 7D). Formats for registers 802 and 502 have previously been described, and thus are not repeated.

A read or write signal may be provided from processor 110 to DCR register 802 of APU 220 via DCR_APUREAD signal 468 or DCR_APUWRITE signal 469, respectively. An acknowledgement signal, such as APU_CPUDCRACK signal 365, may be provided to processor 110 from APU 220 to acknowledge receipt of a read or write signal by APU 220 from processor 110. A read or a write received may be provided from DCR controller 801 to decoder 809. Decoder 809 is not decoder 304 of FIG. 5.

In this implementation, read and write signals 468 and 469 are a read or write to either controller register 502 or DCR register 802 for UDI registers 503. Address bit9 signal 470 indicates which of registers 802 and 502 to read from or write to. Notably, bits 0 through 8 are mentioned below with reference to a 10-bit address bus. There could be an implementation where an address bus is sent along with read and write signals, though a more complicated decoder would be used to determine if the read/write is for a DCR interface 303 address. However, in this example, the DCR address has already been decoded. In other embodiments, signal 470 may be a complete address. It should be understood in any embodiment, a single address is used to access multiple registers. In this particular embodiment, a single DCR address is used to access multiple registers for storing UDIs.

Decoder 809 decodes a read or write, such as from read signal 815 or write signal 816, respectively, provided from DCR controller 801. Decoder 809 receives a bit used to select between two register addresses in APU controller 220. In an embodiment, CPU 110 sends out a 10-bit address bus that is decoded, where bit 0 through bit 8 are decoded externally to APU controller 220. Notably, in this embodiment, decoder 809 is configured to check for only one matching address, as all of UDI registers 503 are addressed with one address. However, there may be multiple groupings of registers, in which embodiment decoder 809 may be configured to check a received address matching one of the addresses respectively associated with groupings of registers.

In response to the decoded address, decoder 809 provides an enable signal, EN[0:7] signal 819 for the eight UDI registers 503, and a select signal, SELECT[0:8] signal 820. Enable signal 819 is used to write to a UDI register 503. Select signal 820 is provided to multiplexer 805 as a control select signal. Select signal 820 is for reading the contents of a UDI register 503.

UDI inputs to multiplexer 805 are outputs from UDI registers 503. CPU_APUDCRDBUS[0:31] signal 407 is to provided to each of UDI registers 503 for registering a UDI. CPU_APUDCRDBUS[0:31] signal 407 is provided directly to multiplexer 805 bypassing UDI registers 503. Accordingly, an enabled one of UDI registers 503 responsive to enable signal 819, having registered input from CPU_APUDCRDBUS[0:31] signal 407, may have its output selected as output APU_CPUDCRDBUS[0:31] signal 364 from multiplexer 805 responsive to select signal 820. The extra bit, namely, one bit more than the total number of UDI registers 503, in select signal 820 may be used to bypass UDI registers 503 to directly select CPU_APUDCRDBUS[0:31] signal 407 for output from multiplexer 805. When not reading from a register in DCR interface 303 logic, CPU_APUDCRBUS[0:31] signal 407 can be passed directly through DCR interface 303. UDI registers 503 are only selected by multiplexer 805 when being read.

So in this embodiment, DCR interface 303 includes eight UDI registers 503 accessible for read and write operations using a single address. Because there are eight UDI registers 503, a three bit pointer is employed. These three bits are obtained from DCR data bus signal 407 are DCR data bus bits [28:30], namely, signal 817, in this example. Two other bits are used to delineate between a write to one or more of UDI registers 503 and initializing read pointer 803. These operation delineation bits are obtained from DCR data bus 407, and in this example are DCR data bus bits [26:27]. Operation delineation bits and local pointer bits are provided from DCR data bus 407 to decoder 809 via DCR data bus signal 821.

In this implementation, there are eight UDI registers 503, though fewer or more UDI registers may be used. Rather than wasting eight DCR addresses for the eight UDI registers 503, one DCR address is used to access all of eight UDI registers.

To write to a specific UDI register 503, there are two levels of decoding. At one or a first level of decoding, a DCR address bit provided via CPU_DCRABUS_BIT9 signal 470 is used to differentiate between the UDI registers 503 and DCR register 502 and 802. In this embodiment, register 802 is a virtual register, as it is just the address location of the UDIs in APU controller 220. CPU_DCRABUS_BIT9 signal 470 is from bit nine of a DCR address bus, though another bit from the DCR address bus may be used.

At another or second level of decoding, bits in CPU_APUDCRDBUS[0:31] signal 407 indicating register number, such as register number bits 730 of FIG. 7C in a UDI, determine a target UDI register of UDI register 503. Register number bits 730 are provided via CPU_APUDCRDBUS[28:30] signal 817 as obtained from CPU_APUDCRDBUS[0:31] signal 407 and provided to multiplexer 804. CPU_APUDCRDBUS[26:30] signal 821 is obtained from CPU_APUDCRDBUS[0:31] signal 407 and provided to decoder 809. Decoder 809 decodes an incoming address and identifies the target register and the type of operation from CPU_APUDCRDBUS[26:30] signal 821. The increment by one block 806 only increments responsive to a read operation. A target register number from signal 817 may be selected for output from multiplexer 804 for input to read pointer 803. A control signal 823 is provided from decoder 809 to multiplexer 804 to select either signal 817 or output from increment-by-one block 806 as output from multiplexer 804. Output from read pointer 803 is provided to decoder 809 and as a feed back input to increment-by-one-block 806.

To read from a specific UDI register of UDI registers 503, DCR_APUREAD signal 468 and CPU_DCRABUS_bit9 are used to select UDI registers 503 in the DCR address space and the value in a read pointer 803 selects the target, namely which UDI register 503 to read. A read pointer is initialized on a write operation to read pointer logic 803; otherwise, when a read operation occurs, the read pointer is increased by one near or at the end of the read operation. Read pointer 803 may be initialized by writing a "11" to type bits 729 and then writing the register number in register number bits 730. Read pointer 803 is incremented upon every UDI read operation by one allowing a user to read all of UDI registers 503 with only one write to read pointer 803.

DCR register 502, which may be implemented like register 750 of FIG. 7D, in DCR controller 801 contains control bits for the APU controller 220. Default values are loaded into registers 502 and UDI registers 503 through TIE values sent from FCM 230. These defaults can be loaded into DCR registers 502 and 503 in either of two modes: 1) a reset signal mode ("hard reset mode"); and 2) a "1" written to reset UDI registers bit 741 in the APU control register 502 ("soft reset mode").

As mentioned above with reference to FIG. 5, there are four state machines in control logic block 305: one state machine to track an instruction in the pipeline of processor 110, one state machine for sending an instruction to FCM 230 for decoding, one state machine to determine if an APU instruction is executing in APU controller 220, and one state machine that tracks when APU controller 220 sends an instruction to FCM 230. These state machines 504 through 507 may be implemented as described below in additional detail.

Figure 9:
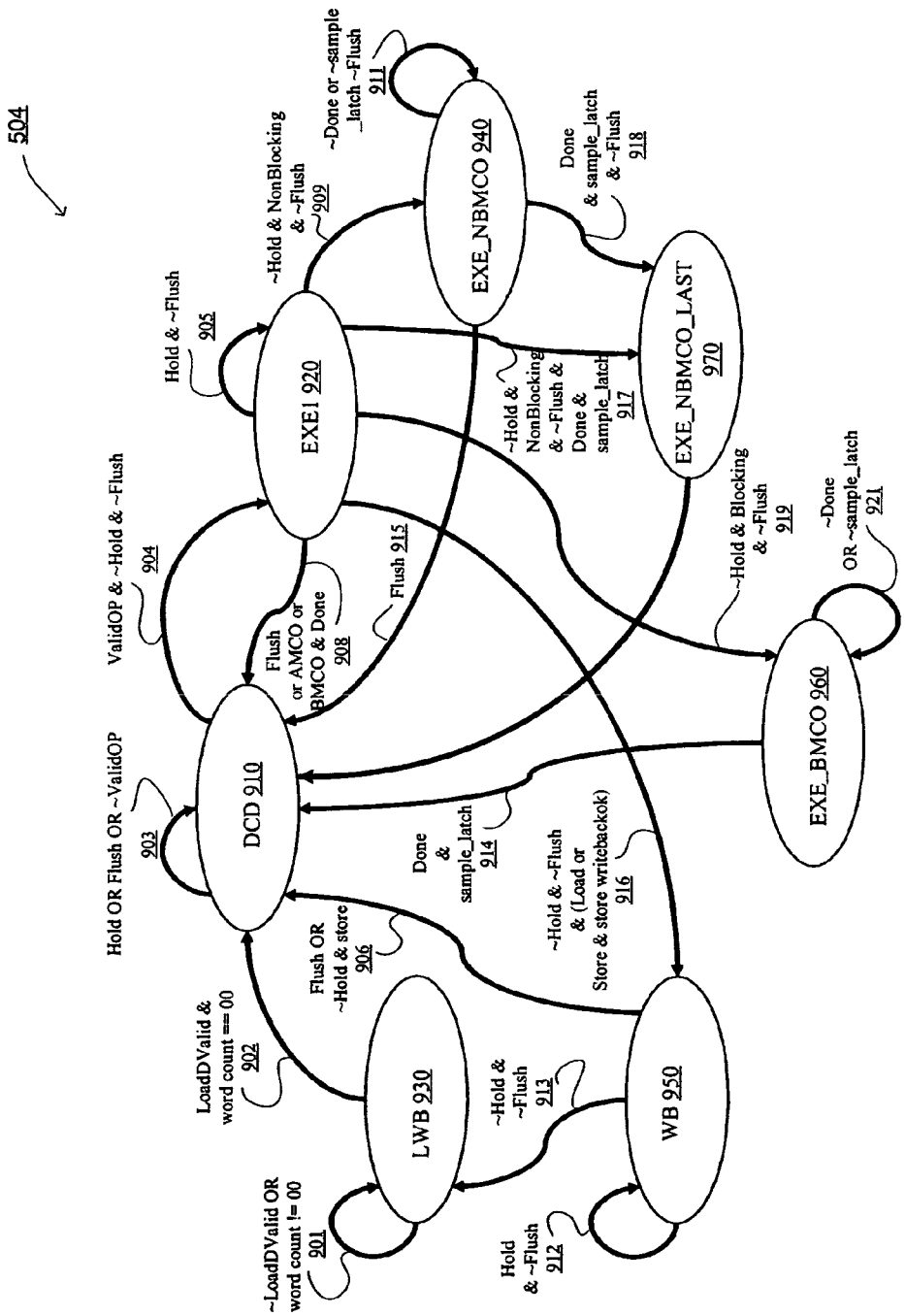
FIG. 9 is a state diagram depicting an exemplary embodiment of a central processing unit pipeline state machine ("CPU Pipe State Machine").

FIG. 9 is a state diagram depicting an exemplary embodiment of a CPU Pipe State Machine 504. CPU Pipe State Machine 504 tracks where the APU instruction, currently in APU controller 220, is located or co-located in the pipeline of processor 110. State Machine 504 is used to determine when an APU instruction is affected by a hold or flush signal. State Machine 504 is further used for latching signals from processor 110 and sending information to FCM 230. Because APU controller 220 only keeps track of an instruction while such instruction is in APU controller 220, many APU instructions will never reach Write Back state 950 or Load Write Back state 930.

Internal Register Update

With simultaneous reference to FIGS. 1, 2, 4B and 9, CPU pipeline 130 may more simply be thought of as having four stages, which in order are decode state 112, execute stage 114, write-back stage 116, and load write-back stage 117. For FCM 230 executing an instruction from processor 110 via APU controller 220, FCM 230 may, without corrupting its internal state, have to flush and re-execute the instruction. WritebackOK signal 477 is generated by APU controller 220 and provided to FCM 230 to indicate when it is safe to update any internal registers or pointers. WritebackOK signal 477 is generated by APU controller 220 responsive to location of the instruction within CPU pipeline 130. Notably, it should be appreciated that because APU controller 220 operates in lock step with CPU 110 and FCM 230 operates at a slower frequency than CPU 110, APU controller 220 generates WritebackOK signal 477.

Any instruction may safely be flushed from CPU pipeline 130 prior to execute stage 114. Thus, for example, an instruction may always be safely flushed while in decode stage 112. However, for any autonomous operation, after an instruction passes a first CPU clock cycle of execute stage 114, the instruction may not be flushed from CPU pipeline 130. For a BMCO, after an instruction passes the first CPU clock cycle of execute stage 114, the instruction may not be flushed from CPU pipeline 130. For a NBMCO, after an instruction passes the last CPU clock cycle of execute stage 114, the instruction may not be flushed from CPU pipeline 130. For a store operation, after an instruction passes write-back stage 116 for the last store word, the instruction may not be flushed from CPU pipeline 130. Lastly, for a load operation, after an instruction passes write-back stage 116 for the last load word, the instruction may not be flushed from CPU pipeline 130. The above-mentioned conditions as to when an instruction may not be flushed from CPU pipeline 130 may be referred to as "commit conditions." Furthermore, rather than stating when an instruction may not be flushed, which is controlled by processor 110, another way to express this concept is that FCM 230 can update or otherwise modify content in internal registers of FCM 230 without negative side effects on processor 110. In other words, changes may be made in such internal registers by FCM 230 without introducing differences in state between FCM 230 and processor 110.

As APU controller 220 operates at the same frequency as CPU 110, APU controller 220 can follow an instruction as it progresses through CPU pipeline 130. Based on commit conditions for different types of operations, it should be appreciated that timing as to when an instruction may be flushed is dependent on both location of the instruction within CPU pipeline 130 and the type of instruction. State Machine 900 of APU controller 220 is used to track an instruction as it progresses through CPU pipeline 130. Notably, some states of State Machine 900 at least partially correspond to stages of CPU pipeline 130. For example, decode state 910 corresponds to decode stage 112; write-back state 950 corresponds to write-back stage 116; and load write-back state 930 corresponds to load write-back stage 117. Execute stage 114 corresponds to execute states of State Machine 900, which execute states are parsed out into four separate states, namely, EXE1 state 920, EXE_NBMCO state 940, EXE_NBMCO_LAST state 970, and EXE_B-MCO state 960. By parsing execute states, it is easier to determine in which CPU clock cycle an instruction resides.

EXE1 state 920 represents the first CPU clock cycle of execute stage 114 of CPU pipeline 130 for all decoded instructions. EXE_BMCO state 960 represents the remaining CPU clock cycles after the first CPU clock cycle of execute stage 114 of CPU pipeline 130 for each BMCO. EXE_NBMCO state 940 represents the remaining CPU clock cycles after the first CPU clock cycle, except for the last clock cycle, of execute stage 114 of CPU pipeline 130 for each NBMCO. EXE_NBMCO_LAST state 970 represents the last CPU clock cycle of execute stage 114 of CPU pipeline 130 for each NBMCO. In addition to breaking up execute states, State Machine 900 differs from CPU pipeline 130 in that only store and load instructions continue to write-back state 950. In CPU pipeline 130, after execute stage 114, each executed instruction is passed to write-back stage 116.

There are several commit conditions in APU controller 220 dependent in part on operation and responsive to State Machine 900 for which WritebackOK signal 477 may be generated for indicating to FCM 230 it is safe to change internal state, and that the instruction will not be flushed. For an autonomous operation in EXE1 state 920, there may be no hold or no flush of CPU pipeline 130. For a BMCO in EXE1 state 920, there may be no hold or no flush of CPU pipeline 130. For a NBMCO in EXE_NBMCO_LAST state 970, there may be no flush of CPU pipeline 130. For a store operation in write-back state 950, there may be no hold or no flush of CPU pipeline 130. For a load operation in load write-back state 930, the last word of a load is in load write-back stage 117. Responsive to these commit conditions, APU controller 220 may assert WritebackOK signal 477 for an instruction being executed by FCM 230. Thus, FCM 230 may operate at a slower speed than CPU 110, as FCM 230 does not need to track an instruction as it progresses through pipeline stages of CPU 110. Moreover, WritebackOK signal 477 provides flexibility in FCM 230 to flush an instruction and to change internal state. Notably, in this embodiment, receiving a 1'b1 on WritebackOK signal 477 is mutually exclusive with having an instruction flushed, as FCM 230 only sends one or the other.

With continuing reference to FIG. 9, decode state ("DCD") 910 exists when an instruction is currently in CPU_apuDcdInstruction[0:31] signal 452. State Machine 504 remains in DCD state 910 for conditions 903, namely, as long as there is a pipeline hold, or as long as pipeline clearing operations ("flushes") occur, or if the instruction provided via CPU_apuDcdInstruction[0:31] signal 452 is not an operation of APU 220. Furthermore, if the instruction provided via CPU_apuDcdInstruction[0:31] signal 452 is a store instruction, State Machine 504 will remain in DCD state 910 until all the store data is received by APU controller 220 from FCM 230. Notably, "pipeline" or "pipe" as used herein refers to pipeline 130 of processor 110.

If all of conditions 904 are satisfied, namely, the pipeline is not on hold, there are no pipeline flushes occurring, and the instruction provided via CPU_apuDcdInstruction[0:31] signal 452 is a valid operation of APU 220, then State Machine 504 transitions from DCD state 910 to an initial execution ("EXE1") state 920.

EXE1 state 920 is for a first cycle of an execute for a decoded instruction. All instructions go through EXE1 state 920 provided they reach an execution stage. An instruction will remain in EXE1 state 920 for conditions 905, namely, if there are any holds due to the pipe stalling or a data dependency, and if there are no flushes of the pipe. For a double or quad word store operation, State Machine 504 remains in EXE1 state 920 until CPU_apuExeWdCnt[0:1] signal 456 has a value of logic level 0 and there are no holds for the pipeline.

From EXE1 state 920, there are five states to which transition may be made depending on which conditions are satisfied. If conditions 909 are satisfied, namely, there is no pipeline hold, and there is no pipeline flushing, and the operation is a non-blocking operation, then State Machine 504 may transition from EXE1 state 920 to execute non-blocking multiple-cycle operation ("EXE_NBMCO") state 940.

For conditions 917 being satisfied, namely, there is no pipeline hold, and the operation type is non-blocking, and there is no pipeline flushing, and execution for EXE1 state 920 is done, and the positive edge of the FCM clock signal is about to occur ("sample_latch" in this diagram is short hand for a sample_cycle signal which informs APU controller 220 that the FCM clock is about to have a positive edge), then State Machine 504 may transition from EXE1 state 920 to execute a last non-block multiple cycle operation state 970 for the instruction being processed.

For conditions 919 being satisfied, namely, there is no pipeline hold, and the operation type is blocking, and there is no pipeline flushing, then State Machine 504 may transition from EXE1 state 920 to execute blocking multiple cycle operation ("EXE_BMCO") state 960.

For conditions 916 being satisfied, namely, there is no pipeline hold, and there is no pipeline flushing, and the operation is either a load operation or a store operation with store write-back okay bit of signal 477 being set (e.g., to logic 1), then State Machine 504 may transition from EXE1 state 920 to write-back ("WB") state 950.

For conditions 908 being satisfied, namely, the execute from EXE1 state 920 is done and there is either flushing of the pipeline, or the operation type is an autonomous multiple cycle operation or a blocking multiple cycle operation and the operation has finished execution, then State Machine 504 may transition from EXE1 state 920 to DCD state 910.

In EXE_BMCO state 960, any BMCO instructions will remain here until finished executing in FCM 230. In EXE_BMCO state 960, a BMCO instruction may not be flushed from the pipeline, as a BMCO instruction is considered to still be in the execute stage in the CPU pipe. State Machine 504 remains in EXE_BMCO state 960 provided conditions 921 are satisfied, namely, blocking operation has not completely executed or a sample has not been latched. If, however, all BMCO instructions have completely executed and a sample has been latched, namely, conditions 914 have been satisfied, then State Machine 504 transitions from EXE_BMCO state 960 to DCD state 910.

For conditions 909 satisfied and an instruction completely executed for EXE1 state 920, State Machine 504 enters EXE_NBMCO state 940. In EXE_NBMCO state 940, any NBMCO instructions will remain in until finished executing in FCM 230 or flushed from the CPU pipeline. In EXE_N-BMCO state 940, an instruction is still considered to be in the execute stage in the CPU pipe. State Machine 504 remains in EXE_NBMCO state 940 provided conditions 911 are satisfied, namely, there is no flushing of the CPU pipe and either a non-blocking operation has not completely executed in FCM 230 or a sample has not been latched (e.g., a positive edge of the FCM clock signal has not been detected) in APU controller 220.

State Machine 504 transitions from EXE_NBMCO state 940 to DCD state 910 if the CPU pipe is flushed. State Machine 504 transitions from EXE_NBMCO state 940 to EXE_NBMCO_LAST state 970 provided conditions 918 are satisfied, namely, a non-blocking operation of EXE_N-BMCO state 940 has been completely executed in FCM 230, and a positive edge of the FCM clock signal is detected, and there is no flushing of the CPU pipe.

EXE_NBMCO_LAST state 970 is for the last cycle of all NBMCO instructions in the pipeline of processor 110. While in EXE_NBMCO_LAST state 970, an NBMCO instruction may be flushed from the CPU pipe during this CPU cycle. From state 970, State Machine 900 will automatically go back to DCD state 910 at the CPU clock edge, and thus no conditions hold State Machine 900 in state 970. After completing an execute for EXE_NBMCO_LAST state 970, State Machine 504 automatically transitions to. DCD state 910. In other words, other than having not completed the last cycle of all NBMCO instructions in the pipeline of processor 110, there are no conditions that cause state machine either to stay in EXE_NBMCO_LAST state 970. Furthermore, once all NBMCO instructions have completed the last CPU cycle, State Machine 504 automatically transitions from EXE_NBMCO_LAST state 970 to DCD state 910 to begin decoding the next instructions.

WB state 950 is only reached for APU load instructions and store instructions if the Store WritebackOK bit 756 is set in DCR control bits register (i.e., set to 1'b1). After EXE1 state 920, a load, and possibly a store, instruction may move to WB state 950. A load, or store, instruction remains in WB state 950 provide conditions 912 are met, namely, there is no flushing of the CPU pipe and there is a hold on the CPU pipe.

State Machine 504 transitions from WB state 950 to DCD state 910 provided conditions 906 are satisfied, namely, provided there is flushing of the CPU pipeline, or the CPU pipe is not on hold and the instruction is a store instruction.

State Machine 504 transitions to Load Write-Back ("LWB") state 930 provided conditions 913 are satisfied, namely, there is no hold on the CPU pipe and there is no flushing of the CPU pipe. LWB state 930 is only reached for APU load instructions. State Machine 504 remains in LWB state 930 provided a condition of conditions 901 is met, namely, APU controller 220 does not receive a logic high load data valid ("LoadDValid") signal 465 or word count (the "word count" shown in FIG. 9 is an internal word counter count and not CPU_apuWdCnt[0:1]. CPU_apuWd-Cnt[0:1] signal 456 is used in the execute stage for sending store data to processor 110.) does not equal 00. However, if conditions 902 are met, namely, APU controller 220 receives a logic high load data valid ("LoadDValid") signal 465 and word count equals 00, then State Machine 504 transitions from LWB state 930 to DCD state 910. In the instance of a double word or quad word load, a 2-bit down counter may be used to determine the number of LoadDValid signals 465 that must be received for the instruction to be complete.

Figure 10:
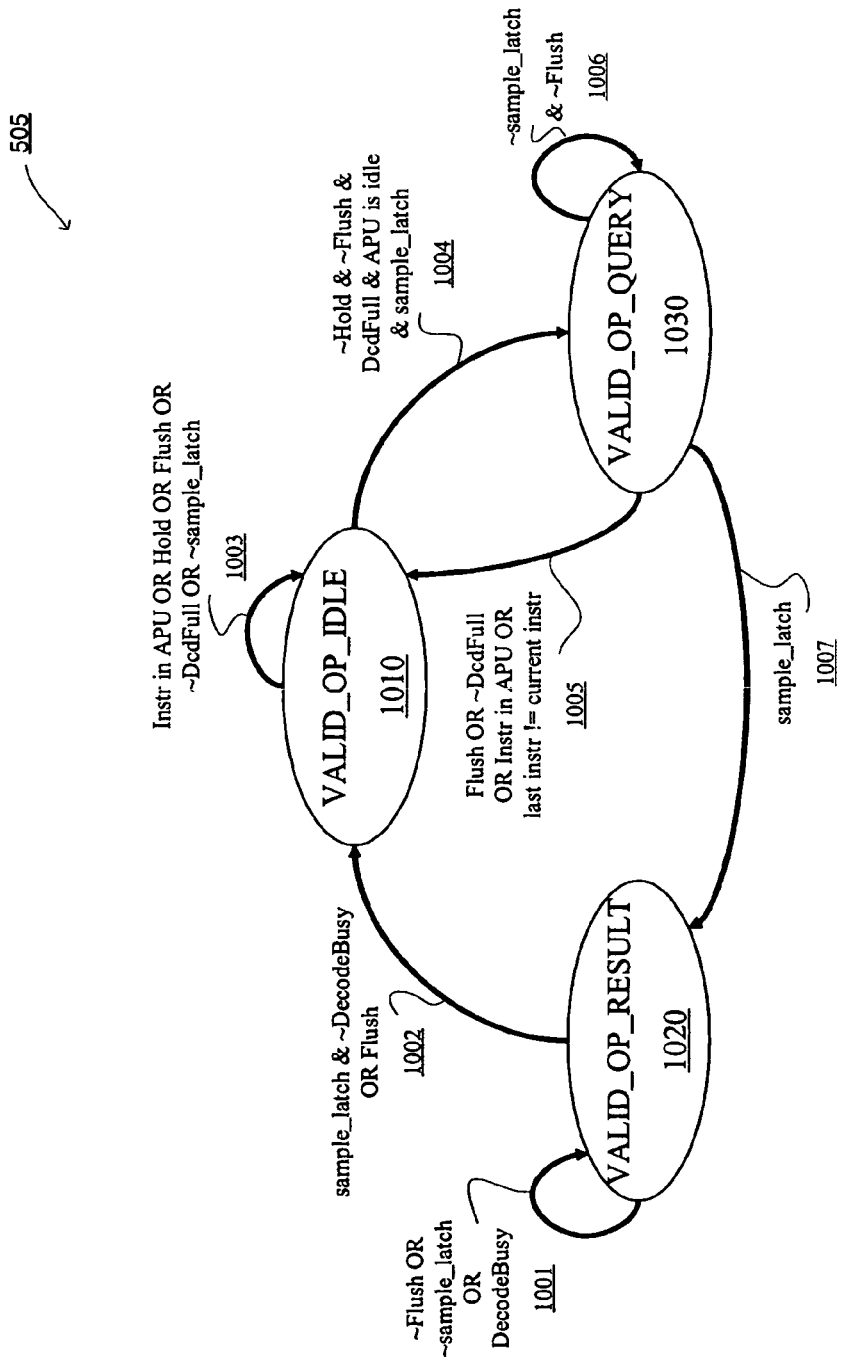
FIG. 10 is a state diagram depicting an exemplary embodiment of a query fabric coprocessor module ("FCM") state machine ("Query FCM State Machine").

FIG. 10 is a state diagram depicting an exemplary embodiment of a Query FCM State Machine 505. Query FCM State Machine 505 ("State Machine 505") is used to determine when to send an instruction to FCM 230 for decoding thereof by FCM 230. APU controller 220 may further use State Machine 505 to determine when a response from FCM 230 is expected.

Valid operation idle ("VALID_OP_IDLE") state 1010 is an idle state. State Machine 505 waits in state 1010 until APU controller 220 initiates a query of FCM 230. If any of conditions 1003 are satisfied, namely, an instruction is in APU controller 220, the CPU pipeline is on hold, the CPU pipeline is flushed, the decode stage 112 is not full, or the sample is not latched, then State Machine 505 stays in VALID_OP_IDLE state 1010. If, however, conditions 1004 are all satisfied, namely, an instruction is not in APU controller 220 (i.e., APU controller 220 is idle), the CPU pipeline is not on hold, the CPU pipeline is not flushed, the decode stage 112 is full, and the sample is latched, then State Machine 505 transitions from state 1010 to valid operation query ("VALID_OP_QUERY") state 1030.

VALID_OP_QUERY state 1030 is a state for querying FCM 230 with an instruction sitting in a decode state, such as in decode state 112 of FIG. 2. While there are no APU instructions in play in APU controller 220, FCM 230 is still queried on the next FCM clock cycle given there is an instruction in a decode state of processor 110. If conditions 1006 are satisfied, namely, a sample is not latched and processor 110 pipeline is not flushed, then State Machine 505 stays in state 1030. If, however, condition 1007 is satisfied, namely, a sample is latched, then State Machine 505 transitions from state 1030 to valid operation result ("VALID_OP_RESULT") state 1020. VALID_OP_RESULT state 1020 is a state in which a result is expected from FCM 230.

VALID_OP_RESULT state 1020 is entered one FCM clock cycle after VALID_OP_QUERY state 1030. If any of conditions 1001 is satisfied, namely, FCM_apuDecodeBusy signal 415 is busy (i.e., at a logic high level), the CPU pipeline is not flushed, or the sample is not latched, State Machine 505 will remain in state 1020. If, however, conditions 1002 are satisfied, namely, the CPU pipeline is flushed, or the sample is latched and FCM_apuDecodeBusy signal 415 is not busy (i.e., at a logic low level), then State Machine 505 will transition from state 1020 to state 1010. As part of this transition from state 1020 to state 1010, FCM 230 returns FCM_apuInstrAck signal 411 (either high or low) along with any execution options. If a different instruction (i.e., a newly received instruction to be processed, meaning the previous instruction was for processor 110 and not FCM 230) is in the decode state, such as at decode stage 112 of FIG. 2, APU controller 220 will ignore FCM_apuInstrAck signal 411 and FCM_apuDecodeBusy signal 415 from FCM 230.

Figure 11:
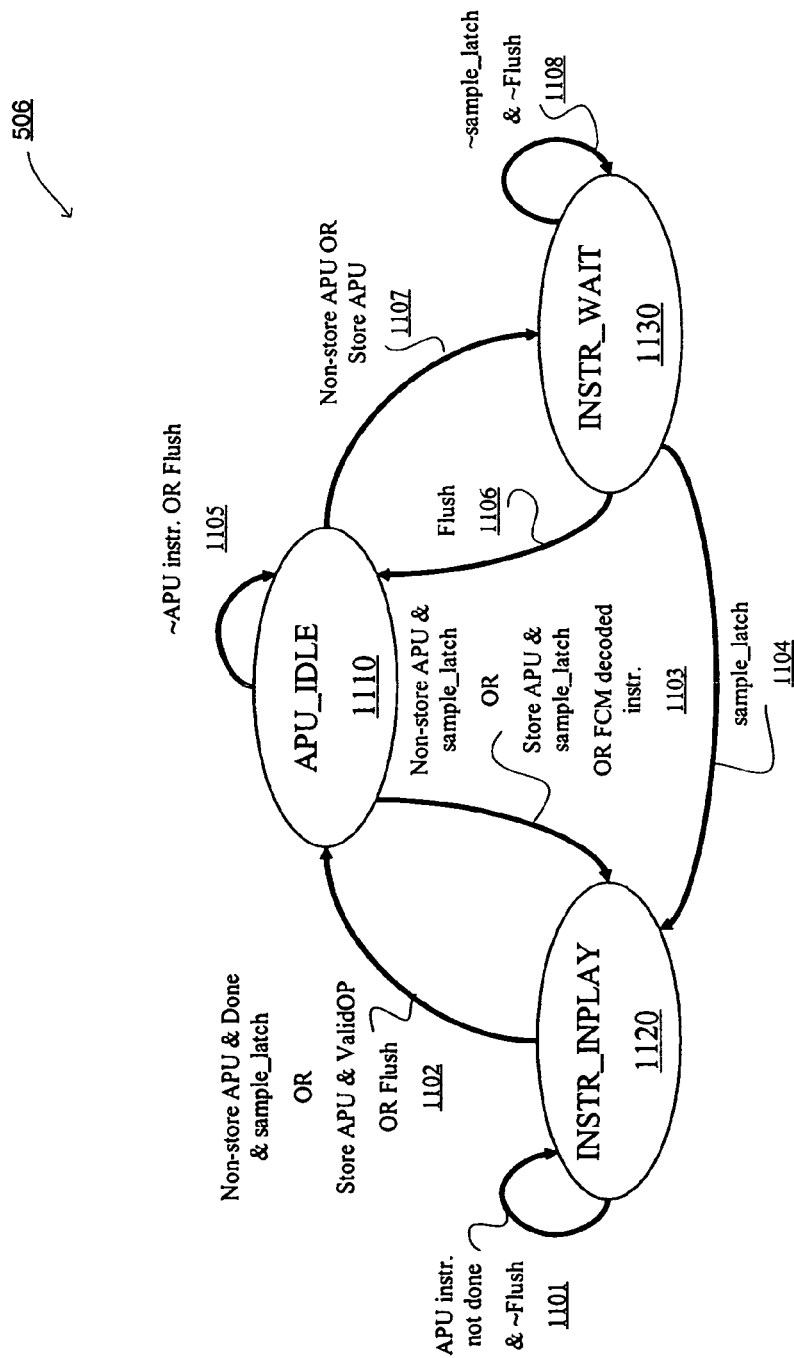
FIG. 11 is a state diagram depicting an exemplary embodiment of an APU Instruction State Machine.

FIG. 11 is a state diagram depicting an exemplary embodiment of an APU Instruction State Machine 506. APU Instruction State Machine 506 is for keeping track of when an APU instruction is currently being executed in APU controller 220. APU controller 220 can only handle one instruction at a time, so APU Instruction State Machine 506 keeps track as to whether APU controller 220 is currently working on an instruction.

APU idle ("APU_IDLE") state 1110 is an idle state of APU controller 220. APU Instruction State Machine 506 ("State Machine 506") remains in APU_IDLE state 1110 until APU controller 220 decodes an APU instruction or FCM successfully decodes an APU instruction or the CPU pipeline is flushed, namely, conditions 1105. If, however, either of conditions 1107 are satisfied, namely, an APU store or non-store instruction is received by APU controller 220, then State Machine 506 transitions from APU_IDLE state 1110 to instruction wait ("INSTR_WAIT") state 1130. In this wait state, APU controller 220 has an APU instruction and waits in INSTR_WAIT state 1130 for the next FCM clock cycle to send the APU instruction to FCM 230. Wait state 1130 is to account for a situation in which APU controller 220 decodes an instruction which has not yet been sent to FCM 230 (i.e., wait until the next FCM clock cycle to send the instruction) and another non-APU instruction, such as because of an instruction query, is sent to FCM 230 during the current FCM clock cycle.

State Machine 1130 remains in state 1130 if conditions 1108 are satisfied, namely, a sample is not latched and the CPU pipeline is not flushed. State Machine 506 transitions from state 1130 to state 1110 if the CPU pipeline is flushed, namely, condition 1106. State Machine 506 transitions from state 1130 to instruction actively being processed ("INSTR_INPLAY") state 1120 if the sample is latched, namely, condition 1104.

State Machine 506 remains in INSTR_INPLAY state 1120 when an instruction is in play. Thus, State Machine 506 remains in INSTR_INPLAY state 1120 until the APU instruction being processed completes or gets flushed from the CPU pipeline. If an APU instruction has not been completely executed and not been flushed from the CPU pipeline, namely, conditions 1101, State Machine 506 stays in state 1120. If, however, any of conditions 1102 are satisfied, namely, the instruction processed is a non-store APU instruction and has completed and the sample for it has been latched, or the instruction processed is an APU store instruction and a valid operation has been completed, or the CPU pipeline has been flushed of the instruction, then State Machine 506 transitions from state 1120 to state 1110.

State Machine 506 may transition from idle state 1110 to state 1120 provided any of conditions 1103 are satisfied. Thus, if an instruction is a non-store APU instruction and a sample thereof has been latched, or if an instruction is a store APU instruction and a sample thereof has been latched, or FCM 230 has decoded an instruction, then State Machine 506 may transition from idle state 1110 to state 1120.

Figure 12:
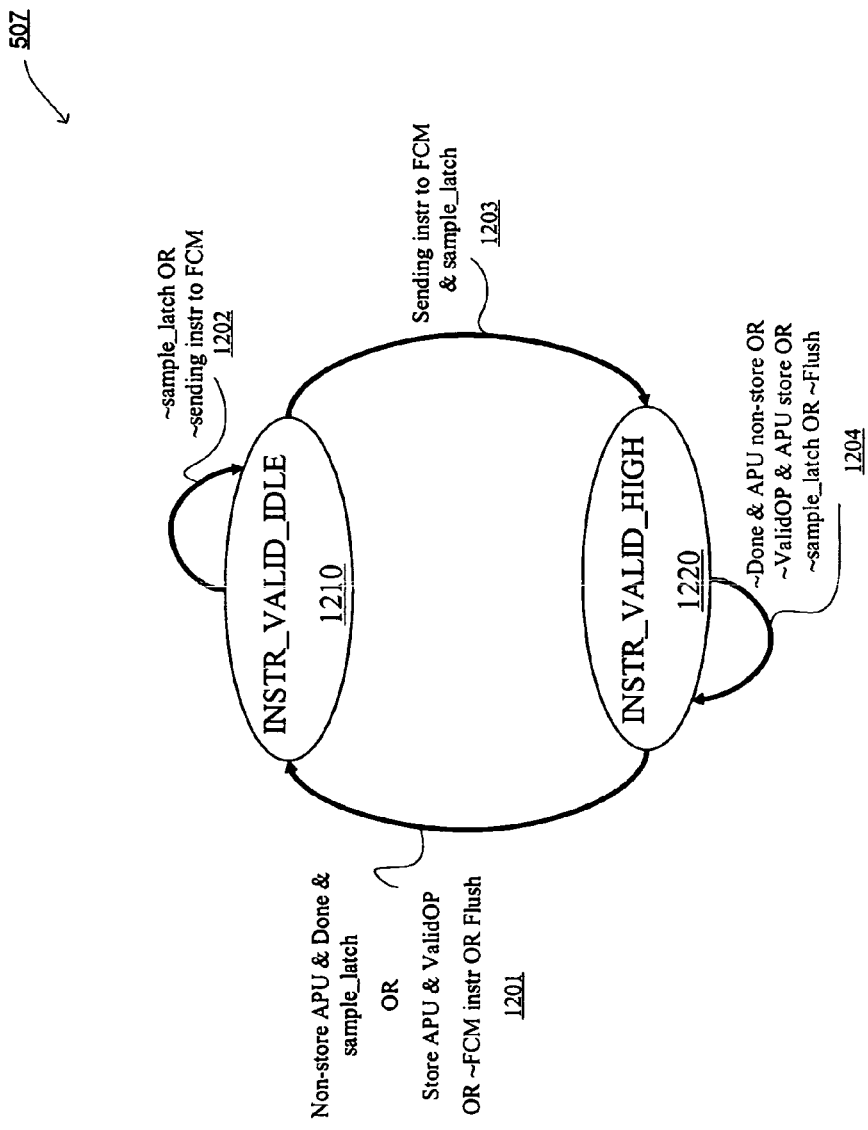
FIG. 12 is a state diagram depicting an exemplary embodiment of an Instruction Valid State Machine.

FIG. 12 is a state diagram depicting an exemplary embodiment of an Instruction Valid State Machine 507. Instruction Valid State Machine 507 keeps track of when APU controller 220 sends APU_fcmInstrValid signal 472, along with the instruction, to FCM 230. APU controller 220 keeps track of this because an instruction can only be sent once for each then current APU instruction being processed. Notably, an instruction may be sent to FCM 230 for a controller decode or a query. Basically, there are two ways to send an instruction to FCM 230, either APU controller 220 decodes the instruction for sending to FCM 230, or FCM 230 is queried to decode the instruction.

Instruction valid idle ("INSTR_VALID_IDLE") state 1210 is an idle state in which APU controller 220 has not yet sent an instruction to FCM 230. Instruction Valid State Machine 507 ("State Machine 507") remains in state 1210 provided either of conditions 1202 are satisfied, namely, a sample is not yet been latched for an instruction to be processed or an instruction has not yet been sent to FCM 230. Accordingly, State Machine 507 transitions from idle state 1210 to instruction valid ("INSTR_VALID_HIGH") state 1220 if a sample has been latched for an instruction to be processed and the instruction has been sent to FCM 230.

INSTR_VALID_HIGH state 1220 occurs when FCM 230 has received an instruction. State Machine 507 remains in INSTR_VALID_HIGH state 1220 until the instruction completes, FCM 230 determines the instruction is not an APU instruction, or the instruction is flushed from the CPU pipeline. Thus, if any of conditions 1204, namely, the instruction is an APU non-store instruction which has not been completed, or the instruction is an APU store and has not finished executing, or the sample for an instruction has not been latched, or the instruction has not been flushed from a pipeline of processor 110, are satisfied, State Machine 507 remains in state 1220. If, however, the instruction is an APU non-store instruction which has been completed and the sample for it latched, or the instruction is an APU store instruction that has been completely executed, or the instruction is not an FCM instruction, or the instruction has been flushed from a pipeline of processor 110, namely, any of conditions 1201, then State Machine 507 may transition from state 1220 to idle state 1210.

Interface to Processor

Returning to FIGS. 4A and 4B, interface signals to processor 110 are further described. All signals on the CPU-APU controller interface are clocked (or latched) on responsive to CPU clock signal, namely, CPM_CPUCore-Clock signal 409. APU_CPUExeBusy signal 376 is normally held at a logic high level. There are three main situations when APU_CPUExeBusy signal 376 is brought to a logic low level: (1) responsive to a valid instruction being decoded and being ready to execute; (2) responsive to a store instruction being completed in FCM 230 and being ready to send data to processor 110; and (3) responsive to at least the appearance of an illegal instruction located in the decode stage (e.g., Query FCM State Machine 505 is in state 1020). Notably, APU_CPUExeBusy signal 376 may be broken up into several intermediate signals one of which is flopped to help timing.

There are several execution options sent to processor 110 at or near the same time as APU_CPUExeBusy signal 376. These signals may also be sent at or near the same time as APU_CPUDcdValidOp signal 486 is sent to processor 110. Notably, APU_CPUExeLdDepend signal 381, APU_CPUWbLdDepend signal 380, and APU_CPULwbLdDepend signal 379 are all tied to zero, because APU controller 220 can have only one APU instruction in play at any given time. Therefore, APU_CPUExeLdDepend signal 381, APU_CPUWbLdDepend signal 380, and APU_CPULwbLdDepend signal 379 have no meaning for the purposes of this APU Controller implementation. If, however, more than one APU instruction were in play (i.e., being processed) at a given time, these signals 379 through 381 could be used.

APU_CPUExeResult[0:31] signal 374 is a data bus that contains the result of an APU operation. This result is sent back to processor 110 on the next CPU clock cycle after receiving the resultant data from FCM 230. This data bus also sends back any store data. The signals for APU_CPUExeXerCA (carry bit) signal 372, APU_CPUExeXerOV (overflow bit) signal 373, and APU_CPUExeCR [0:3] (condition code bits) signal 371 are also sent to processor 110 at or near the same time as APU_CPUExeResult[0:31] signal 374 are sent to processor 110.

APU_CPUSleepReq signal 366 informs processor 110 when APU controller 220 and FCM 230 can allow processor 110 to go to an idle state ("go to sleep"). APU_CPUSleepReq signal 366 remains at a logic high level unless: there is an instruction in APU controller 220, or FCM 230 is busy working on an instruction.

APU_fcmInstruction[0:31] signal 471 latches CPU_apuDcdInstruction[0:31] signal 452 in APU controller 220. APU controller 220 will only latch CPU_apuDcdInstruction [0:31] signal 452 when the instruction is going to be sent to FCM 230. There are four instances when an instruction is going to be sent to FCM 230: (1) the instruction in a decode stage is an APU operation and there is an APU sample latched for the instruction; (2) there is an APU operation, and no sample latched when in the decode stage, so a latched copy of the instruction is used; (3) there is an APU store instruction in the decode stage that is going to be sent to FCM 230; and (4) APU controller 220 is going to query FCM 230 about an instruction in the decode stage.

APU_fcmRxData[0:31] signals 473 and 474 include one signal for Ra and one signal for Rb. Operands are available from processor 110 when in EXE1 state 920 (shown in FIG. 9) and are latched for FCM 230. APU_fcmRxData[0:31] signals 473 and 474 are based on whether data is needed for the instruction and if the instruction is currently in the first cycle of execution thereof.

CPU_apuXerCA signal 459, CPU_apuWbByteEn[0:3] signal 463, and CPU_apuWbEndian signal 462 are latched and sent directly to FCM 230. CPU_apuXerCA signal 459 is for a carry-in bit from processor 110. CPU_apuWbByteEn [0:3] signal 463 is for byte enables on a load (e.g., for byte or half-word loads). Since APU controller 220 will just pass the entire word to FCM 230, FCM 230 uses byte enable bits to determine which bits are valid. CPU_apuWbEndian signal 462 is passed in the instance of a load, and indicates the Endian mode of processor 110 (e.g., a 1 is for Little Endian, and a 0 is for Big Endian).

Load_data_wX signals and load_data_validx signals (e.g., signals are APU controller 220 internal signals to load buffers and their respective valid signals. These load data signals are for holding data buffered in APU controller 220 until ready to send to send to FCM 230. Such load signals may be grouped together since they are latched at the same time. In this embodiment, there are four pairs of load_data_wX signals and load_data_validx signals, for X from 1 to 4 as there can be up to four words in APU controller 220 at one time in the event of a quad word load. However, fewer or more load data and corresponding data valid signals may be used. Load_data_wX signals latch CPU_apuExeLoadDBus[0:31] signals 464 partially responsive to CPU_apuExeLoadDValid signal 465 going to or being at a logic high level. Load_data_wX signals latch CPU_apuExeLoadDBus [0:31] signals 464 partially responsive to how many words are expected in a transfer and what is the current count of received words. A load_data_validx signal will go to a logic high level along with CPU_apuExeLoadDValid signal 465 and is partially responsive to apu_sample_latch signal (i.e., an FCM clock signal positive edge) in that a load_data_validx signal will remain high for one FCM clock cycle when FCM 230 has available space for the data for an instruction. A load_data_validx signal is further partially responsive to the number of words received and the total number of words expected. Notably, load data and load data valid signals are described below in additional detail.

CPU_apuDcdHold signal 453, CPU_apuExeHold signal 454, and CPU_apuWbHold signal 460 are sent to APU controller 230 responsive to there being a hold in the CPU pipe, and thus these signals may be used for example by CPU Pipe State Machine 504. CPU_apuDcdHold signal 453, CPU_apuExeHold signal 454, and CPU_apuWbHold signal 460 may be used for the timing of signals coming from processor 110 and signals going to processor 110. It should be noted that these signals arrive to APU controller 220 relatively late with respect the period of an CPU clock cycle. Accordingly, signal path lengths for these signals in APU controller 220 should be made short as reasonably possible.

CPU_apuExeFlush signal 455 and CPU_apuWbFlush signal 461 are sent to APU controller 220 responsive to there being a flushed instruction. It is up to APU controller 220 to determine whether to respond to a flush of the CPU pipeline. CPU_apuExeFlush signal 455 and CPU_apuWbFlush signal 461 are used when: CPU_apuExeFlush signal 455 is asserted while an APU instruction is in state 910, 920, 940 or 970 (all shown in FIG. 9), or CPU_apuWbFlush signal 461 is asserted while in state 950 (shown in FIG. 9) which only affects loads and stores when using store WritebackOK signal 477. Additional details regarding when a flush signal is sent to FCM 230 are provided below in description of an FCM interface. Notably, CPU_apuExeFlush signal 455 and CPU_apuWbFlush signal 461 are primarily used to reset state machines and other control signals in APU controller 220. Also it should be noted that CPU_apuExeFlush signal 455 and CPU_apuWbFlush signal 461 are provided relatively late signals from processor 110 relative to a current CPU clock cycle. Accordingly, signal path lengths for these signals in APU controller 220 should be made as short as reasonably possible.

APU_CPUException signal 370 and APU_CPUFpuException signal 369 are used when there is an exception in FCM 230 during the execution of a UDI or FPU instruction. FCM 230 will send FCM_apuException signal 443 in response to an instruction causing an exception. APU controller 220, in response to receipt an asserted FCM_apuException signal 443, determines whether the instruction was an FPU instruction or not and raises the appropriate signal in response to such determination. APU_CPUException signal 370 and APU_CPUFpuException signal 369 will remain high until software lowers FCM_apuException signal 443. The lowering of APU_CPUException signal 370 and APU_CPUFpuException signal 369 may be done through a DCR interface or through another APU instruction (e.g., after turning off the exception enable bit in a state machine register ("MSR")). It should be noted that in order for processor 110 to recognize an exception as an APU or FPU exception, APU_CPUException signal 370 and APU_CPUFpuException signal 369 go to a logic high level during the CPU pipe execute stage of the instruction.

Interface to FCM

With continuing reference to FIGS. 4A and 4B, the interface to FCM 230 is described. All signals on the FCM-APU controller interface are clocked (or latched) responsive to the CPU clock signal CPM_CPUCoreClock 409 of processor 110 and use the clock signal CPM_fcmClk 444 of FCM 230 as an enable signal.

APU_fcmInstrValid signal 472 lets FCM 230 know when the instruction on APU_fcmInstruction[0:31] signal 471 should be examined. APU_fcmInstrValid signal 472 goes to a logic high level responsive to either of the following conditions: a valid APU instruction decoded by APU controller 220 or APU controller 220 ready to query FCM 230 with an unknown instruction. APU_fcmInstrvalid signal 472 will remain at a logic high level for a full FCM clock cycle as long as FCM_apuDecodeBusy signal 415 is at a logic low level. If FCM_apuDecodeBusy signal 415 is at a logic high level, APU_fcmInstrValid signal 472 will remain at a logic high level until FCM_apuDecodeBusy signal 415 goes to a logic low level. APU_fcmInstrValid signal 472 uses an APU sample latch signal as an enable signal.

APU_fcmDecoded signal 483 informs FCM 230 that the instruction being presented on APU_fcmInstruction[0:31] signal 471 was decoded by APU controller 220. APU_fcmDecoded signal 483 is for instances where there is an FPU coupled to processor 110 that only uses a subset of the instructions decoded by APU controller 220. APU_fcmDecoded signal 483 allows FCM 230 to send an exception if FCM 230 receives an asserted APU_fcmDecoded signal 483 but is unable to decode the associated instruction sent. APU_fcmDecoded signal 483 decodes instructions in parallel with the other decode control signals.

APU_fcmDecUDI[0:2] and APU_fcmDecUDIValid signals 484 and 485, respectively, are used responsive to APU controller 220 decoding an instruction. APU_fcmDecUDI[0:2] signal 484 send the number of the UDI register 503 that matches the instruction. Again, though three bits are used, fewer or more bits may be used depending on the number of UDI registers 503 implemented. APU_fcmDecUDIValid signal 485 is set at a logic high level responsive to a UDI matching the then current instruction.

APU_fcmoperandValid signal 475 informs FCM 230 when operands for a given instruction are valid. The operands are considered valid from processor 110 when the instruction is in the first cycle of an execute and there are no holds or flushes of the CPU pipeline. Depending on when sample latch signal (e.g., an enable signal provided using the FCM clock signal) is asserted, APU_fcmoperandValid signal 475 will be sent immediately or at the next FCM clock cycle.

APU_fcmWritebackOK signal 477 informs FCM 230 when FCM 230 may alter FCM registers. In other words, before APU_fcmWritebackOK signal 477 is asserted, FCM 230 should be able to restart the instruction without a problem. APU_fcmWritebackOK signal 477 is asserted responsive to any one of four conditions: (1) the instruction is a NBMCO instruction and is currently in the last cycle of an execute and no CPU pipeline flushes have arrived; (2) the instruction is a BMCO or AMCO instruction, the instruction is in the first cycle of an execute, and no CPU pipeline holds or flushes have arrived; (3) a user has set the store WritebackOK control bit 756 and a store instruction is in WB state 950 (shown in FIG. 9) with no CPU pipeline holds or flushes; or (4) a load instruction is in the last WB state 930 (shown in FIG. 9) with no CPU pipeline holds or flushes. In the instance of a multi-word load, APU controller 220 waits until the last word has passed WB state 950 of FIG. 9. WritebackOK signal 477 will remain at a logic high level for one FCM clock cycle. In certain situations with an NBMCO followed by an AMCO or BMCO and a large clock ratio, WritebackOK signal 477 can be scheduled to be sent at the same time for both instructions, namely, either NBMCO and AMCO back-to-back instructions or NBMCO and BMCO back-to-back instructions. In these instances, APU controller 220 will send two back-to-back WritebackOK signals 477, one for each of the instructions. FCM 230 determines which WritebackOK signal 477 refers to which instruction.

APU_fcmFlush signal 476 is sent to FCM 230 responsive to an APU, or FPU, instruction in APU controller getting flushed due to a flush of the CPU pipeline. This can happen because another CPU instruction further along in the CPU pipeline gets flushed, or in the instance of a load or store APU instruction where there is a "TLB miss." A "TLB miss" is described in more detail in a publication entitled "Enhanced PowerPC Architecture" version 1.0 dated May 7, 2002 from IBM, which is incorporated by reference herein in its entirety. APU controller 220 will only send a flush signal, such as APU_fcmFlush signal 476, if APU controller 220 has already sent the then current instruction to FCM 230. APU_fcmFlush signal 476 is sent in place of a APU_fcmWritebackOK signal 477. Notably, in the instance of an APU store instruction, there is normally no APU_fcmFlush signal 476, or no APU_fcmWritebackOK signal 477, sent since the store instruction is essentially finished before a TLB miss could occur.

In an embodiment, FCM 230 is configured such that it alters FCM registers during a store, such as like in a pointer for a first-in, first-out buffer ("FIFO"), where a user can set a control bit, namely, store WritebackOK control bit 756 shown in FIG. 7D, that will force FCM to wait for a APU_fcmWritebackOK signal 477, or an APU_fcmFlush signal 476. This will prevent APU controller 220 from beginning a new instruction until the APU_fcmWritebackOK signal 477, or APU_fcmFlush signal 476, has been completely processed through APU controller 220.

FCM_apuResult[031] signal 412 and FCM_apuResultValid signal 439 are used to send back data, either a result or store data, to APU controller 220. For example, for data on a 32-bit bus of FCM_apuResult[031] signal 412, FCM_apuResultValid signal 439 is at a logic high level when the data on the bus is valid. FCM_apuResult[031] signal 412 and FCM_apuResultValid signal 439 can occur during the same cycle as FCM_apuDone signal 413. During this same cycle, APU controller 220 should receive FCM_apuXerCA (carry bit), FCM_apuXerOV (overflow bit), and FCM_apuCR (condition record bits). APU controller 220 will only use FCM_apuResult[031] signal 412 and FCM_apuResultValid signal 439 responsive to a sample latch occurring, which is also applicable to the other signals listed in this paragraph.

FCM_apuDone signal 413 is sent to APU controller 220 responsive to an instruction being completed in FCM 230. FCM_apuDone signal 413 resets many of the state machines in APU controller 220, as previously described. In the instance of an autonomous instruction, FCM_apuDone signal 413 means that FCM 230 can receive another instruction. With FCM 230, APU controller 220 only uses FCM_apuDone signal 413 responsive to a sample latch occurring.

FCM_apuLoadwait signal 438 allows FCM 230 to hold APU controller on a load. If there is not any room for the load data to be registered in FCM 230, FCM_apuLoadWait signal 438 will be held at a high logic level. FCM_apuLoadWait signal 438 will remain a high logic level until there is space for the data transfer to FCM 230. FCM_apuLoadWait signal 438 will then go to a logic low level and accept the load data. With FCM 230, APU controller 220 only uses FCM_apuLoadWait signal 438 responsive to a sample latch occurring.

FCM_apuInstrAck signal 411 is sent to APU controller 220 responsive to FCM 230 decoding an instruction. FCM_apuInstrAck signal 411 is sent on the FCM clock cycle after FCM 230 receives a query instruction, such as the instruction on APU_fcmDcdInstruction[0:31] signal 471 while APU_fcmInstrValid signal 472 is asserted, as long as FCM_apuDecodeBusy signal 415 is at a logic low level. Otherwise FCM_apuInstrAck signal 411 will not be valid until FCM_apuDecodeBusy signal 415 is at a logic low level. If FCM_apuInstrAck signal 411 is asserted, the then current instruction is an APU instruction. If the then current instruction is not an APU instruction, FCM_apuInstrAck signal 411 should be set to a logic low level. If the instruction was decoded by APU controller 220, namely, APU_fcmDecoded signal 483 was at a logic high level when APU_fcmInstrValid signal 472 was at a logic high level, there is no need to send FCM_apuInstrAck signal 411. However, if FCM_apuInstrAck signal 411 is sent and APU controller 220 already decoded the instruction, FCM_apuInstrAck signal 411 will simply be ignored by APU controller 220. If FCM 230 is decoding an instruction, FCM 230 sends all execution options to APU controller 220 at the same time FCM 230 sends APU_fcmInstrValid signal 472. With FCM 230, APU controller 220 only uses FCM_apuInstrAck signal 411 responsive to a sample latch occurring.

FCM_apuDecodeBusy signal 415 is used when FCM 230 decodes an instruction. There are at least two timings for FCM_apuDecodeBusy signal 415. First, FCM_apuDecodeBusy signal 415 can remain low until FCM 230 receives APU_fcmInstrValid signal 472. On the next FCM clock cycle, FCM_apuDecodeBusy signal 415 can be raised until FCM 230 has finished decoding the instruction. This allows for more than one FCM clock cycle of decode. The second timing option is if FCM 230 is busy such that it cannot even latch the instruction. In this instance, FCM_apuDecodeBusy signal 415 must be at a logic high level before or during the same clock cycle as APU_fcmInstrValid signal 472 is asserted. In this situation, APU_fcmInstrValid signal 472 will remain at a logic high level until FCM 230 responds with a lowered FCM_apuDecodeBusy signal 415 indicating that the execution options were decoded.

FCM_apuSleepNotReady signal 414 informs APU controller 220 that FCM 230 is still working on an instruction. FCM_apuSleepNotReady signal 414 is used to determine when APU_CPUSleepReq signal 366 will be at a logic high or low level. With FCM 230, APU controller 220 only uses FCM_apuSleepNotReady signal 414 responsive to a sample latch occurring.

Figure 13:
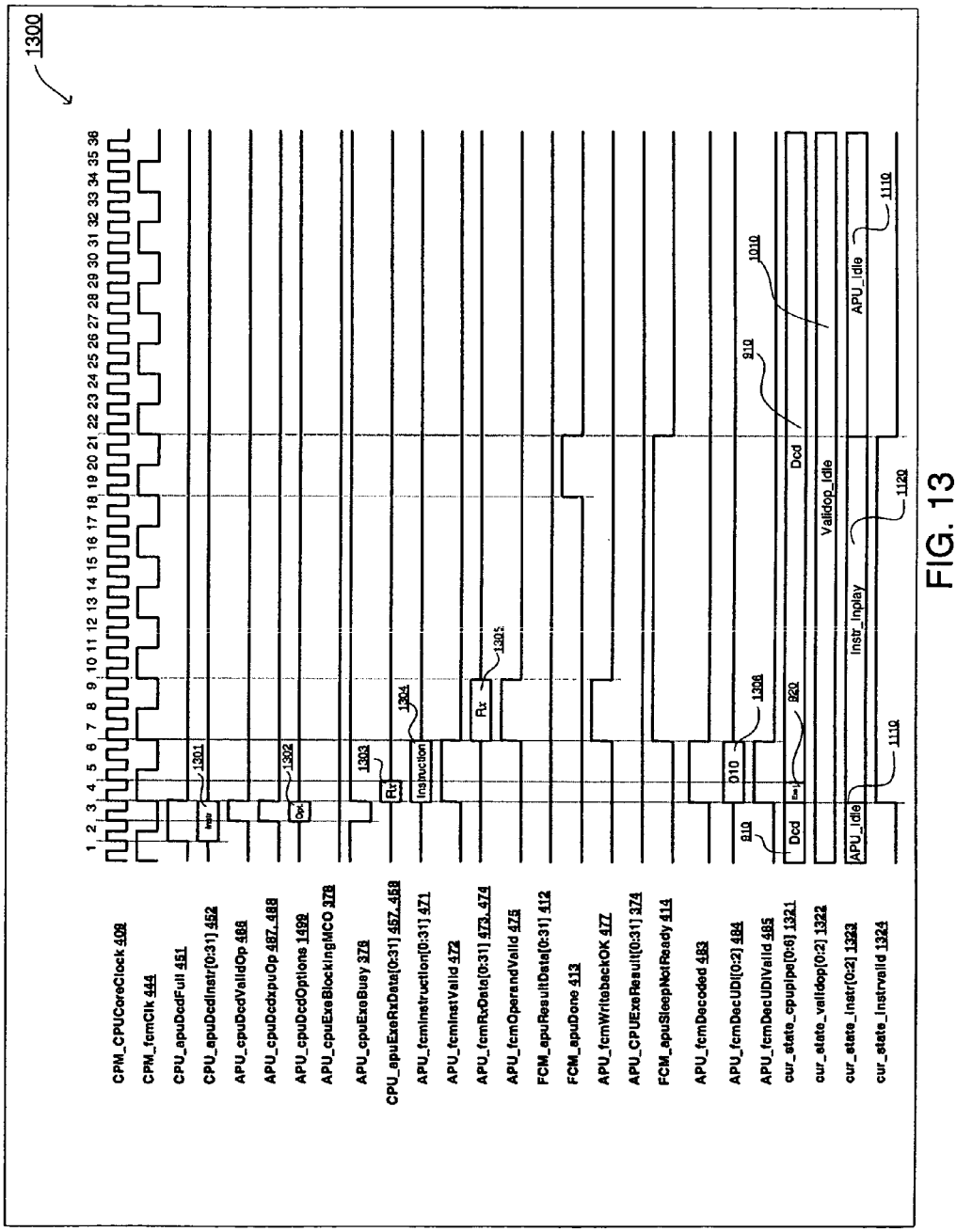
FIG. 13 is a signal timing diagram depicting an exemplary embodiment of an autonomous multi-cycle operation ("AMCO") instruction decode by an APU controller.

FIG. 13 is a signal timing diagram depicting an exemplary embodiment of an AMCO instruction decode 1300 by APU controller 220. Notably, CPU clock signal 409 is about three times the frequency of FCM clock signal 444. It should be further noted that signals from CPU 110 to APU controller 220 and from APU controller 220 to CPU 110 are clocked responsive to edges of clock signal 409. However, signals from FCM 230 to APU controller 220 and from APU controller 220 to FCM 230 are clocked responsive to edges of clock signal 444.

An instruction 1301 is provided via CPU_apuDcdInstr[0:31] signal 452. Signals 485 and 486 are pulsed to indicate that instruction 1301 is a valid FPU instruction, and busy signal 376 is pulsed to indicate that APU controller 220 is not busy. Options 1302, if any, are provided via option signal 1499. Notably, options signal 1499 is short hand to refer to signals 382 through 389 and 489 through 499 of FIG. 4B, namely, to represent all the decode option signals, as all decode option signals use the same timing. These events take place while: a current state of the CPU pipeline, as indicated via cur_state_cpupipe[0:6] signal 1321, is in decode state 910; a current state for a valid operation, as indicated via cur_state_validop[0:2] signal 1322, is in valid operation idle state 1010; a current state of instruction, as indicated via cur_state_instr[0:2] signal 1323, is in APU idle state 1110; and a current state of instruction validity is inactive as indicated via cur_state_instrvalid signal 1324 being logic low.

For a UDI, Ra or Rb data 1303 is provided via signal 457 or 458, respectively, to be executed by APU controller 220. A UDI instruction 1304 associated with data 1303 is provided from APU controller 220 to FCM 230 via signal 471. APU controller 220 indicates to FCM 230 that instruction 1304 is decoded and valid by pulsing signal 483 and 472, respectively. UDI instruction 1304 may be decoded to provide the UDI register number that was decoded 1306 from APU controller 220 to FCM 230 via signal 484, which is indicated as valid via pulsing signal 485.

During receipt of data 1303 from CPU 110, APU controller 220 is in EXE1 state 920 as indicated via signal 1321. After receipt of data 1303, APU controller 220 transitions to decode state 910. During this interval, signal 1322 indicates that APU controller 220 is in valid operation idle state 101 and signal 1323 indicates that APU controller 220 is in instruction in-play state 1120.

APU controller 220 provides Ra or Rb data 1305 to FCM 230 via signal 473 or 474, respectively. To indicate that the operand data 1305 is valid, APU controller 220 pulses signal 475 which is provided to FCM 230. APU controller 220 indicates to FCM 230 that write-backs are okay during this data 1305 interval via pulsing signal 477. While FCM 230 is processing an instruction, FCM 230 informs APU controller 220 that it is not ready to go to an idle state via holding signal 414 at a logic high state. When FCM 230 is done processing an instruction, as indicated by FCM 230 pulsing signal 413 which is provided to APU controller 220, signal 414 will be allowed to transition to a logic low level and signal 1323 will indicate that APU controller goes from instruction in-play state 1120 to APU idle state 1110.

It should be appreciated that the timing diagram here is for handshaking or handing-off operations. Thus, for example, after data 1303 is received by APU controller 220 from CPU 110 in a clock cycle of a CPU clock lying in an FCM clock cycle, the data is handed off as data 1305 on a next FCM clock cycle. The same hand-off operation is done for instruction 1301 to instruction 1304.

Figure 14:
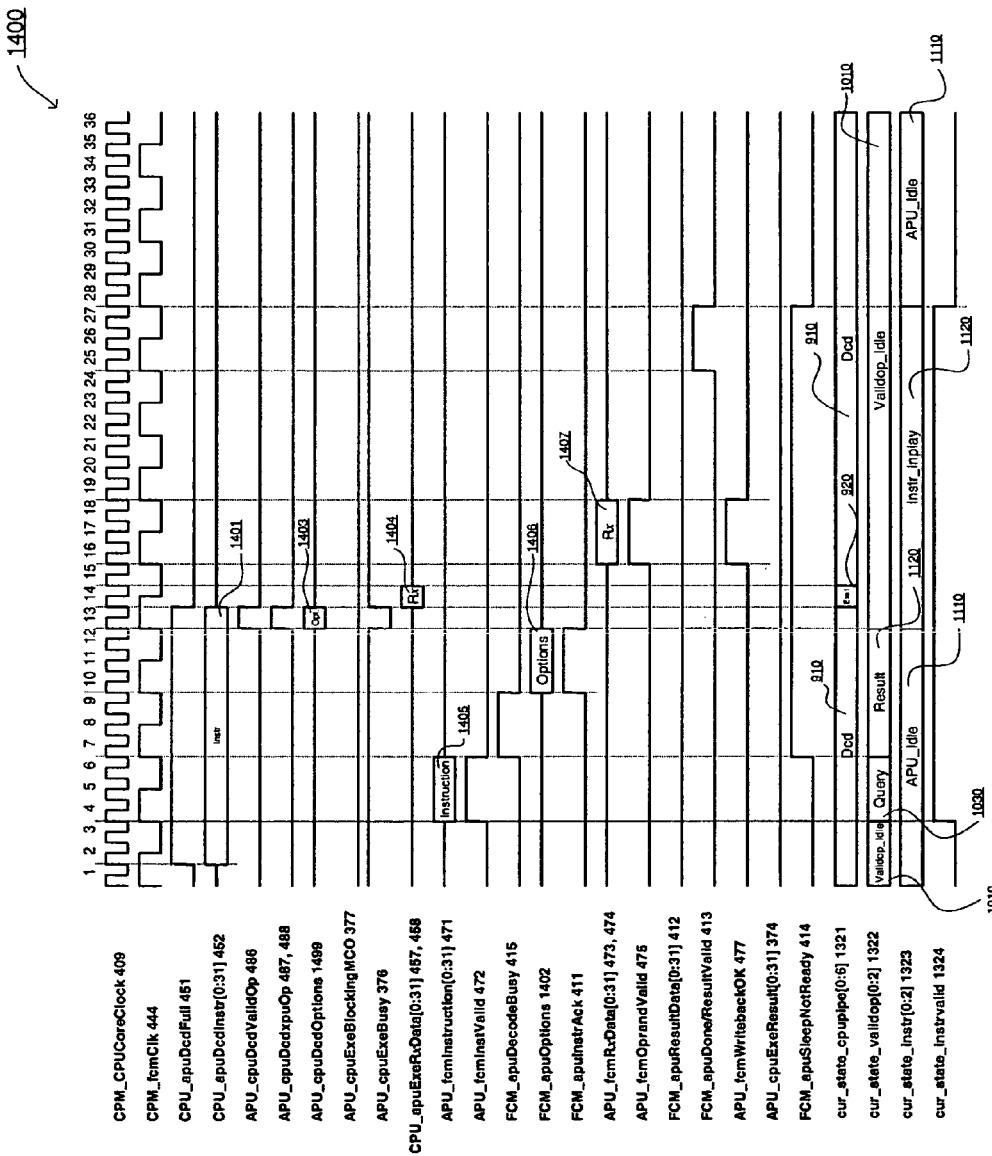
FIG. 14 is a signal timing diagram depicting an exemplary embodiment of an AMCO instruction decode by an FCM.

FIG. 14 is a signal timing diagram depicting an exemplary embodiment of an AMCO instruction decode 1400 by FCM 230. Notably, CPU clock signal 409 is about three times the frequency of FCM clock signal 444. It should be further noted that signals from CPU 110 to APU controller 220 and from APU controller 220 to CPU 110 are clocked responsive to edges of clock signal 409. However, signals from FCM 230 to APU controller 220 and from APU controller 220 to FCM 230 are clocked responsive to edges of clock signal 444.

FCM_apuOptions 1402 is used to represent signals 416 through 437 of FIG. 4A, namely, to represent all the execution option signals, as all execution option signals use the same timing. An instruction 1401 is sent to APU controller 220 from CPU 110. On the following FCM clock cycle, instruction 1405 is sent to FCM 230 to decode, and Query FCM State Machine 505 moves to query state 1030 and Instruction Valid State Machine 507 goes to instruction valid high state 1220. On the next FCM clock cycle, State Machine 505 moves to result state 1020 and decode busy signal 415 is at a logic high level. Responsive to decode busy signal 415 transitioning to a logic low level, instruction acknowledgement signal 411 is pulsed at a logic high level along with any FCM execution, namely, FCM_apuOptions signal 1402 and Current Instruction State Machine 506 moves to instruction in-play state 1120. On the next FCM clock cycle, APU controller 220 responds to CPU 110 that the instruction being processed is a valid instruction, pulses execution busy signal 376, and sends execution options 1403. The source data is received and sent to FCM 230 (as in example above) and CPU Pipeline State Machine 504 moves to EXE1 state 920. FCM 230 sends a done instruction via signal 413 to APU controller 220.

Again, any decoded options 1403 are provided from APU controller 220 to CPU 110 via decoded options signal 1499, and Ra or Rb data 1404 is provided from CPU 110 to APU controller 220 via signal 457 or 458, respectively. Moreover, any options 1406 are provided from FCM 230 to APU controller 220 via options signal 1402, and Ra or Rb data 1407 is provided from APU controller 220 to FCM 230 via signal 473 or 474, respectively.

Figure 15:
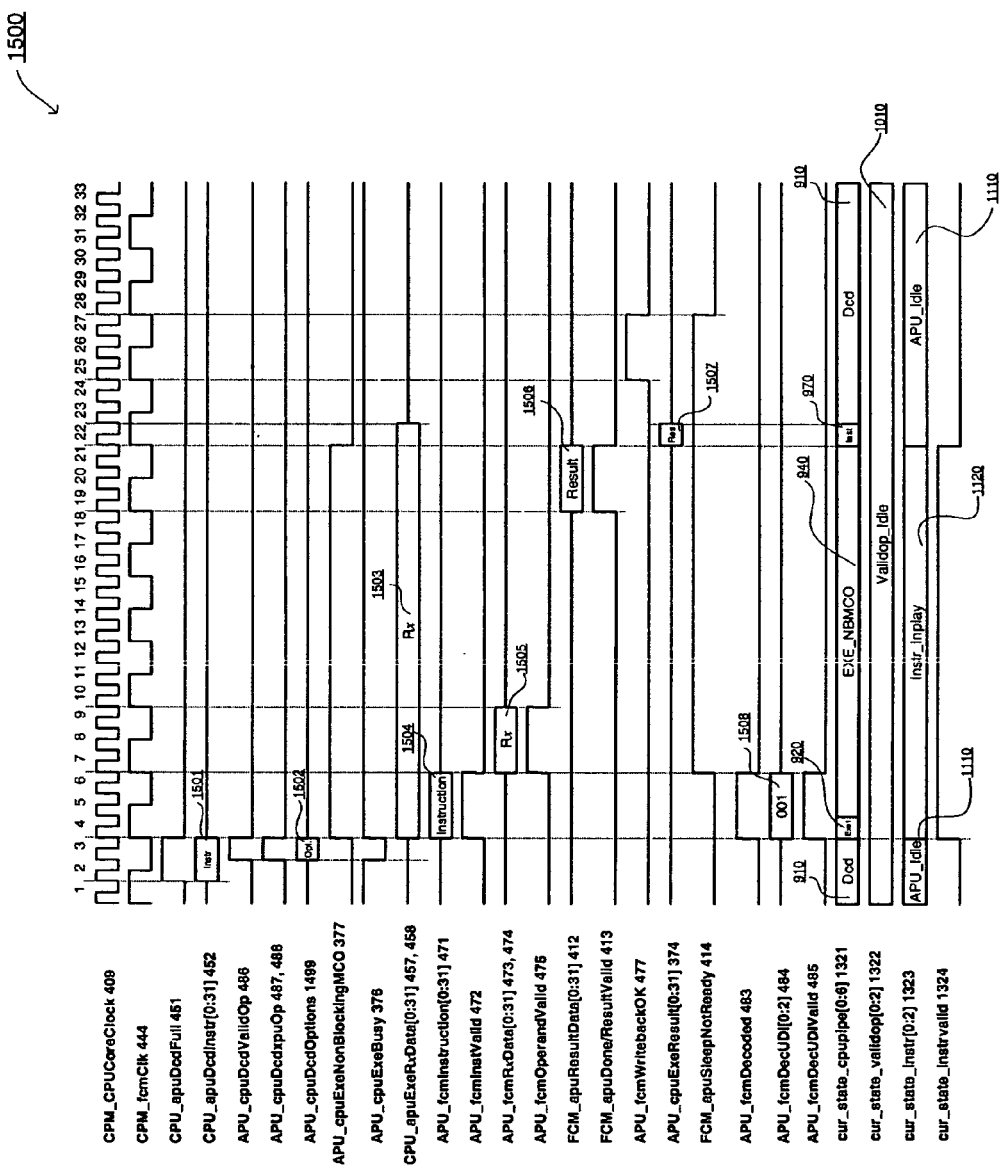
FIG. 15 is a signal timing diagram depicting an exemplary embodiment of a non-blocking multi-cycle operation ("NB-MCO") instruction decode by an APU controller.

FIG. 15 is a signal timing diagram depicting an exemplary embodiment of an NBMCO instruction decode 1500 by APU controller 220. Notably, CPU clock signal 409 is about three times the frequency of FCM clock signal 444. It should be further noted that signals from CPU 110 to APU controller 220 and from APU controller 220 to CPU 110 are clocked responsive to edges of clock signal 409. However, signals from FCM 230 to APU controller 220 and from APU controller 220 to FCM 230 are clocked responsive to edges of clock signal 444. Notably, an NBMCO instruction decoded by APU controller 220 is similar to an AMCO instruction decoded by APU Controller 220 as described with reference to FIG. 13. Some notable differences are CPU Pipeline State Machine 504 goes from EXE1 state 920 to EXE_NBMCO state 940 and then to EXE_NBMCO_LAST state 970. APU controller 220 provides a UDI index via signal 484 to FCM 230. Also, FCM 230 returns a result 1506 and WritebackOK signal 477 arrives after result 1507 has been passed to CPU 110 via signal 374.

Again, an instruction 1501 is passed from CPU 110 to APU controller 220, which is processed to provide instruction 1504 passed from APU controller 220 to FCM 230 via signal 471. Any decoded options 1502 are provided from APU controller 220 to CPU 110 via decoded options signal 1499, and Ra or Rb data 1503 is provided from CPU 110 to APU controller 220 via signal 457 or 458, respectively. Moreover, Ra or Rb data 1505 is provided from APU controller 220 to FCM 230 via signal 473 or 474, respectively.

Figure 16:
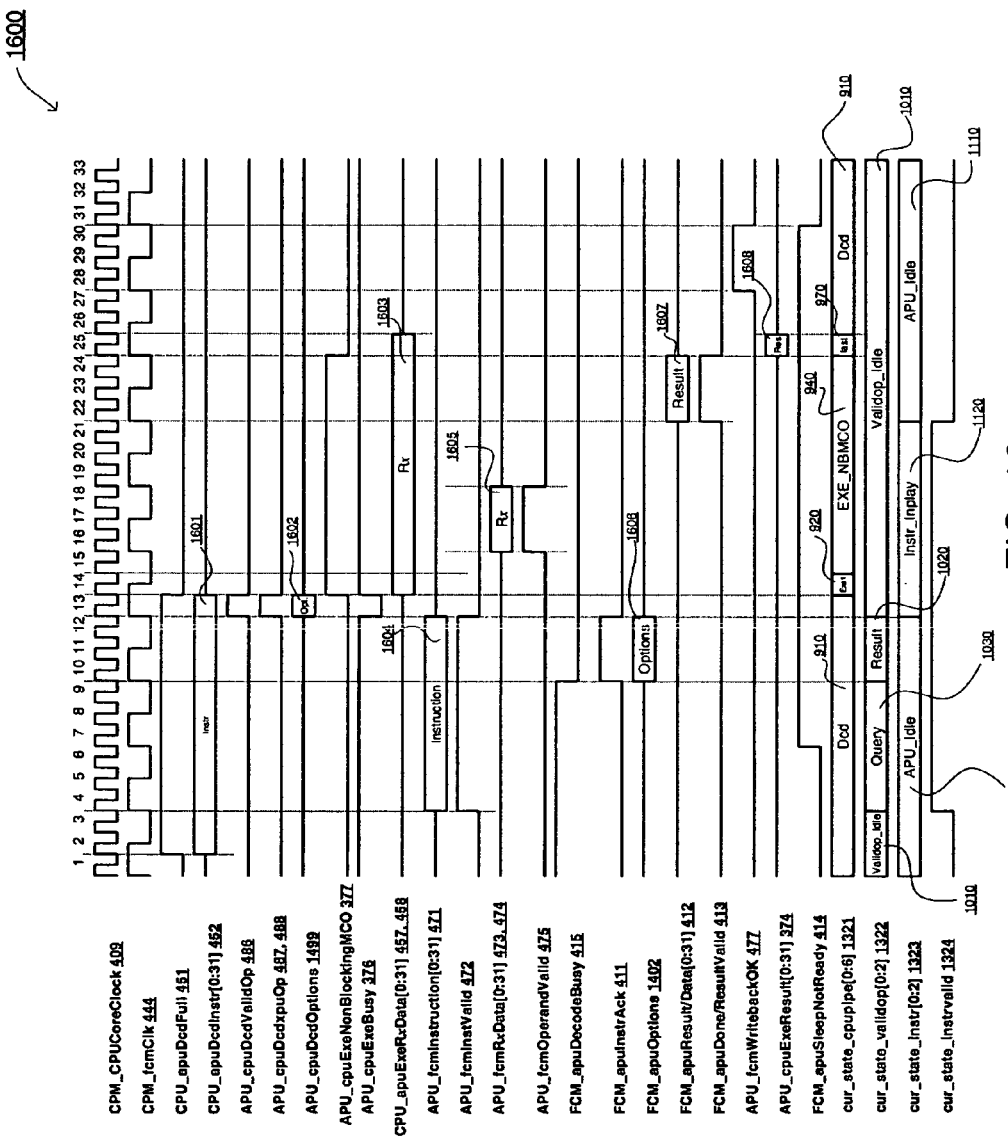
FIG. 16 is a signal timing diagram depicting an exemplary embodiment of an NBMCO instruction decode by an FCM.

FIG. 16 is a signal timing diagram depicting an exemplary embodiment of an NBMCO instruction decode 1600 by FCM 230. Notably, CPU clock signal 409 is about three times the frequency of FCM clock signal 444. It should be further noted that signals from CPU 110 to APU controller 220 and from APU controller 220 to CPU 110 are clocked responsive to edges of clock signal 409. However, signals from FCM 230 to APU controller 220 and from APU controller 220 to FCM 230 are clocked responsive to edges of clock signal 444. Decoding of an NBMCO instruction by FCM 230 is similar to decoding of an AMCO instruction by FCM 230 of FIG. 14 with the NBMCO execution once recognized. Notable differences are DecodeBusy signal 415 is at a logic high level to start, and so InstrValid signal 472, after transitioning to a logic high level responsive to instruction 1604, stays at a logic high level until DecodeBusy signal 415 goes to a logic low level. Once APU controller 220 responds to CPU 110, the description is the same as above with reference to FIG. 14.

Again, an instruction 1601 is passed from CPU 110 to APU controller 220, which is processed to provide instruction 1604 passed from APU controller 220 to FCM 230 via signal 471. Any decoded options 1602 are provided from APU controller 220 to CPU 110 via decoded options signal 1499, and Ra or Rb data 1603 is provided from CPU 110 to APU controller 220 via signal 457 or 458, respectively. Moreover, Ra or Rb data 1605 is provided from APU controller 220 to FCM 230 via signal 473 or 474, respectively, and options 1506 are provided via signal 1402 from FCM 230 to APU controller 220. Results 1607 are passed from FCM 230 to APU controller 220 via signal 412, and processed to provide results 1608 which are passed from APU controller 220 to CPU 110 via signal 374.

Figure 17:
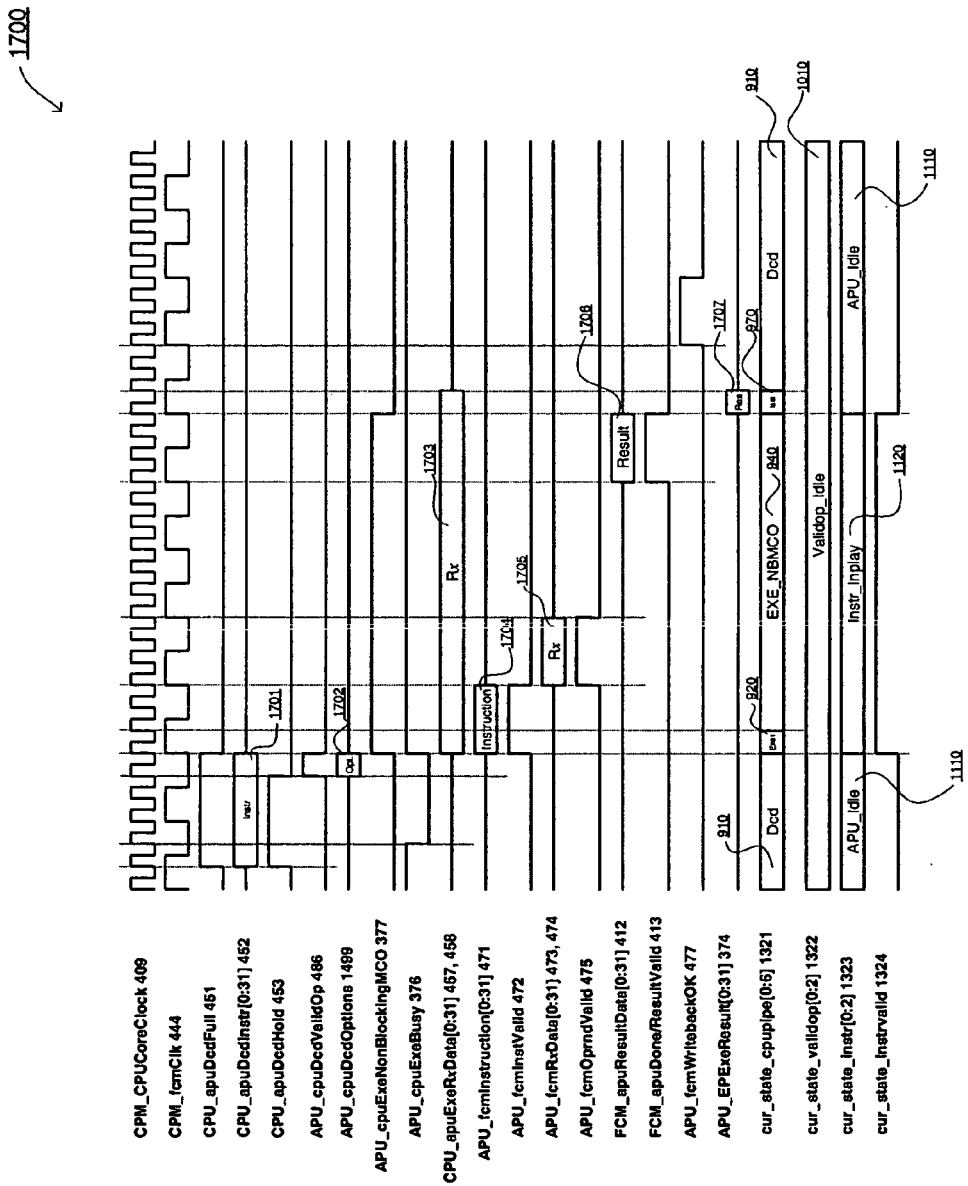
FIG. 17 is a signal timing diagram depicting an exemplary embodiment of an NBMCO instruction decode by an APU controller with a decode hold.

FIG. 17 is a signal timing diagram depicting an exemplary embodiment of an NBMCO instruction decode 1700 by APU controller 220 with a decode hold. Notably, CPU clock signal 409 is about three times the frequency of FCM clock signal 444. It should be further noted that signals from CPU 110 to APU controller 220 and from APU controller 220 to CPU 110 are clocked responsive to edges of clock signal 409. However, signals from FCM 230 to APU controller 220 and from APU controller 220 to FCM 230 are clocked responsive to edges of clock signal 444. Decoding of an NBMCO instruction by APU controller with a decode hold is the same as an NBMCO APU controller decoded instruction, except that the instruction stays in decode stage 112 until the pipeline hold is lifted. Once the pipeline hold is lifted, APU controller 220 responds by beginning execution of the instruction.

Again, an instruction 1701 is passed from CPU 110 to APU controller 220, which is processed to provide instruction 1704 passed from APU controller 220 to FCM 230 via signal 471. Any decoded options 1702 are provided from APU controller 220 to CPU 110 via decoded options signal 1499, and Ra or Rb data 1703 is provided from CPU 110 to APU controller 220 via signal 457 or 458, respectively. Moreover, Ra or Rb data 1705 is provided from APU controller 220 to FCM 230 via signal 473 or 474, respectively. Results 1706 are passed from FCM 230 to APU controller 220 via signal 412, and processed to provide results 1707 which are passed from APU controller 220 to CPU 110 via signal 374.

Figure 18:
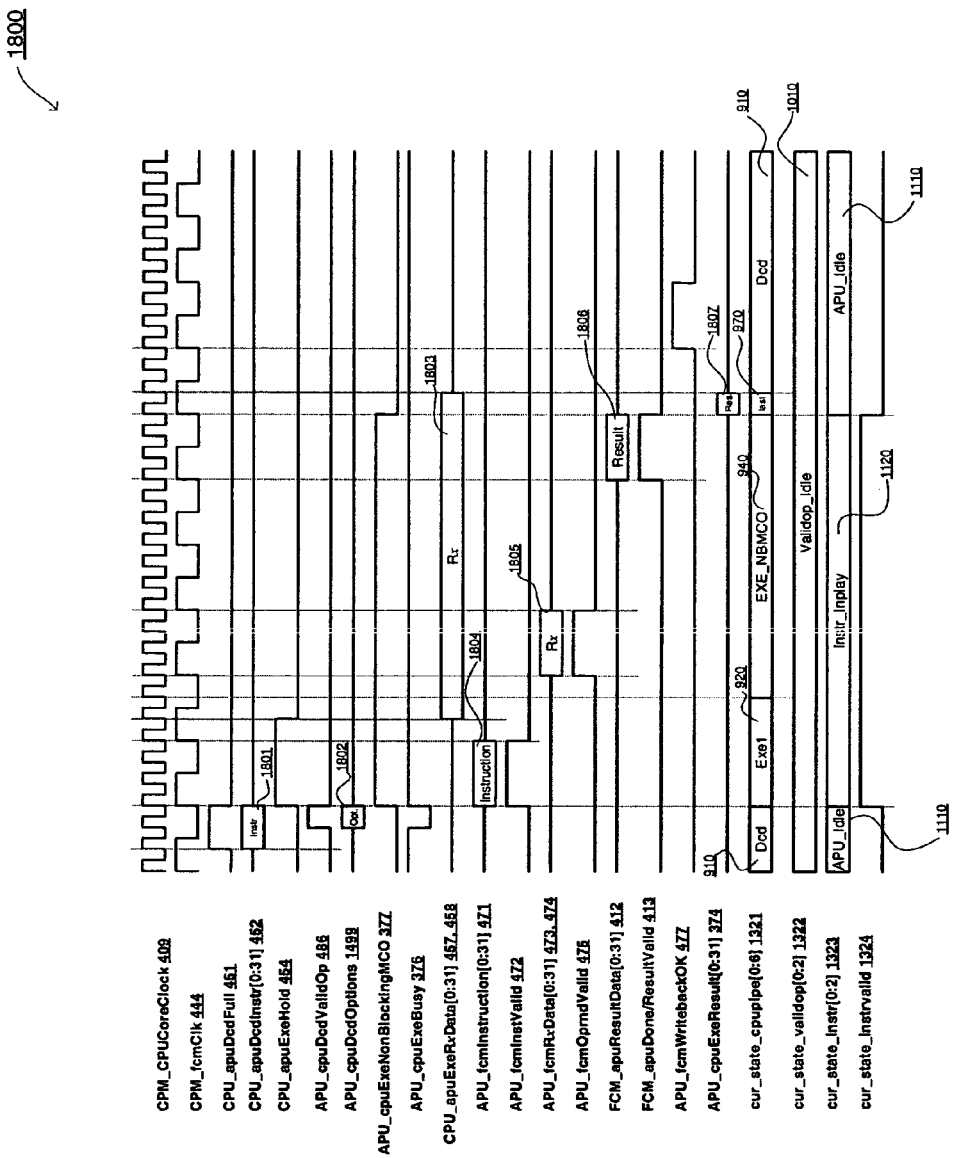
FIG. 18 is a signal timing diagram depicting an exemplary embodiment of an NBMCO instruction decode by an APU controller with an execute hold.

FIG. 18 is a signal timing diagram depicting an exemplary embodiment of an NBMCO instruction decode 1800 by APU controller 220 with an execute hold. Notably, CPU clock signal 409 is about three times the frequency of FCM clock signal 444. It should be further noted that signals from CPU 110 to APU controller 220 and from APU controller 220 to CPU 110 are clocked responsive to edges of clock signal 409. However, signals from FCM 230 to APU controller 220 and from APU controller 220 to FCM 230 are clocked responsive to edges of clock signal 444. An NBMCO instruction decoded by APU controller 220 with an execute hold is like an NBMCO APU controller decoded instruction, except that source data 1803 is not received by APU controller 220 from CPU 110 until ExeHold signal 454 transitions from a logic high to a logic low level.

Loads

All loads and stores are in the form of an indexed load or store, where Ra is the base address, Rb is the offset, and Rt is the target register. APU controller 220 may handle loads and stores of size byte, half word, word, double word, and quad word. In order to support all of these types of transfers, several counters and registers for temporarily storing the words in APU controller 220 may be employed, as well as other signals that determine the expected number of words.

To load a byte, the processor sends the byte, a valid signal, and a byte enable signal. APU controller 220 captures the byte and the byte enable and sends them on to FCM 230 when valid.

The load of a half-word is essentially the same as a byte load. Processor 110 sends the half-word, a valid signal, and byte-enable signals. APU controller 220 captures the half-word and the byte enables and sends them on to FCM 230 when valid.

Word loads are also similar. Processor 110 sends a word, a valid signal, and all byte enables signals are held at a logic high level. APU controller 220 captures the word and the byte enables and sends them on to FCM 230 when valid.

To load a byte, a half-word, or a word, FCM_apuLoadWait signal 438 is held at a logic low level. FCM_apuLoadWait signal 438 lets APU controller 220 know when FCM 230 is ready to receive load data (a better way is to say that FCM_apuLoadWait tells the APU Controller that the FCM cannot accept load data and must wait when the signal is high).

The loads of double word and quad word are more complex. Assuming FCM 230 is on a slower clock than processor 110, APU controller 230 must be able to store all words before sending them on to FCM 230. Therefore, APU controller 220 needs to know the number of expected words. This is determined when an instruction is decoded and two_wd_xfer signal or four_wd_xfer signal, both of which are APU controller internal signals, transitions to a logic high level. The two signals above are generated from when the instruction is decoded and it is determined that the load is of double or quad word size.

Figure 19:
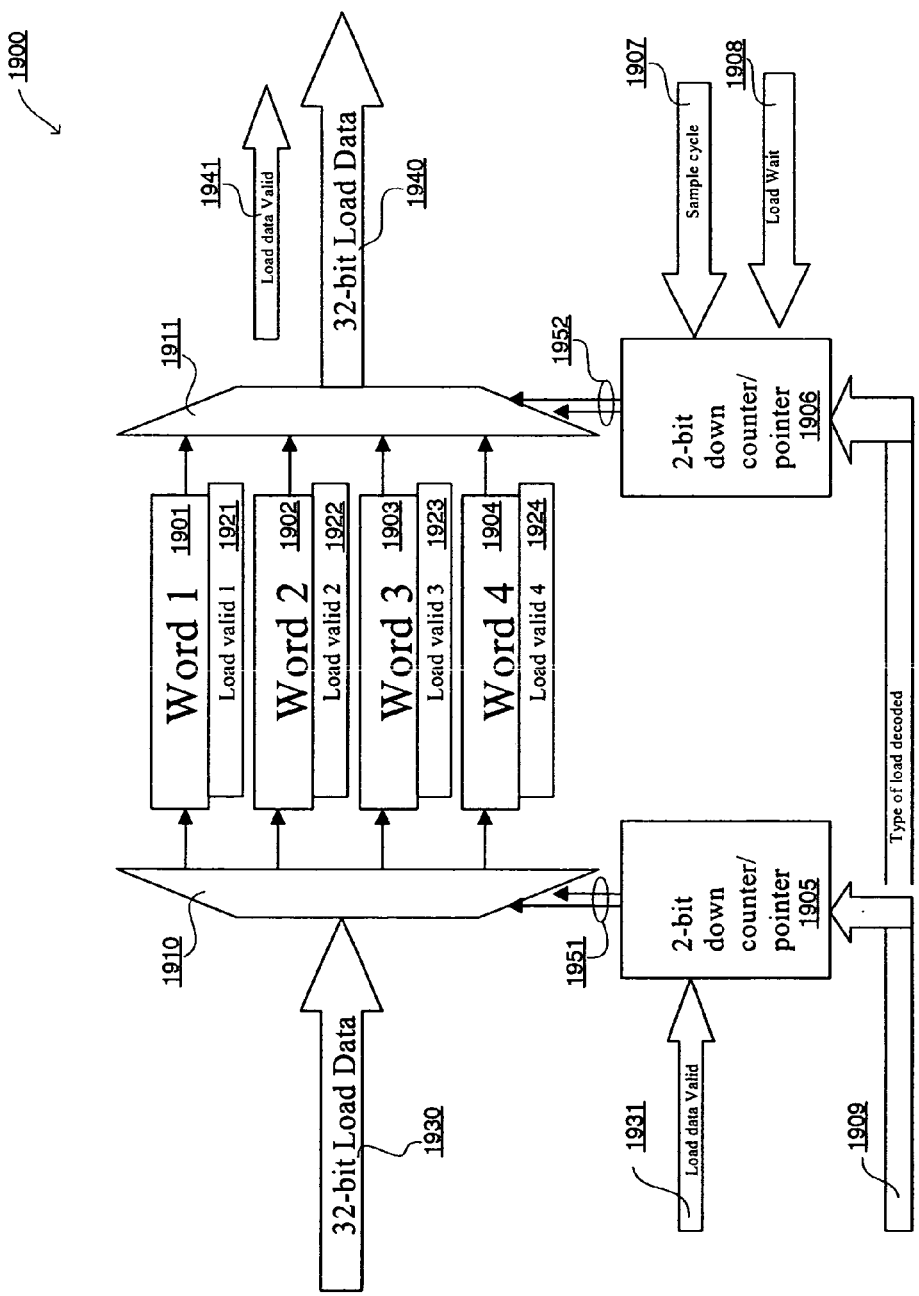
FIG. 19 is a simplified schematic/flow diagram depicting an exemplary embodiment of a load data management flow.

FIG. 19 is a simplified schematic/flow diagram depicting an exemplary embodiment of double and quad word load data management flow 1900. Load data flow 1900 is for loading data 1930 (shown in FIG. 4A as CPU_apuExeLoadDValid signal 464), which in this exemplary embodiment data is loaded with a maximum width of 32-bits. Load data 1930 is provided to demultiplexing logic 1910, which receives control signals 1951 from a counter or pointer 1905. Load data valid signaling 1931 (shown in FIG. 4A as CPU_apuExeLoadDBus[0:31] signal 465) is provided to counter 1905 for counting. The length of the count is determined by type of load decoded signal 1909, namely, a byte, half-word, word, double word or quad word (shown in FIG. 4B as signals 389 through 385, respectively).

In the instance of a double word or quad word load, a 2-bit down counter 1905 may be used to determine the number of load data valid signals 1931 to be received and counted for an instruction to be complete. Receiving counter 1905 keeps track of whether APU controller 220 is receiving one word, two words, three words, or four words. Sending 2-bit down counter 1906 receives type of load decoded signal 1909 to keep track of which word to send out to FCM 230. There are four registers 1901, 1902, 1903 and 1904, one for each load word (e.g., "Word 1", "Word 2", "Word 3", and "Word 4"), as well as a data valid signal register 1921, 1922, 1923, and 1924 for each load word register.

Valid signals are latched or otherwise retained until the associated words are sent to FCM 230. Word 1 through Word 4, or a subset thereof, is provided to multiplexing logic 1911. Control select signals 1952 are provided to multiplexing logic 1911 to select which register output, word register and associated load valid register, to output to provide load data signal 1940 (shown in FIG. 4 as APU_fcmLoadData[0:31] signal 478) and load data valid signal 1941 (shown in FIG. 4 as APU_fcmLoadDValid signal 479) to FCM 230. Each word sent to FCM 230 has an accompanying load wait signal 1908 (shown in FIG. 4A as FCM_apuLoadWait signal 438), which is set to a low logic level responsive to whether FCM 230 can accept load data. Counter 1906 counts responsive to sample cycle signal 1907.

Figure 20:
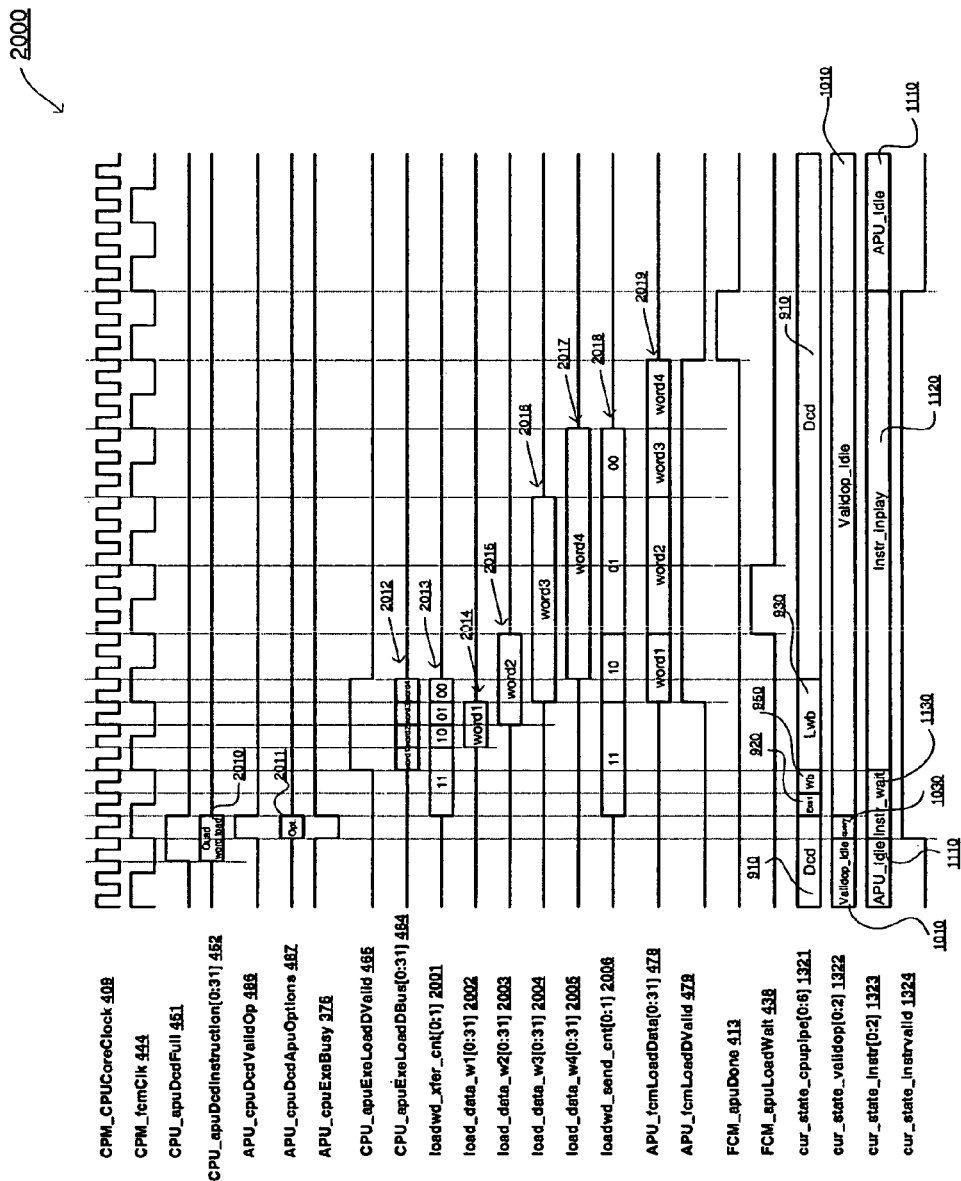
FIG. 20 is a signal timing diagram depicting an exemplary embodiment of a quad word load timing.

FIG. 20 is a signal timing diagram depicting an exemplary embodiment of quad word load timing 2000. Notably, CPU clock signal 409 is about three times the frequency of FCM clock signal 444. It should be further noted that signals from CPU 110 to APU controller 220 and from APU controller 220 to CPU 110 are clocked responsive to edges of clock signal 409. However, signals from FCM 230 to APU controller 220 and from APU controller 220 to FCM 230 are clocked responsive to edges of clock signal 444.

Once an instruction 2010 is decoded by APU controller 220 indicating a quad word, load counters are set to 2'b11 (e.g., four words). Any options 2011 are provided from APU controller 220 to CPU 110.

CPU Pipeline State Machine 504 goes through EXE1 state 920, then WB state 950, and then LWB state 930. When CPU Pipeline State Machine 504 hits LWB state 930, APU controller 220 begins receiving load data 2012, and a counter signal 2001 ("loadwd_xfer_cnt[0:1]") counts down 2013 the transfer of each word. Each word 2014 through 2017 of load data is latched, as indicated via load data word 1 through 4 signals 2002 through 2005, respectively, into a respective buffer and associated respective valid signal transitions to a logic high level. Once the first word (e.g., "word1" via signal 2002) is received by APU controller 220 from CPU 110, it will be sent to FCM 230 on the next FCM clock cycle. A counter signal 2018 counts the transfer of each word 2014 through 2017 sent from APU controller 220 to FCM 230. After all four words 2019 are sent to FCM 230 from APU controller 220, APU controller 220 waits for done signal 413 from FCM 230 to pulse to a logic high state.

Stores

Byte, half word and word stores, though three different types of stores, are essentially all the same with respect to APU controller 220 and FCM 230. For an APU controller 220 store, a store instruction is held in a decode stage while APU controller 220 and FCM 230 execute the store instruction. APU controller 220 sends FCM 230 the store instruction and waits for the appropriate word to return. If the store instruction is a byte or half word store, it is expected to contain the valid data in the lower byte or half word. Once APU controller 220 receives FCM_apuResultValid signal 439 from FCM 230, APU controller 220 latches the store data (e.g., "Result") and sends it on to processor 110. Processor 110 takes care of the byte enables for a byte or half word transfer.

Figure 21:
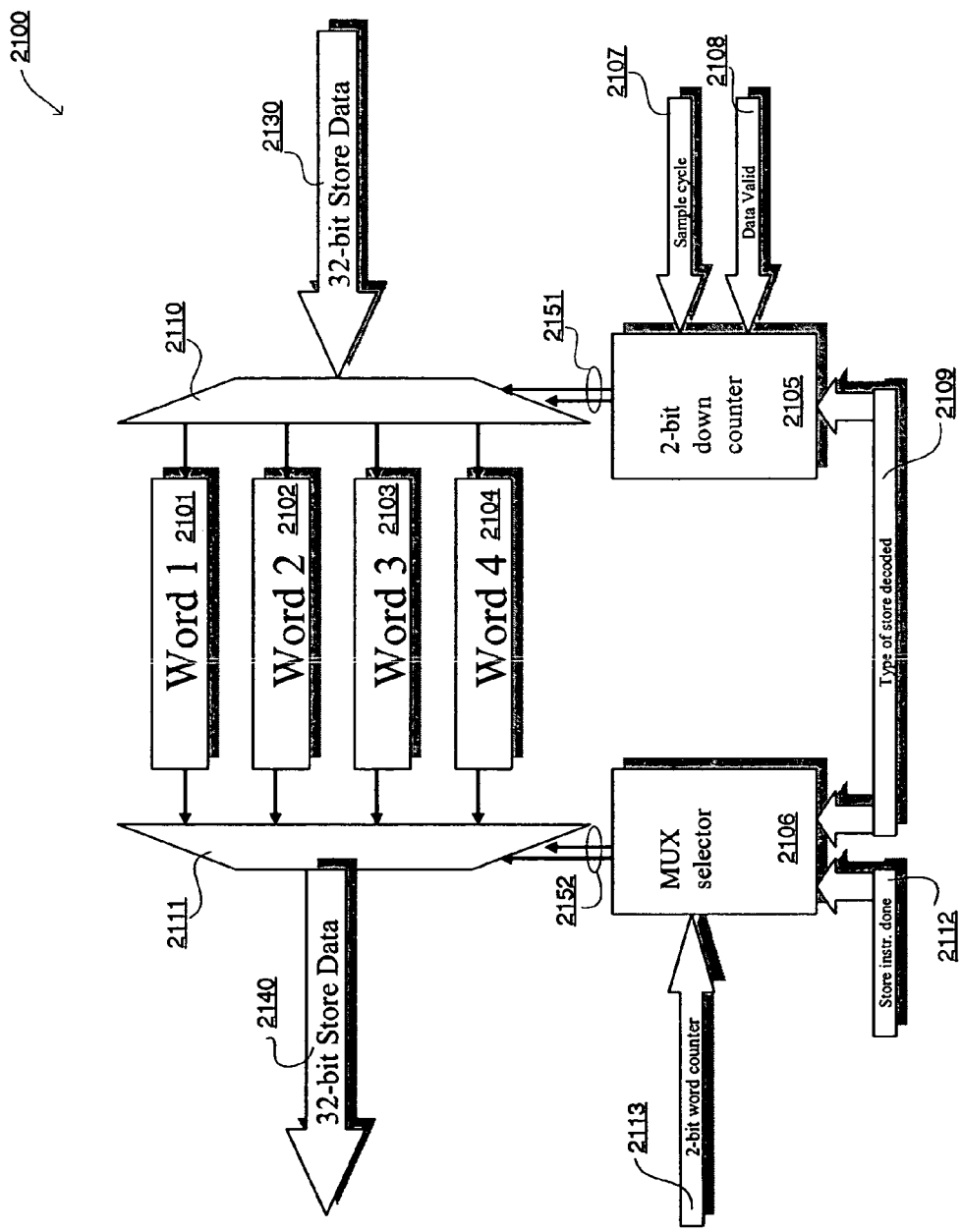
FIG. 21 is a simplified schematic/flow diagram depicting an exemplary embodiment of a store data management flow.

FIG. 21 is a simplified schematic/flow diagram depicting an exemplary embodiment of double and quad word store data management flow 2100. Storing of a double word or quad word is similar to the double word and quad word loads except in reverse order. A store instruction is held in decode stage 112 until all store data has been received by APU controller 220. Store data signal 2130 provides store data to word storage registers 2101 through 2104 via demultiplexing logic 2110. APU controller 220 has a receiving 2-bit down counter 2105 that latches a word, such as Word 1, 2, 3, or 4, into the appropriate register, such as register 2101, 2102, 2103, or 2104, respectively, responsive to data valid signal 2108 (shown in FIG. 4A as FCM_apuResultValid signal 439) from FCM 230. Counter 2105 counts valid data signals 2108 responsive to sample cycle signal 2107. There are four registers 2101, 2102, 2103, or 2104 for each possible store word, namely, respectively Word 1 through Word 4. Type of store decode signal 2109 is provided to counter 2105 to set a count length.

Once APU controller 220 has all the store words for carrying out an instruction, APU controller 220 sends the store data, namely, store data signal 2140 (shown in FIG. 4B as APU_cpuExeResult[0:31] signal 374) in registers 2101 through 2104, as applicable, to processor 110 via multiplexing logic 2111. Output of multiplexing logic 2111 is provided responsive to control select signals 2152 from multiplexer selector 2106. Multiplexer selector 2106 receives type of store decoded signal 2109 (shown in FIG. 4B as signals 385 through 389) to set a length for the output, namely, know how deep in registers 2101 through 2104 store data is located. Data is sent via data signal 2140 responsive to word counter signal 2113, which in this embodiment is a 2-bit counter signal (shown in FIG. 4A as CPU_apuExeWdCnt[0:1] signal 456) and store instruction done signal 2112 provided to multiplexer selector 2106 (shown in FIG. 4A as CPU_apuExeHold 454 or CPU_apuWbHold 460). Store data is transferred in the order in which it is received.

Figure 22:
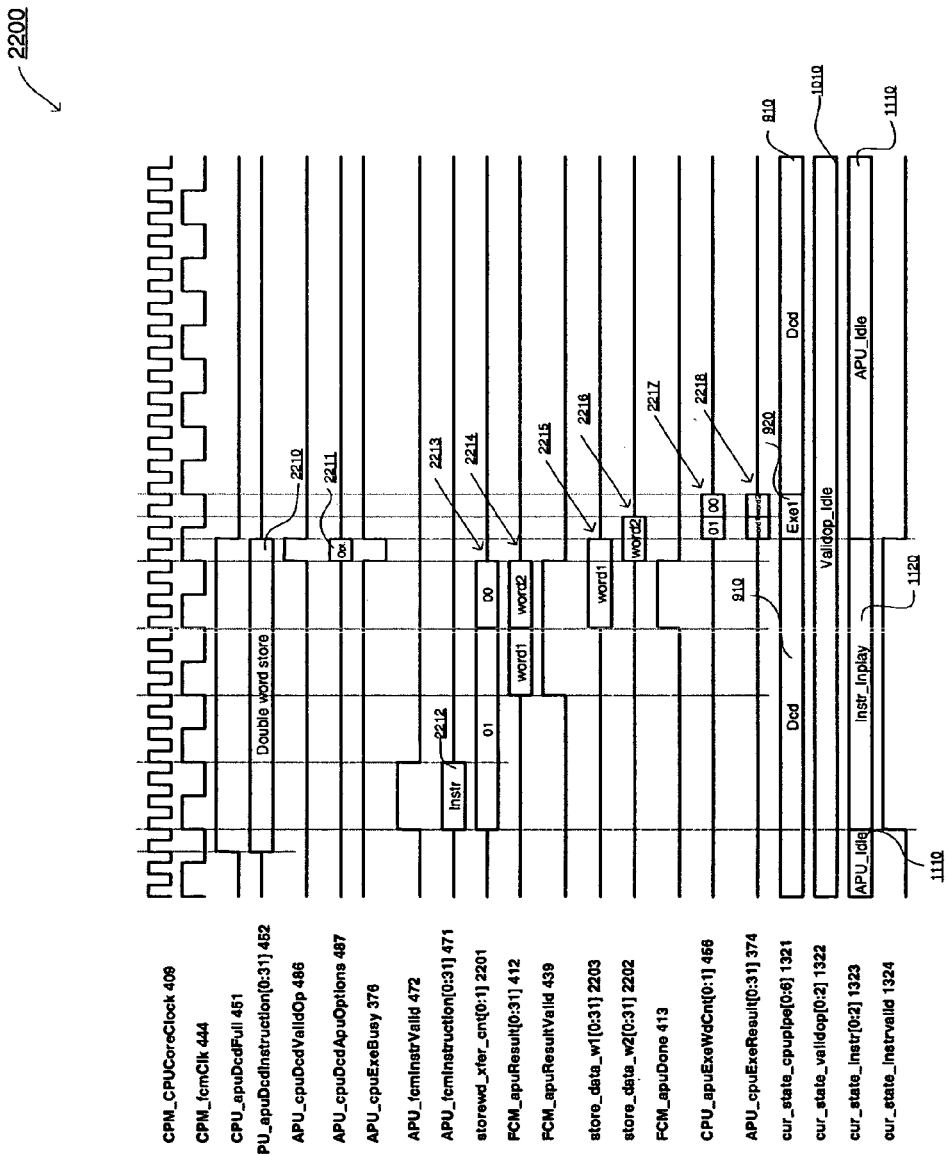
FIG. 22 is a signal timing diagram depicting an exemplary embodiment of a double word store timing by an APU controller.

When FCM 230 decodes a store instruction, there may be some requirements on the timing of the store data coming from FCM 230. FIG. 22 is a signal timing diagram depicting an exemplary embodiment of double word store timing 2200 by APU controller 220. Notably, CPU clock signal 409 is about three times the frequency of FCM clock signal 444. It should be further noted that signals from CPU 110 to APU controller 220 and from APU controller 220 to CPU 110 are clocked responsive to edges of clock signal 409. However, signals from FCM 230 to APU controller 220 and from APU controller 220 to FCM 230 are clocked responsive to edges of clock signal 444.

Responsive to APU controller 220 recognizing an instruction is a store instruction, such as double word store instruction 2210, an instruction 2212 is sent by APU controller 220 to FCM 230 on the next FCM clock cycle. Any decoded options 221 may be sent from APU controller 220 to CPU 110 via decode options signal 1499. Store word counters are initialized and then APU controller 220 waits for store data 2214 from FCM 230. After FCM 230 acknowledges the FCM instruction and acknowledges that the FCM instruction is a store instruction, FCM 230 waits until the next FCM clock cycle to send the store data to APU controller 220. Notably, if the store data is presented during the same cycle as CPU-apuInstrAck signal 411, the store data is held for one more FCM clock cycle in order for APU controller 220 to register the store data. Store data 2214 (e.g., "word1" and "word2") are transferred from FCM 230 to APU controller 220 via result signal 412, and counter ("storewd_xfer_cnt[0:1]") signal 2201 counts down each word of the transfer. Word1 2215 and then word2 2216 are stored in respective buffers in APU controller 220. APU controller 220 responds to CPU 110, moves into CPU Pipeline State Machine 920 into EXE1 state 920 and puts store data 2218, namely, word1 then word 2, on result bus signal 374. Count ("CPU_apuExeWdCnt[0:1]") signal 456 is provided by CPU 110 to APU controller 220 to count down the words transferred via result bus signal 374.

Figure 23:
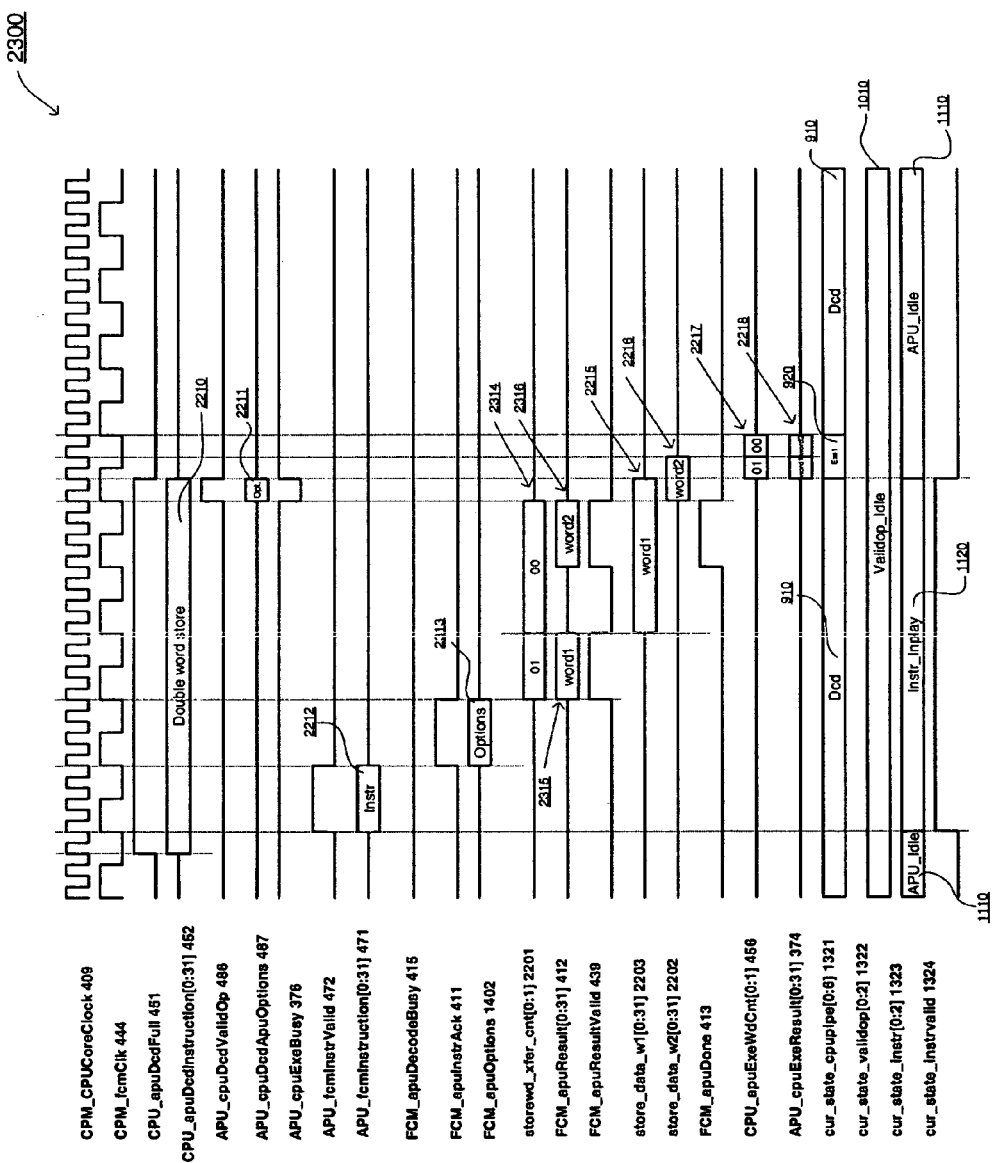
FIG. 23 is a signal timing diagram depicting an exemplary embodiment of a double word store where the FCM does not send the data in back-to-back cycles.

FIG. 23 is a signal timing diagram depicting an exemplary embodiment of a double word store 2300 where the FCM does not send the data in back-to-back cycles. Notably, CPU clock signal 409 is about three times the frequency of FCM clock signal 444. It should be further noted that signals from CPU 110 to APU controller 220 and from APU controller 220 to CPU 110 are clocked responsive to edges of clock signal 409. However, signals from FCM 230 to APU controller 220 and from APU controller 220 to FCM 230 are clocked responsive to edges of clock signal 444.

The signal timing diagrams of FIGS. 22 and 23 are essentially the same, except store data from FCM 230 is not sent back-to-back and options 2313 are shown in FIG. 23. Options 2313 are sent from FCM 230 to APU controller 220 via options signal 1402 is added. Notice that ResultValid signal 439 is pulsed to a logic high level for the transfer of each word 2315 and 2316 (e.g., "word1" and "word2"), but ResultValid signal 439 transitions to a logic low level between these two words. Accordingly, word1 2317 is latched in an associated buffer beginning at the end of the transfer of word1 2315, which is a longer time period owing to the transfer not being back-to-back.

Programmable Decoder System

With renewed reference to FIG. 2, to this point, it has been assumed that APU decoder 223 decodes an instruction from processor 110 for providing to FCM 230 and that FCM 230 includes an optional decoder 231 for instances where a user has defined an instruction and programmed configurable logic to provide decoder 231 to decode such UDI. Furthermore, a user may choose not to instantiate any floating-point instructions in FCM 230, in which embodiment optional decoder 231 would not be instantiated for decoding floating-point instructions. It should be appreciated that the a decoded instruction by APU controller 220 is not therefore decoded for FCM 230, except with respect to UDIs as mentioned herein. Rather, for example, if an instruction is a floating-point instruction, both APU 220 and FCM 230 decode the instruction, where the APU 220 decode is for handshaking with processor 110 and the FCM 230 decode is for decoding the instruction. This is at least in part due to the fact that FCM 230 is a user-defined coprocessor. Because a user parameterized coprocessor is instantiated, there is not necessarily an a priori known fixed set of instruction supported by FCM 230. Thus, in FIG. 2, execution units 232 are shown as a "cloud" because they are dependent upon what a user chooses to implement in FCM 230.

However, it has been assumed that optional decoder 231 is a full instruction set decoder instantiated in configurable logic of an FPGA with respect to FCM 230 being a FPU. However, as is known a full instruction set decoder for a processor consumes a significant amount of logic resources, and in this instance a significant amount of configurable logic resources. Rather than providing a full instruction set decoder instantiated in FPGA fabric, some decoding may be done in embedded logic to reduce the amount of programmable resources used for processing an instruction. This facilitates using a smaller, less expensive FPGA, or having programmable resources available for other circuits of an SoC, or a combination thereof. Furthermore, use of embedded logic will improve decode performance.

Figure 24:
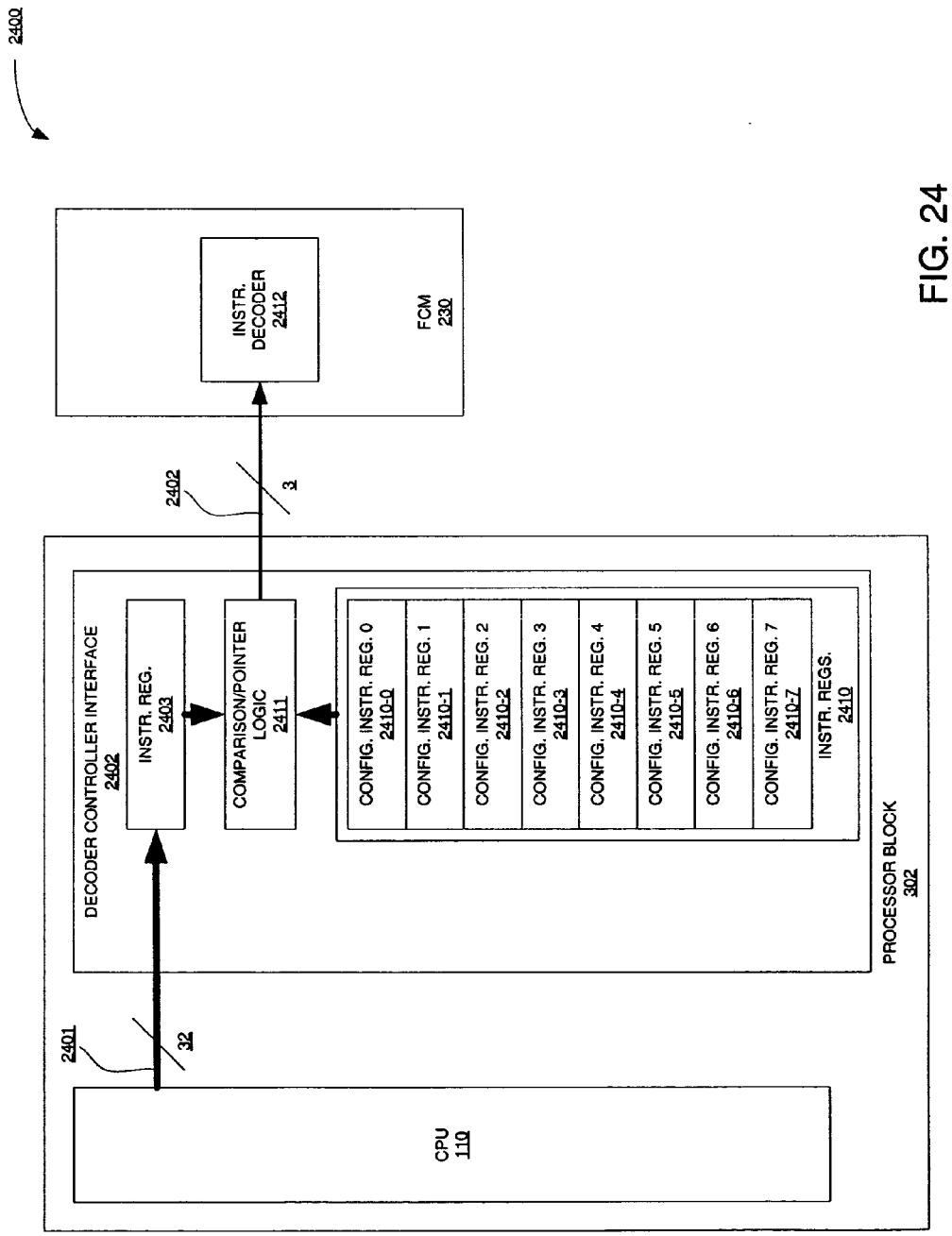
FIG. 24 is a high-level block diagram depicting an exemplary embodiment of a programmable decoder system.

FIG. 24 is a high-level block diagram depicting an exemplary embodiment of a programmable decoder system 2400. With continuing reference to FIG. 24 and renewed reference to FIG. 2, programmable decoder system 2400 is further described.

CPU 110 provides an instruction, which may be a 32-bit wide instruction or other width, via instruction bus 2401 to decoder controller interface 2402. Decoder controller interface 2402 and CPU 110 are dedicated embedded logic of an integrated circuit having configurable logic, such as an FPGA. Notably, decoder controller interface 2402 may be a portion of APU controller 220, such as decode controller 221, decode registers 222 and APU decoder 223. However, decode controller interface 2402 need not be implemented with APU controller 220.

An instruction from CPU 110 is temporarily stored in instruction register 2403. Configuration instruction registers 2410, for example eight configuration instruction registers 2410-0 through 2410-7 or some other number of configuration instruction registers, each store a respective instruction for FCM 230. Configuration instruction registers 2410 may be user-configured registers, such as decode registers 222. Accordingly, instructions stored in configuration instruction registers may be UDIs.

An instruction stored in instruction register 2403 is compared with the contents stored in each configuration registers 2410 until a match is found. This comparison may be done by comparison/pointer logic 2411. Once a match is found by comparison/pointer logic 2411, a pointer responsive to the configuration instruction register of configuration instruction registers 2410 having the matching instruction is provided via pointer bus 2402 to instruction decoder 2412 of FCM 230. Continuing the above example of eight configuration instruction registers 2410-0 through 2410-7, a three-bit pointer may be used to uniquely identify one of configuration instruction registers 2410-0 through 2410-7.

A pointer provided via pointer bus 2402 may be provided in what is known as a "one-hot" format, a binary encoded format, or may be otherwise encoded. FCM 230, and thus instruction decoder 2412, is instantiated in FPGA fabric. FCM 230, or other FPGA fabric instantiated coprocessor, responsive to the pointer received can determine which configuration instruction register 2410 generated the match. Because a pointer has fewer bits in comparison to an instruction, such as three pointer bits in comparison to thirty-two instruction bit, fewer configurable logic resources are needed to provide instruction decoder 2412. Again, because configuration instruction registers 2410 are programmed by a user, instruction decoder 2412 instantiated in configurable logic by a user has a prior knowledge of what is in configuration instruction registers 2410.

Thus, for example, instruction decoder 2412 receives a bit-encoded number from 0 to 7 corresponding to a configuration instruction register of configuration instruction registers 210. For example, if the pointer on pointer bus 2402 was 3'b011, then the instruction in instruction register 2403 matched the instruction in configuration instruction register 2410-3. Notably, not only are there fewer resources used to provide instruction decoder 2412 in comparison to a full instruction set decoder, but decoding speed is increased by having to go through fewer decode stages.

Busy Signal for Non-Lock Step Operation

To this point, it has been assumed that APU controller 220 works in lock step with processor 110. However, it is possible that APU controller 220 may work at a speed that is close but slower than the speed of processor 110. However, to operate APU controller 220 at a slower speed than processor 110, of course without slowing processor speed, processor 110 will have to be put in a wait state while APU controller 220 operates on a current instruction being processed. Alternatively, APU controller 220 may operate at the same frequency of processor 110; however, processor 110 may allot only one CPU clock cycle to execute an instruction that is executed in more than one CPU clock cycle using APU controller 220. Thus, whether there is one to more than one CPU clock cycle relationship or APU controller 220 operates at slower frequency than processor 110, there is a non-lock-step operating environment.

In FIG. 4B, the APU interface to CPU 210 includes APU_cpuExeBusy signal 376. APU busy signal 376 in a normal mode is used to indicate to CPU 210 that APU controller 220 is busy working on a previous instruction and therefore processor 110 is to wait before to have a next instruction processed by APU controller 220. CPU 110 provides an instruction to APU controller 220 via CPU_apuDcdInstruction signal 452 (shown in FIG. 4A).

Figure 25:
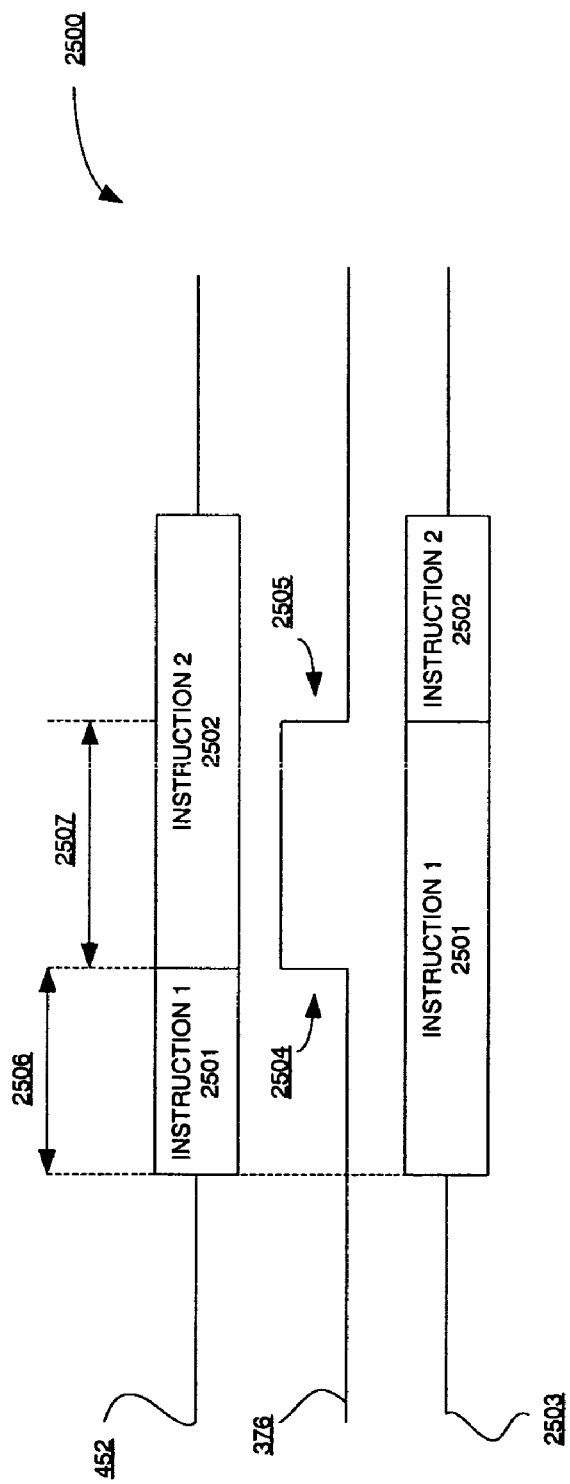
FIG. 25 is a simplified timing diagram depicting an exemplary embodiment of operation of APU busy signal for a lock step operational mode between an APU controller and a processor.

FIG. 25 is a simplified timing diagram depicting an exemplary embodiment of operation of APU busy signal 376 for a lock step operational mode 2500 between APU controller 220 and processor 110. With simultaneous reference to FIGS. 4A, 4B and 25, operation of APU busy signal 376 for a lock step operational mode 2500 is further described.

An instruction, namely, "instruction 1", 2501 is provided from processor 110 to APU controller 220 via signal 452. This instruction 1 is processed by APU controller 220 as illustratively indicated by execution in APU time line 2503. During time interval 2506, from at or about the time instruction 1 is sent to at or about the time a next instruction, namely, "instruction 2", is sent via signal 452, signal 376 is held at a logic low level. At or about time 2504, when instruction 2 is sent from processor 110 to APU controller 220, instruction 1 is still being processed by APU controller 220 as illustratively indicated by execution in APU time line 2503. In response, APU controller 220 raises signal 376 from a logic low level to a logic high level to indicate that APU controller 220 is still busy executing instruction 1. APU busy signal 376 is maintained or asserted for duration 2507 until instruction 1 is finished being processed by APU controller 220.

APU busy signal 376 is maintained at a logic high level until at or about time 2505, when APU controller 220 completes processing instruction 1 as illustratively indicated by execution in APU time line 2503. In response to completing the processing of instruction 1, APU controller 220 lowers APU busy signal 376 at or about time 2505. Instruction 2, which has been held on instruction signal 452 since at or about time 2504, is, in response to APU busy signal 376 being lowered or de-asserted, started to be processed by APU controller 220 at or about time 2505 as illustratively indicated by execution in APU time line 2503.

Figure 26:
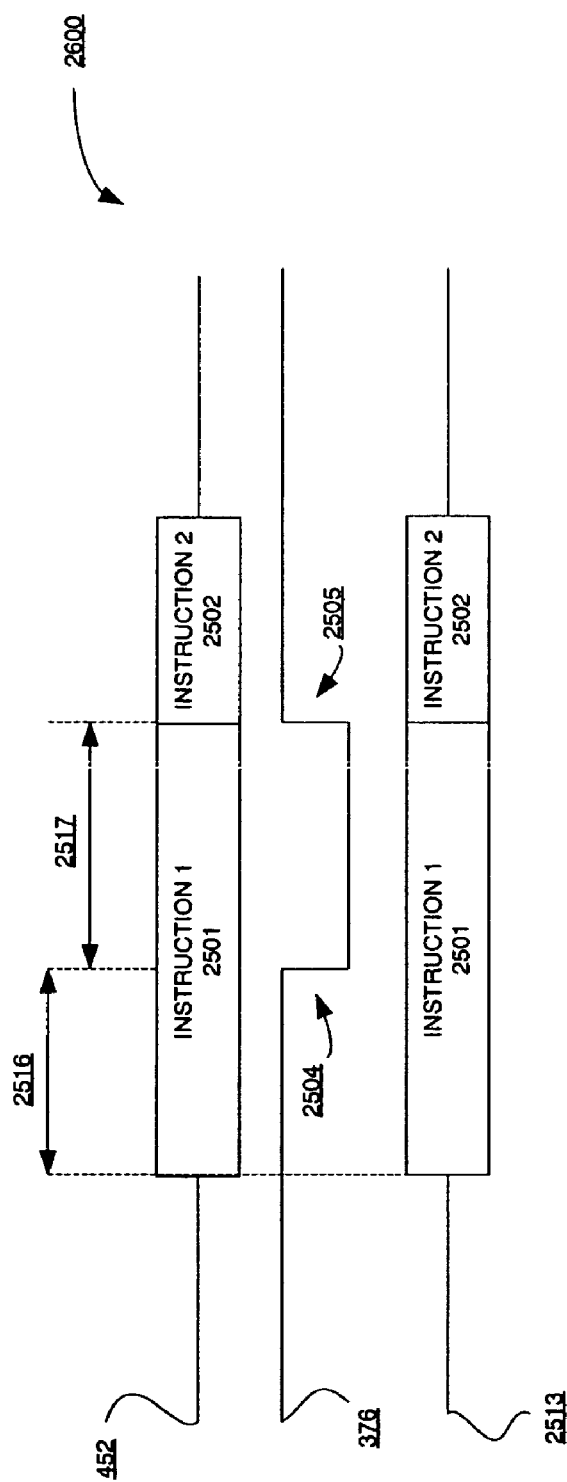
FIG. 26 is a simplified timing diagram depicting an exemplary embodiment of operation of APU busy signal for a non-lock step operational mode between an APU controller and a processor.

However, the above-described lock step operational mode 2500 is inverted for non-lock step operational mode 2600 of FIG. 26. FIG. 26 is a simplified timing diagram depicting an exemplary embodiment of operation of APU busy signal 376 for a non-lock step operational mode 2600 between APU controller 220 and processor 110. With simultaneous reference to FIGS. 2, 4A, 4B, 25 and 26, operation of APU busy signal 376 for a non-lock step operational mode 2600 is further described.

For non-lock step operational mode 2600, instead of asserting APU busy signal 376 to indicate to processor 110 that it is to wait for APU controller 220, APU busy signal 376 is maintained asserted and only de-asserted responsive to CPU-APU interface 210 having completed an instruction transfer. In other words, APU busy signal 376 is held at a high logic level, and only pulsed to a low logic level responsive to the then current instruction having finished a partial amount of execution. In the case of a store, APU controller 220 waits until all store data is received from FCM 230 before pulsing ExeBusy signal 376 to a logic low level. The main reason for doing this is because there are some instruction types that CPU 110 prevents APU controller 220 from stalling pipeline 130. If an instruction requires a result to be sent to CPU 110 and FCM 230 runs slower than CPU 110, CPU 110 must be stalled irrespective of instruction type. This done by executing an instruction before CPU 110 knows the instruction has started. In this embodiment, the result is obtained before pulsing ExeBusy signal 376 to a logic low level.

Accordingly, instruction 1 is provided from processor 110 to APU controller 220 via instruction signal 452. In response to receipt of instruction 1, APU controller 220 initiates processing of instruction 1 as illustratively indicated by execution in APU time line 2513. This execution of instruction 1 begins even though APU busy signal 376 indicates that APU controller 220 is busy.

After a certain amount of execution of instruction 1 by APU controller 220, as indicated by duration 2516, at or about time 2504, APU busy signal 376 is transitioned to a logic low level or de-asserted. APU busy signal 376 is maintained in a de-asserted state for duration 2517, namely, until instruction 1 is completely processed by APU controller 220. Duration 2517 is also the amount of time for decoding instruction 1 from processor 110 by APU controller 220. In other words, during this time period, APU controller 220 sends CPU 110 information, including decoded execution options among other information, and during this period, a decode of an instruction may happen.

At or about time 2505, responsive to instruction 2 being sent from processor 110 to APU controller 220 via instruction signal 452, APU controller 220 begins processing instruction 2, as illustratively indicated by execution in APU time line 2513, and APU controller 220 asserts APU busy signal 376. Notably, non-lock step operational mode 2600 facilitates a degree of parallel processing of instructions, while not having to have processor 110 and APU controller 220 operate in lock step.

For example, suppose processor 110 interface definition is for a lock step response for APU controller 220 to execute a store instruction. However, suppose APU controller 220 operates at a lower clock rate than processor 110 with respect to CPU to APU interfacing. Thus, by holding APU busy signal 376 at a logic high level, such a store instruction will stay in decode stage 112 of processor pipeline 130 as an instruction not yet issued, meanwhile APU controller 220 can decode the instruction and retrieve storage data for executing the instruction. For example, once all data is readied, APU busy signal 376 may be pulsed to a logic low level to indicate to processor 110 that it may advance out of decode stage 112.

Software Emulation

With renewed reference to FIG. 2, FCM 230 floating-point instructions are hard-coded in decoder 223 of APU controller 220. However, it is possible that one or more floating-point instructions cannot be executed by FCM 230. These one or more floating-point instructions may be handled by processor 110 using software emulation.

Figure 27:
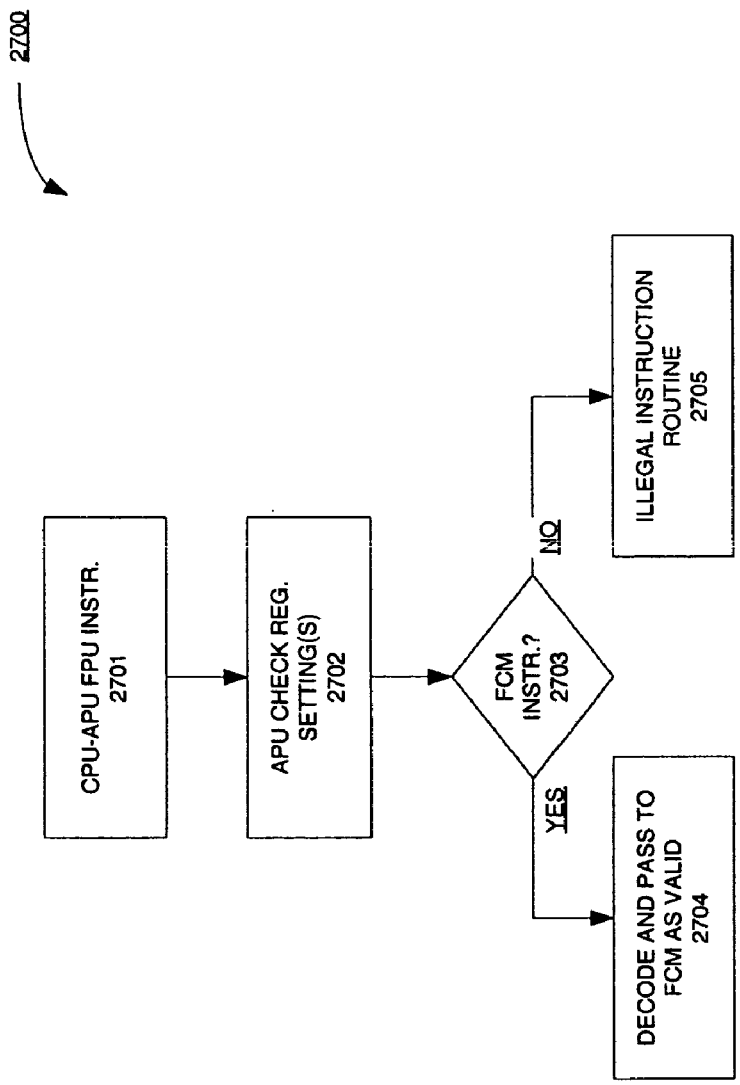
FIG. 27 is a flow diagram depicting an exemplary embodiment of a software emulation coexistence flow.

FIG. 27 is a flow diagram depicting an exemplary embodiment of a software emulation coexistence flow 2700. With simultaneous reference to FIGS. 2 and 27, software emulation coexistence flow 2700 is described. At 2701, an FPU instruction is sent from CPU 110 to APU controller 220. Prior to attempting to decode the FPU instruction sent, APU controller 220 queries one or more control register settings at 2702.

One or more FPU instructions or groups of FPU instructions may be disabled by setting one or more control register bits, such as bit positions [9:11] of control register 750 of FIG. 7D. Thus, when an FPU instruction is received by APU controller 220, APU controller 220 first determines whether to decode the FPU instruction for passing along to FCM 230.

It should be understood that FCM 230 is instantiated in configurable logic of a PLD, such as an FPGA. Accordingly, the complexity, and thus then number of configurable logic resources consumed by instantiating FCM 230 is dependent at least in part by the number of FPU instructions FCM 230 is capable of executing. By having an FCM 230 instantiated that only executes a subset of FPU instructions of CPU 110, FCM 230 complexity, and thus the number of configurable logic resources, may be reduced.

In other words, a user may decide to instantiate an FCM 230 with only partial FPU instruction execution capability to conserve configurable logic resources for other uses. By setting control register bits to disable certain FPU instructions, for example, a user effectively informs APU controller 220 not to decode those certain FPU instructions. Accordingly, for a disabled FPU instruction received by APU controller 220 from CPU 110, APU controller will not forward a decoded FPU instruction and associated valid signal to FCM 230 for execution.

In the instance where an FPU instruction has been disabled, APU controller 220 will not indicate to CPU 110, such as via APU_cpuDcdValidOp signal 486, that such an FPU instruction is valid thereby causing CPU 110 to generate an illegal instruction exception. This may be done for example by having APU controller 220 hold both instruction valid operations signal 486 and execute busy signal 376 at a logic low level thereby informing CPU 110 that the associated FPU instruction is not part of the instantiated FPU instructions of FCM 230. Thus, CPU 110 will invoke a known illegal instruction exception routine to emulated in software, such as by FPU emulation software stored in memory accessible by CPU 110, the FCM disabled FPU instruction.

At 2703, it is determined by APU controller 220 control register settings obtained at 2702 whether the FPU instruction received at 2701 is an FPU instruction which has not been disabled, and thus is executable by FCM 230. Non-disabled FPU instructions are decoded by APU controller 220 and passed to FCM 230 with a valid signal at 2704.

Disabled FPU instructions are not recognized by APU controller 220 causing CPU 110 to initiate an illegal instruction exception handling mode at 2705. In an embodiment, APU controller 220 partitions FPU instructions into three groups that may be disabled, namely, the complex arithmetic group, the conversion group, and the estimates group. The complex arithmetic group includes fdiv/fdiv., fdivs/fdivs., fsqrt/fsqrt., and fsqrts/fsqrts. instructions. The conversion group includes fcfid, fctid, fctidz, fctiw/fctiw., and fctiwz/fctiwz. instructions. The estimates group includes fres/fres. and frsqrte/frsqrte. instructions. The "." denotes that the instruction is of the condition record format.

Control register 502 of APU controller 220 stores control bits that may be used to disable one or more of these groups of instructions. There is one control bit for each group of instructions. Thus, a user may disable one or more groups of instructions by setting one or more control bits tailored to functionality, or lack thereof, of FCM 230. Once a bit in control register 502 is set to disable a group of instructions, FPU instructions in such group will no longer be recognized by APU controller 220. Thus, if APU controller 220 receives an FPU instruction in a group of disabled FPU instructions, APU controller 220 will not respond to CPU 110 with a valid instruction signal APU_cpuDcdValidOp signal 486 causing CPU to initiate an illegal instruction exception routine at 2705.

Accordingly, it should be appreciated that both hard-coded FPU instructions for execution by configurable logic and FPU instructions for execution by software emulation using embedded logic may coexist. Conventionally, a compiler matches instructions to those in a set of coprocessor executable instructions, and thus there is not both software emulation of instructions and a coprocessor. However, in an embodiment, if for example a compiler operates based on an assumption of a full set of floating-point instructions, FCM 230 will not be able to execute all of them if they are not all supported. Thus, software emulation support coexisting with FCM 230 fills the gap of a coprocessor instantiated with less than full instruction support. FCM 230 is a "parameterizable" coprocessor. For example, FCM 230 may have multiplication and addition execution units, but may not have square root execution units. Additionally, as there are UDIs available to FCM 230, FCM 230 is not limited to the instruction set of a conventional compiler. Furthermore, it should be appreciated that the FPU instruction set instantiated in configurable logic by a user to provide FCM 230 is user determined. In otherwise, a user selectable FPU instruction set is provided in contrast to a fixed FPU instruction set of a dedicated coprocessor.

FPGAs

As mentioned above, APU controller 220 and FCM 230 may be implemented in an FPGA. Below are some examples of FPGAs in which APU controller 220 and FCM 230 may be implemented.

Figure 28:
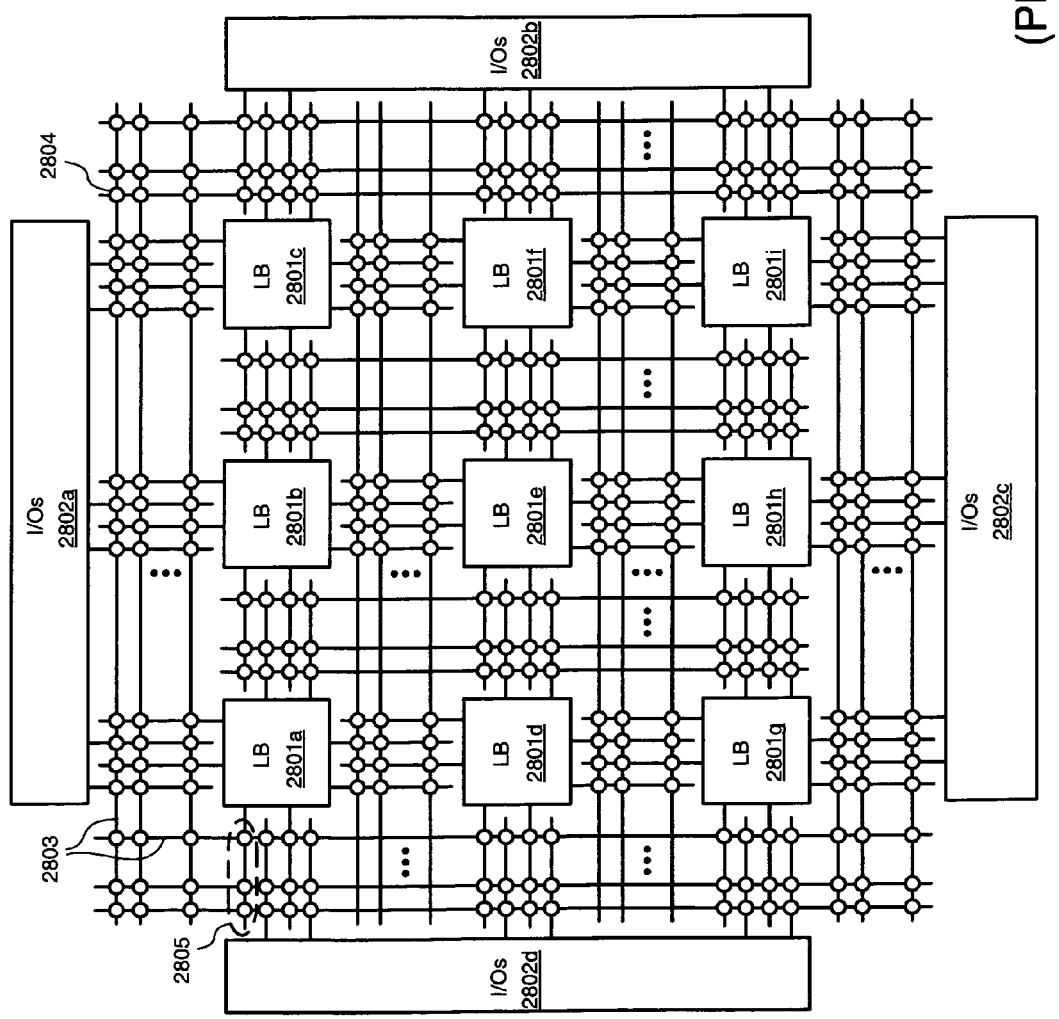
FIG. 28 is a simplified block diagram depicting an exemplary embodiment of a prior art Field Programmable Gate Array architecture in which one or more aspects of the invention may be implemented.

FIG. 28 is a simplified illustration of an exemplary FPGA. The FPGA of FIG. 28 includes an array of configurable logic blocks (LBs 2801*a*–2801*i*) and programmable input/output blocks (I/Os 2802*a*–2802*d*). The LBs and I/O blocks are interconnected by a programmable interconnect structure that includes a large number of interconnect lines 2803 interconnected by programmable interconnect points (PIPs 2804, shown as small circles in FIG. 28). PIPs are often coupled into groups (e.g., group 2805) that implement multiplexer circuits selecting one of several interconnect lines to provide a signal to a destination interconnect line or logic block. Some FPGAs also include additional logic blocks with special purposes (not shown), e.g., DLLs, RAM, and so forth.

One such FPGA, the Xilinx Virtex® FPGA, is described in detail in pages 3–75 through 3–96 of the Xilinx 2000 Data Book entitled "The Programmable Logic Data Book 2000" (hereinafter referred to as "the Xilinx Data Book"), published April, 2000, available from Xilinx, Inc., 2100 Logic Drive, San Jose, Calif. 95124, which pages are incorporated herein by reference. (Xilinx, Inc., owner of the copyright, has no objection to copying these and other pages referenced herein but otherwise reserves all copyright rights whatsoever.) Young et al. further describe the interconnect structure of the Virtex FPGA in U.S. Pat. No. 5,914,616, issued Jun. 22, 1999 and entitled "FPGA Repeatable Interconnect Structure with Hierarchical Interconnect Lines", which is incorporated herein by reference in its entirety.

One such FPGA, the Xilinx Virtex®-II FPGA, is described in detail in pages 33–75 of the "Virtex-II Platform FPGA Handbook", published December, 2000, available from Xilinx, Inc., 2100 Logic Drive, San Jose, Calif. 95124, which pages are incorporated herein by reference.

One such FPGA, the Xilinx Virtex-II Pro™ FPGA, is described in detail in pages 19–71 of the "Virtex-II Pro Platform FPGA Handbook", published Oct. 14, 2002 and available from Xilinx, Inc., 2100 Logic Drive, San Jose, Calif. 95124, which pages are incorporated herein by reference.

As FPGA designs increase in complexity, they reach a point at which the designer cannot deal with the entire design at the gate level. Where once a typical FPGA design comprised perhaps 5,000 gates, FPGA designs with over 100,000 gates are now common. To deal with this complexity, circuits are typically partitioned into smaller circuits that are more easily handled. Often, these smaller circuits are divided into yet smaller circuits, imposing on the design a multi-level hierarchy of logical blocks.

Libraries of predeveloped blocks of logic have been developed that can be included in an FPGA design. Such library modules include, for example, adders, multipliers, filters, and other arithmetic and DSP functions from which complex designs can be readily constructed. The use of predeveloped logic blocks permits faster design cycles, by eliminating the redesign of duplicated circuits. Further, such blocks are typically well tested, thereby making it easier to develop a reliable complex design.

Some FPGAs, such as the Virtex FGPA, can be programmed to incorporate blocks with pre-designed functionalities, i.e., "cores". A core can include a predetermined set of configuration bits that program the FPGA to perform one or more functions. Alternatively, a core can include source code or schematics that describe the logic and connectivity of a design. Typical cores can provide, but are not limited to, digital signal processing functions, memories, storage elements, and math functions. Some cores include an optimally floorplanned layout targeted to a specific family of FPGAs. Cores can also be parameterizable, i.e., allowing the user to enter parameters to activate or change certain core functionality.

Figure 29:
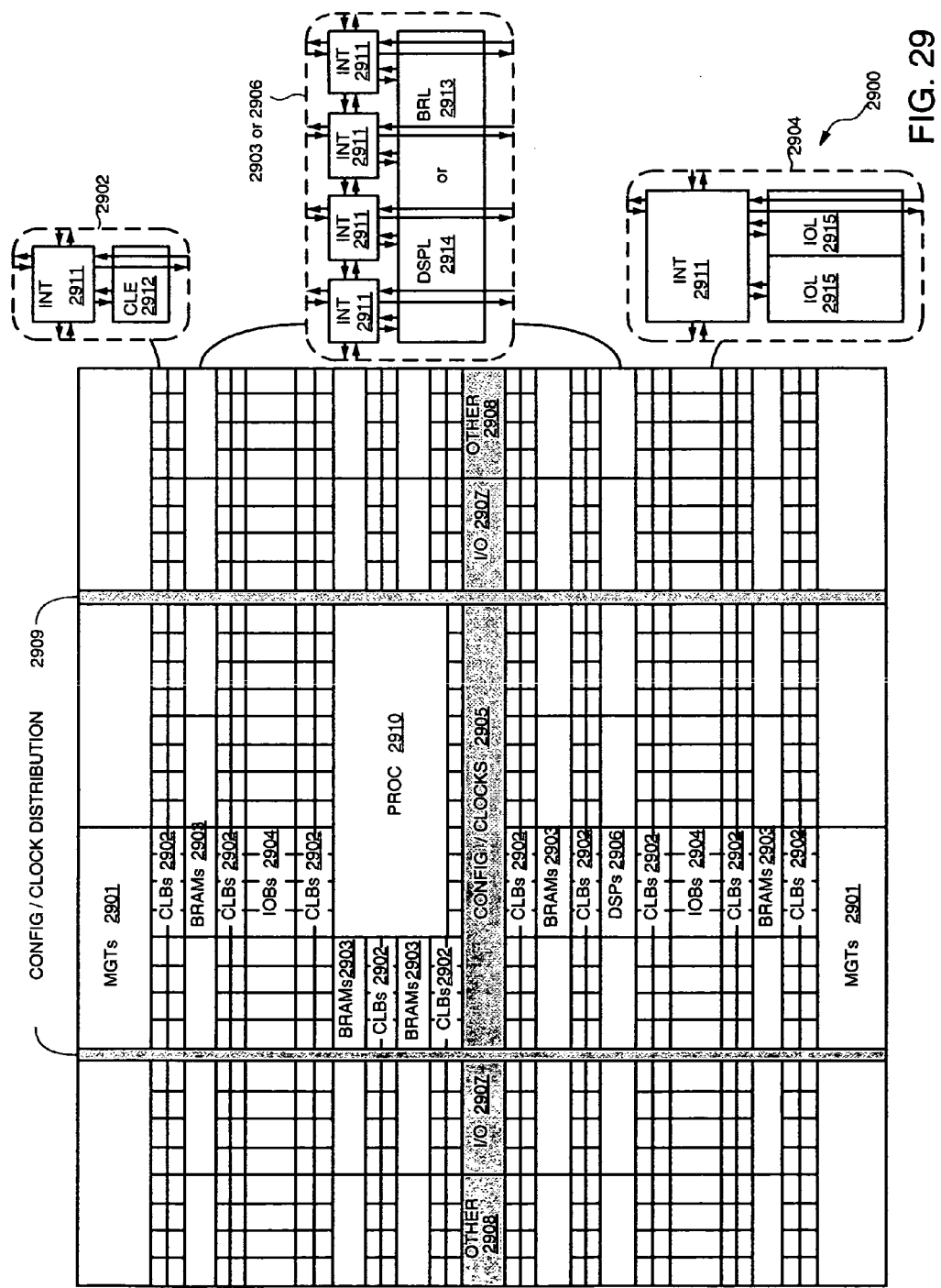
FIG. 29 is a simplified block diagram depicting another exemplary embodiment of a Field Programmable Gate Array architecture in which one or more aspects of the invention may be implemented.

As noted above, advanced FPGAs can include several different types of programmable logic blocks in the array. For example, FIG. 29 illustrates an FPGA architecture 2900 that includes a large number of different programmable tiles including multi-gigabit transceivers (MGTs 2901), configurable logic blocks (CLBs 2902), random access memory blocks (BRAMs 2903), input/output blocks (IOBs 2904), configuration and clocking logic (CONFIG/CLOCKS 2905), digital signal processing blocks (DSPs 2906), specialized input/output blocks (I/O 2907) (e.g., configuration ports and clock ports), and other programmable logic 2908 such as digital clock managers, analog-to-digital converters, system monitoring logic, and so forth. Some FPGAs also include dedicated processor blocks (PROC 2910).

In some FPGAs, each programmable tile includes a programmable interconnect element (INT 2911) having standardized connections to and from a corresponding interconnect element in each adjacent tile. Therefore, the programmable interconnect elements taken together Implement the programmable interconnect structure for the illustrated FPGA. The programmable interconnect element (INT 2911) also includes the connections to and from the programmable logic element within the same tile, as shown by the examples included at the right of FIG. 29.

For example, a CLB 2902 can include a configurable logic element (CLE 2912) that can be programmed to implement user logic plus a single programmable interconnect element (INT 2911). A BRAM 2903 can include a BRAM logic element (BRL 2913) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 2906 can include a DSP logic element (DSPL 2914) in addition to an appropriate number of programmable interconnect elements. An IOB 2904 can include, for example, two instances of an input/output logic element (IOL 2915) in addition to one instance of the programmable interconnect element (INT 2911). As will be clear to those of skill in the art, the actual I/O pads connected, for example, to the I/O logic element 2915 are manufactured using metal layered above the various illustrated logic blocks, and typically are not confined to the area of the input/output logic element 2915.

In the pictured embodiment, a columnar area near the center of the die (shown shaded in FIG. 29) is used for configuration, clock, and other control logic. Horizontal areas 2909 extending from this column are used to distribute the clocks and configuration signals across the breadth of the FPGA.

Some FPGAs utilizing the architecture illustrated in FIG. 29 include additional logic blocks that disrupt the regular columnar structure making up a large part of the FPGA. The additional logic blocks can be programmable blocks and/or dedicated logic. For example, the processor block PROC 2910 shown in FIG. 29 spans several columns of CLBs and BRAMs.

Note that FIG. 29 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 29 are purely exemplary. For example, in an actual FPGA more than one adjacent column of CLBs is typically included wherever the CLBs appear, to facilitate the efficient implementation of user logic.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. For example, while one processor and one co-processor coupled together via one APU Controller are illustrated, one processor may be coupled to multiple co-processors via one or more APU Controllers or multiple processors may be coupled to one or more co-processors via one or more APU Controllers. The processor(s) is not limited to a general propose microprocessor, but includes an application specific processor such as a graphics processor, an arithmetic processor, or digital signal processor. In addition the co-processor is not limited to a general propose microprocessor or an application specific processor such as a graphics processor, an arithmetic processor or digital signal processor, but also includes any controller circuitry that performs at least one function based on at least one software instruction, and that operates at a frequency less than or equal to the clock frequency of the processor. Claim(s) listing steps do not imply any order of the steps. Trademarks are the property of their respective owners. Headings are provided merely for organizational clarity and are not intended in anyway to limit the scope of the disclosure under them.

What is claimed is:

1. A processor-controller interface for non-lock-step operation, comprising:

a processor, the processor configured to provide an instruction; and a controller coupled to the processor to receive the instruction, the controller configured to provide a busy signal to indicate to the processor that the controller is not ready to process the instruction, the controller configured to initiate processing of the instruction while maintaining the busy signal at a first logic state indicating that the controller is not ready to processing the instruction;

the controller configured to hold the busy signal at the first logic state until a sufficient amount of the instruction has been executed by the controller for an appearance of lock-step operation between the processor and the controller though the controller operates at a lower frequency than the processor;

the controller configured to transition the busy signal to a second logic state for time remaining to complete execution of the instruction by the controller;

wherein the processor does not have to be slowed or stalled for operation of circuitry instantiated in programmable logic which is capable of performing at least one function responsive to the instruction, the circuitry being coupled to the processor via the controller.

2. The processor-controller interface, according to claim 1, wherein the controller is configured to transition the busy signal back to the first logic state responsive to receipt of another instruction from the processor, the controller configured to provide the busy signal to indicate to the processor that the controller is not ready to process the other instruction, the controller configured to initiate processing of the other instruction while maintaining the busy signal at the first logic state indicating that the controller is not ready to processing the other instruction.

3. The processor-controller interface, according to claim 2, wherein the first logic state is a logic high level, and wherein the second logic state is a logic low level.

4. The processor-controller interface, according to claim 1, wherein the instruction is a store instruction.

5. The processor-controller interface, according to claim 4, wherein the store instruction is held in a pipeline stage of the processor while waiting for the busy signal to transition from the first logic state to the second logic state.

6. The processor-controller interface, according to claim 5, wherein the pipeline stage is a decode stage.

7. The processor-controller interface, according to claim 6, wherein the store instruction is decoded by the controller while the store instruction is held in the decode stage.

8. The processor-controller interface, according to claim 7, wherein the store instruction is executed by the controller to retrieve data while the store instruction is held in the decode stage.

9. The processor-controller interface, according to claim 8, wherein the store instruction is executed by the controller to retrieve the data while the store instruction is held in the decode stage, and wherein the controller is configured to transition the busy signal to the second logic state after having retrieved all of the data for execution of the instruction.

10. The processor-controller interface, according to claim 1, wherein the controller obtains a result responsive to execution of the instruction before transitioning the busy signal from the first logic state to the second logic state.

11. The processor-controller interface, according to claim 1, wherein the processor and the controller operate with a degree of parallel processing though not in lock-step operation.

12. A method for non-lock-step operation between a processor and a controller, comprising:
   providing an instruction from the processor to the controller;
   providing a busy signal from the controller to the processor indicating that the controller is not ready to execute the instruction; and
   initiating execution of the instruction by the controller while continuing to indicate to the processor that the controller is not ready to execute the instruction;
   wherein the processor does not have to be slowed or stalled for operation of circuitry instantiated in programmable logic which is capable of performing at least one function responsive to the instruction, the circuitry being coupled to the processor via the controller.

13. The method, according to claim 12, further comprising completing at least a portion of the instruction prior to transitioning the busy signal to indicate to the processor that the controller is ready to execute the instruction.

14. The method, according to claim 12, further comprising obtaining a result responsive to execution of the instruction prior to transitioning the busy signal to indicate to the processor that the controller is ready to execute the instruction.

15. The method, according to claim 12, further comprising holding the instruction in a pipeline stage of the processor while waiting for the busy signal to transition to indicate to the processor that the controller is ready to execute the instruction.

16. The method, according to claim 15, wherein the pipeline stage is a decode stage.

17. The method according to claim 13, wherein the completing of at least the portion of the instruction includes retrieving data.

18. The method according to claim 17, wherein the instruction is a store instruction.

19. The method according to claim 13, wherein the completing of at least the portion of the instruction includes obtaining a result responsive to execution of the instruction.

20. A processor-controller interface for non-lock-step operation, comprising:
   a processor, the processor configured to provide an instruction; and
   a controller coupled to the processor to receive the instruction, the controller configured to provide a busy signal to indicate to the processor that the controller is not ready to process the instruction, the controller configured to initiate processing of the instruction while maintaining the busy signal at a first logic state indicating that the controller is not ready to processing the instruction;
   the controller configured to hold the busy signal at the first logic state until a sufficient amount of the instruction has been executed by the controller for an appearance of lock-step operation between the processor and the controller, wherein the controller uses more than a one clock cycle threshold of the processor to execute the instruction;
   the controller configured to transition the busy signal to a second logic state for time remaining to complete execution of the instruction by the controller;
   wherein the processor does not have to be slowed or stalled for operation of circuitry instantiated in programmable logic which is capable of performing at least one function responsive to the instruction, the circuitry being coupled to the processor via the controller.

21. The processor-controller interface, according to claim 20, wherein the controller is configured to transition the busy signal back to the first logic state responsive to receipt of another instruction from the processor, the controller configured to provide the busy signal to indicate to the processor that the controller is not ready to process the other instruction, the controller configured to initiate processing of the other instruction while maintaining the busy signal at the first logic state indicating that the controller is not ready to processing the other instruction.

22. The processor-controller interface, according to claim 21, wherein the first logic state is a logic high level, and wherein the second logic state is a logic low level.

23. The processor-controller interface, according to claim 20, wherein the instruction is a store instruction.

24. The processor-controller interface, according to claim 23, wherein the store instruction is held in a pipeline stage of the processor while waiting for the busy signal to transition from the first logic state to the second logic state.

25. The processor-controller interface, according to claim 24, wherein the pipeline stage is a decode stage.

26. The processor-controller interface, according to claim 25, wherein the store instruction is decoded by the controller while the store instruction is held in the decode stage.

27. The processor-controller interface, according to claim 26, wherein the store instruction is executed by the controller to retrieve data while the store instruction is held in the decode stage.

28. The processor-controller interface, according to claim 27, wherein the store instruction is executed by the controller to retrieve the data while the store instruction is held in the decode stage, and wherein the controller is configured to transition the busy signal to the second logic state after having retrieved all of the data for execution of the instruction.

29. The processor-controller interface, according to claim 20, wherein the controller obtains a result responsive to execution of the instruction before transitioning the busy signal from the first logic state to the second logic state.

30. The processor-controller interface, according to claim 20, wherein the processor and the controller operate with a degree of parallel processing though not in lock-step operation.

* * * * *